US007023867B1

United States Patent
Park et al.

(10) Patent No.: US 7,023,867 B1
(45) Date of Patent: *Apr. 4, 2006

(54) PBX WITH CONFIGURABLE ANALOG CO LINE AND T1 SIGNALLING PROTOCOLS USING PACKET BUS AND SOFTWARE SWITCHED WAV CHANNELS

(75) Inventors: Joon Suk Park, San Jose, CA (US); Charles Arnold Lasswell, Olathe, KS (US); Paul K. Lee, Fremont, CA (US); Gregory J. Schultz, San Jose, CA (US); Ronald Craig Fish, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/546,976

(22) Filed: Apr. 11, 2000

Related U.S. Application Data

(63) Continuation-in-part of application No. 09/517,231, filed on Mar. 2, 2000, now Pat. No. 6,795,448, which is a continuation-in-part of application No. 09/546,999, filed on Apr. 11, 2000.

(51) Int. Cl.
*H04L 12/28* (2006.01)
*H04L 12/56* (2006.01)

(52) U.S. Cl. ............... 370/419; 370/362; 370/364; 370/359; 370/353; 370/354; 370/355; 370/356

(58) Field of Classification Search ............ 370/364, 370/458, 498, 463, 352–357, 419, 360, 362, 370/359, 335–343, 345–347, 320, 321
See application file for complete search history.

(56) References Cited

U.S. PATENT DOCUMENTS 6,249,527 B1 * 6/2001 Verthein et al. ............ 370/466
6,389,029 B1 * 5/2002 McAlear .................... 370/402
6,480,531 B1 * 11/2002 Malhotra .................... 375/222

(Continued)

*Primary Examiner*—Wellington Chin
*Assistant Examiner*—Chuong Ho
(74) *Attorney, Agent, or Firm*—Blakely, Sokoloff, Taylor & Zafman LLP

(57) ABSTRACT

A PBX system using an unmodified personal computer as the host server and using expansion slots to couple one or more switch cards to the system bus, and, optionally including a network interface card to couple the PBX system to other client computers running telephony enabled applications to control the PBX via a local area network. The switch card(s) are each coupled to a chain of one or more port expansion units that do not consume expansion slots. Each PEU contains a DSP and a microcontroller, an FPGA and port interface circuitry to interface to POTS CO lines, extension telephone lines, T1 lines or PRI lines. The personal computer is programmed with a PBX process that controls operations of the overall system and may also be programmed with conventional voice mail applications or integrated voice response and other applications to implement various telephony functions such as recording voice mail or prompt callers to input DTMF tones indicating what they want to do. Each chain of PEUs is coupled to the switch card and the PBX process by a TDMA bus and a packet switched bus. Distributed processing by the DSPs and microcontrollers in the PEUs to do tone generation, tone recognition, and a host of other functions offloads much of the work from the host. The packet switched bus enables easy handling of packetized data in IP packets or other packetized data.

4 Claims, 24 Drawing Sheets

U.S. PATENT DOCUMENTS 6,496,103 B1 * 12/2002 Weiss et al. ............ 340/310.01
6,560,222 B1 * 5/2003 Pounds et al. .............. 370/353
6,594,271 B1 * 7/2003 Wu et al. ................... 370/412
6,678,284 B1 * 1/2004 Verthein et al. ............ 370/465
6,683,869 B1 * 1/2004 Pierson, Jr. ................. 370/352
6,795,448 B1 * 9/2004 Lee et al. ................... 370/419

* cited by examiner

External Interface In Server

If the port address is not a broadcast address, then the MC writes the payload data from the packet into the input buffer of the DSP that corresponds to the port identified in the port address   258

↓

DSP does volume control weighting and mixing of voice data with TDM data and tone data and writes summed data to output buffers of all ports on which message is to be played   260

↓

DSP record data: data coming in from port is stored in TDM input buffer for each port. Data going out to port is stored in TDM output buffer. Volume control mix process reads TDM data traveling in each direction for port as well as packet data and tone data and weights each set of data in accord with weighting functions established by PBX software via control packets based upon user functionality requests   262

→

The summed volume control adjusted data is written into the record buffer of the DSP. Once 208 bytes have been accumulated, the DSP interrupts the MC. The MC reads the record data and packetizes it and stores it into transmit FIFO of FPGA. FPGA transmits packet over packet bus   264

↓

DSP decodes caller ID data: MC detects first ring on any co port by polling the ring detector for all the ports and sets a status in the DSP to start transferring caller ID data. The DSP is constantly looking for caller ID data   266

↓

DSP decodes incoming caller ID data, and when one byte has been received, interrupts the MC. The MC retrieves the caller ID data and verifies the checksum. Then the caller ID data is packetized and transmitted to the PBX software process.   268

↓

The PBX process updates the attribute data of an object in memory created for this particular call with the caller ID data   270

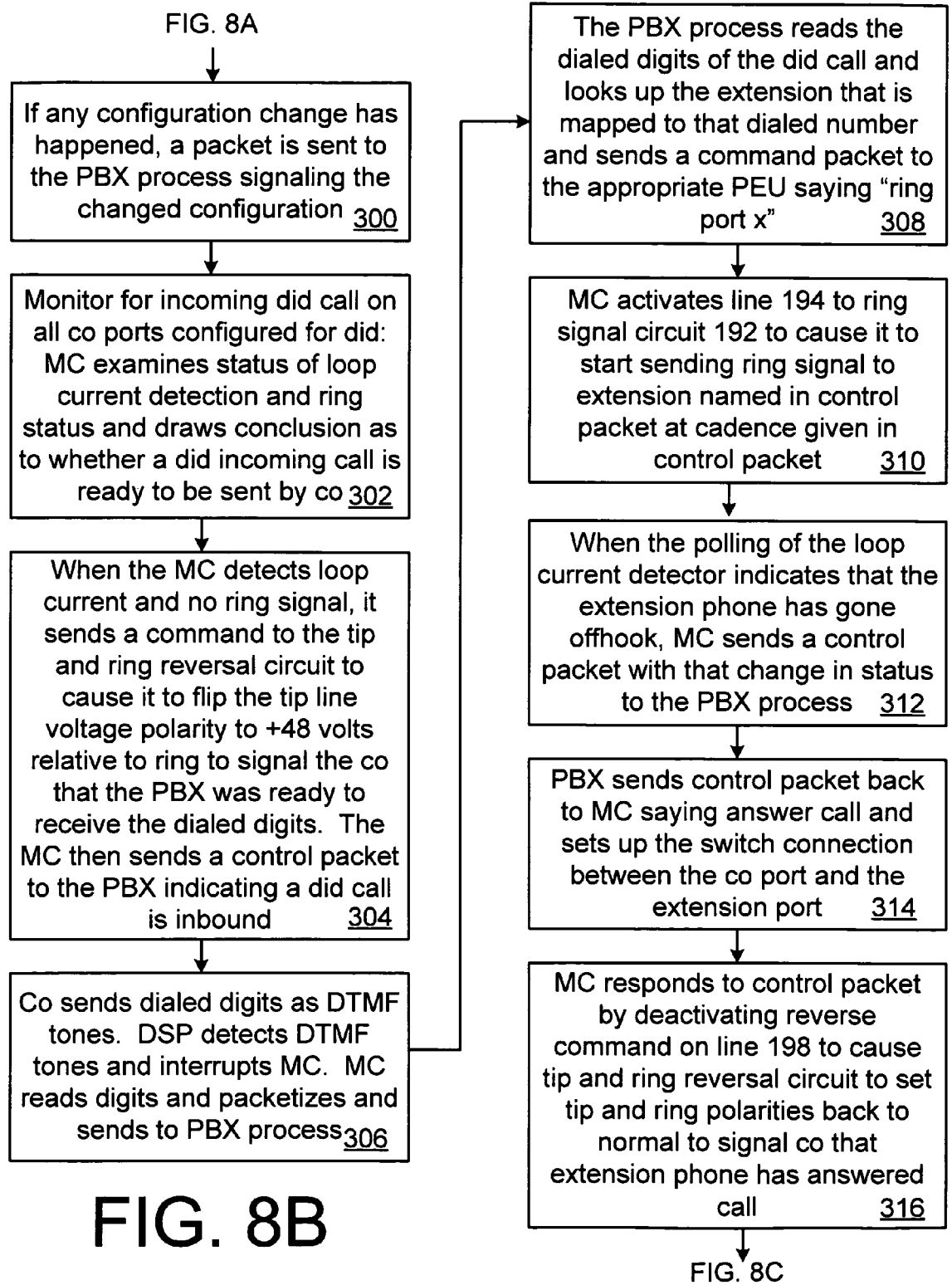

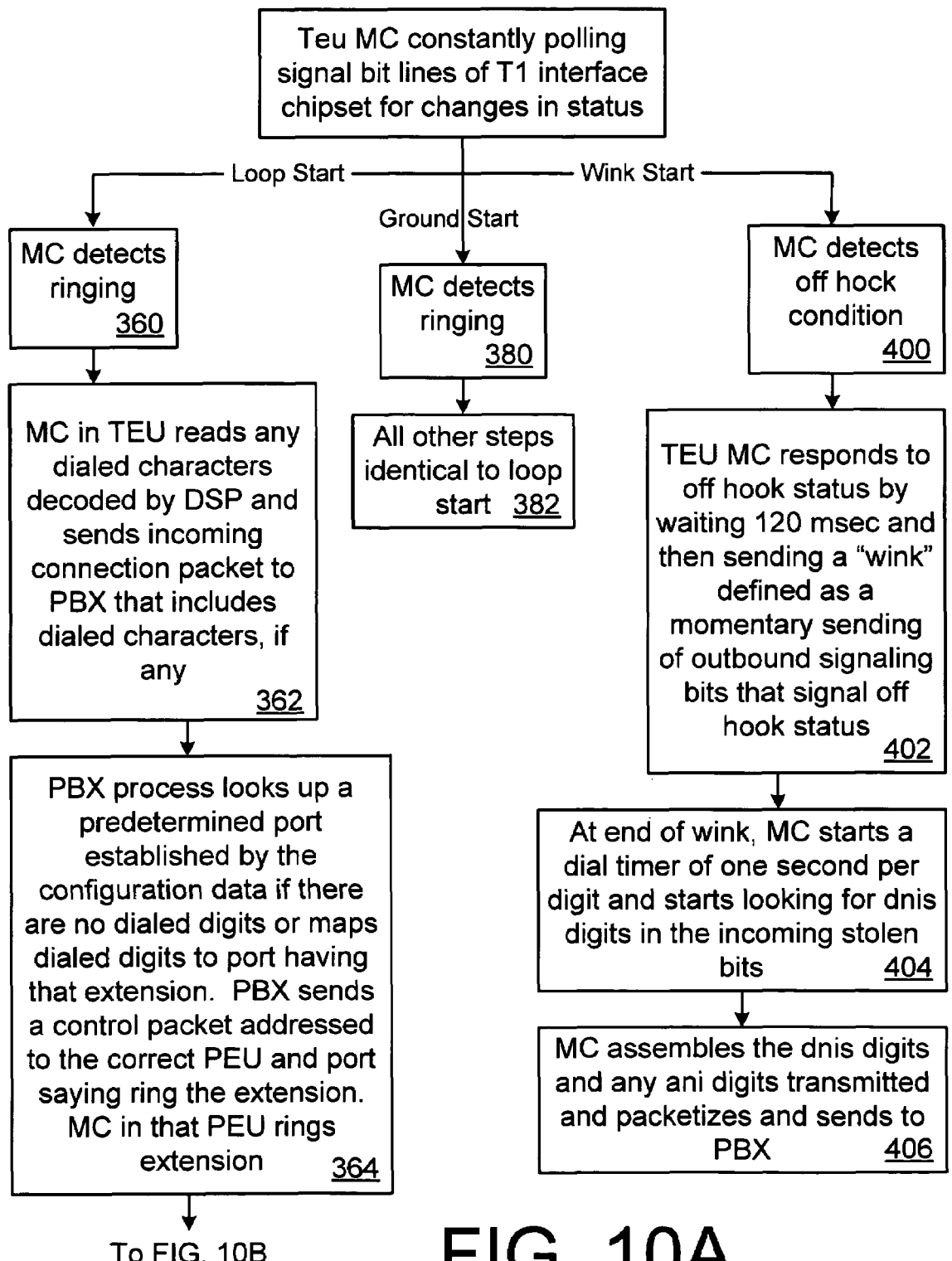

PBX WITH CONFIGURABLE ANALOG CO LINE AND T1 SIGNALLING PROTOCOLS USING PACKET BUS AND SOFTWARE SWITCHED WAV CHANNELS

Field of use

This is a continuation-in-part application of a U.S. patent application entitled, "IP Packet Ready PBX Expansion Circuit For A Conventional Personal Computer With Expandable, Distributed DSP Architecture", filed Mar. 2, 2000, Ser. No. 09/517,231, now U.S. Pat. No. 6,795,448. This is also a continuation-in-part of a U.S. patent application entitled, "PBX SOFTWARE STRUCTURE WITH DEVICE ABSTRACTION LAYER FOR DECOUPLING" filed Apr. 11, 2000, Ser. No. 09/546,999, which is hereby incorporated by reference.

The invention pertains to the field of business telephone systems with PBX capability, and, more particularly to systems that can convert conventional personal computers into machines with PBX capability.

One of the problems with PBX on an expansion card technology for personal computers is lack of expandability to add new ports above and beyond the ports provided by the expansion card. Other problems with prior systems such as Netphone and Altigen systems (Netphone's system is described in U.S. Pat. No. 5,875,234) are bottlenecks and latency caused by the use of a single centralized microprocessor to perform voice mail processing, outgoing message generation and other duties for all ports coupled to the card. The Netphone patent does teach time division multiplexed expansion interface 70 which can be used to couple multiple PBX cards like that shown in FIG. 2 together by a TDMA PCM highway. This expansion capability allows multiple PBX cards to be coupled together by a TDMA bus. The main PBX card is coupled to the server by an ISA bus interface 60. An ISA bus is a slow 16-bit, master-slave type system bus used on older personal computers such as the IBM AT. An ISA bus can only transfer one word at a time between the PBX card and the host server. It is not particularly well adapted for bursting large amounts of data over a short time such as is required to playback or record voicemail recordings.

Also, any host bus requires a bus master to drive the command and address lines of the bus to control which slave device is allowed to use the bus to communicate with the master and whether the communication will be a read or write transaction. A bus slave such as the PBX card cannot control the bus and must request control of the bus such as by asserting an interrupt request line on the system bus. An interrupt request requires a context switch by the host server wherein it stores the state of all of its internal registers and program counter and vectors to an interrupt service routine which takes control of the bus and allows the PBX card to send data to the host or receive data from the host. Each such context switch causes delay.

There is no memory on the Netphone PBX card which is large enough to be capable of recording digitized voice of voicemail or IP telephony packets or other multimedia streams data such as MP3 recordings coming in from the internet via a T1 line connection. Thus, all this data that needs to be recorded must be sent to the server for recording on the host hard disk. The ISA bus will be a bottleneck in this situation and could lead to loss of data if the RAM 64 overflows.

Further, even if multiple PBX cards are coupled together in the Netphone system, there is only one time division multiplexed bus that couples the cards together. This single TDM bus must be shared between carrying digitized voice of PBX connections between extension phones and one or more CO trunk lines or between extensions as well as outgoing or incoming voicemail data or IP telephony or multimedia data from the internet. The bandwidth requirements can exceed the available bandwidth of the bus and cause latency or lost data. Also, since voicemail recording or playback data, T1 type or IP telephony data and multimedia data is bursty traffic whereas TDMA buses are isochronous, there is a mismatch in the nature of the traffic versus the nature of the bus available to carry it. This can cause the need for additional buffer to hold the overflow thereby adding cost and delay to the process of transferring this bursty traffic from one port to another or from a port to the host server.

Another problem with current PBX systems that are built around personal computers is that in order to provide PBX connections to a T1, DSL or ISDN digital service, an expansion card which uses up one of the precious expansion slots on the host motherboard must be used. It is disadvantageous for any PBX system to make connections to CO POTS lines or digital lines from the CO or extension lines out to extension phones (hereafter "ports") through expansion cards that couple to expansion slots in the motherboard. This is because there are only a limited number of expansion slots on the host motherboard, and once they are used up, the PBX system has gotten as large as it can get and no more ports can be added without modifications to the host motherboard to add more expansion slots which may render it inoperative or slow down the system bus by loading it with parasitic capacitive and inductive loads higher than it was designed to handle for a given bit rate and clock speed.

Another problem that exists in the prior art is that some CO lines use loop start signalling protocols and others use ground start protocols. Likewise, T1 lines may use loop start or ground start or wink start protocols. To be widely useful, a PBX must be able to receive incoming calls and place outgoing calls on the analog and T1 lines regardless of which signalling protocols they use. Certain PBX's that are not based upon personal computers such as Mitel machines have configurable ground start or loop start ports. But as far as the applicants are aware, there are no personal computer based PBXs which have analog and T1 ports that are configurable for any signalling protocol.

Thus, a need has arisen for PBX system based upon a personal computer which has analog ports that can be configured for either loop start or ground start protocols or which has T1 ports which can be configured for loop start, ground start or wink start protocols. There is also a need for a PBX wherein a large, almost unlimited number of ports may be added in small slices by the addition of individual port expansion units to a standard, unmodified inexpensive personal computer where the port expansion units do not need to be coupled to expansion slots on the motherboard. A need has further arisen for a PBX system built around a conventional, inexpensive personal computer where the PEUs can interface either to POTS CO lines, any type of digital service to the CO or to extension lines coupled to extension phones. A need has further arisen for a PBX system built around a conventional, inexpensive personal computer where the PEUs interface to the host server through both a TDMA bus for PBX connection traffic of real time conversations and a packet switched bus carrying control and voicemail data which can easily handle the bursty and packetized nature of voicemail, ISDN, DSL and IP telephony packet-based traffic.

SUMMARY OF THE INVENTION

The genus of the invention is a class of PBX machines built around a standard, unmodified personal computer programmed with a PBX control program, a switch card, a PEU, at least a time division multiplexed bus coupling the switch card to the PEU and multiple ports on the PEUs which are configurable to implement loop start, ground start or wink start signalling protocols on analog or T1 CO lines. More specifically, the personal computer has added to it one or more switch cards in expansion bus slots. The switch card(s) is/are coupled to one or more port expansion units (PEU) by a packet bus and a time division multiplexed bus. The PEUs therefore do not need to consume the limited bus expansion slots of the host personal computer. The PEUs each have multiple ports which are coupled by one or more configurable microcontrollers and one or more digital signal processors and configurable subscriber line interface circuits (SLIC) to the CO switch through POTS, T1, DSL or ISDN trunk lines. Some of the ports couple the PBX to extension telephones via extension lines. Each SLIC is configurable to implement either loop start or ground start signalling protocols. Configuration is under command of the PBX process which reads configuration data and sends a command packet for each port indicating which type of signalling protocol is in effect. In the flowcharts given below for processing to receive and place calls in accordance with the different signalling protocols, the configuration packets and other control packets going from the CO to the PEU microcontrollers and from the PEU microcontrollers to the PBX process are specified as being sent via the packet bus. In some alternative embodiments where the personal computer host is coupled to the PEUs only by a time division multiplexed (TDM) bus, the configuration and command packets can be sent over one or more control channels on the TDM bus or as robbed bits on timeslots carrying PCM data between the CO port and the extension port.

In the preferred embodiment, both a packet bus and a TDM bus are used to transfer data between the host and the PEUs. The packet bus is used to carry configuration and command packets as well as play and record data as part of a WAV channel. The TDM bus is used to carry PCM data of real time or ongoing connections between one or more CO ports and one or more extension ports or between two or more extension ports. The preferred embodiment also optionally contains software switchable WAV channels that are created when needed and which are used to carry play data from an application process to a CO or extension port via the packet bus (or via dedicated or shared timeslots on the TDM bus). The WAV channels also carry record data from the ports to the application processes to record voicemail messages.

In the case of analog CO lines, the SLIC can be configured by the microcontroller on the PEU to enable a ground start signalling circuit when ground start signalling is in effect and disable when loop start signalling is in effect. In the case of T1 lines, the configuration packet tells the microcontroller on the PEU how to interpret the two signalling bits on each timeslot according to whether loop start, ground start or wink start is in effect.

Each PEU contains its own digital signal processor (DSP) so that distributed digital signal processing may be implemented to avoid any bottlenecks. One master PEU is coupled to a switch card by a time division multiplexed (TDMA) bus as well as a packet switched control bus, and all the other PEUs, if any, are coupled to the master PEU by extensions of the TDMA and packet switched buses. The TDMA bus is used to carry port-to-port PBX real time conversations while the packet switched bus is used to carry control information, any type of packetized digital data, voicemail outbound message data packets, and inbound voicemail data packets to be recorded on the hard disk of the server. Each port expansion unit has multiple ports which can be coupled to one or more central office trunk lines or one or more lines to extension telephones. Some port expansion units (PEU) are designed to couple to T1 lines, ISDN lines or DSL lines.

The distributed DSP architecture allows a very large number of ports to be serviced and a large number of simultaneous voicemail or IP or other digital packet switched channels to be serviced without overwhelming the digital signal processing capability of the system. This is because there is a DSP in each PEU which handles processing necessary for voicemail playback and recording and any other digital signals processing necessary to support the analog or digital traffic entering and leaving its ports. Each switch card coupled to the host server motherboard also has its own DSP to handle conference calling and, in some embodiments, other processing in support of the centralized switching function. The switch cards are coupled to each other by a high capacity TDMA bus so that PBX real time conversations can be routed from one switch card to another over the TDMA bus and do not have to load down the host system bus, which is typically a PCI bus in the current generation of Pentium/Celeron class host personal computers.

The use of separate TDMA and packet switched buses to couple each PEU to the switch cards in the server allows a large number of voice mail channels to be simultaneously serviced via the packet switched bus with low or no latency without any impact on the capacity to carry PBX-connected, real time conversations on the TDMA bus coupling the PEUs to the switch cards. Further, the packet switched bus is better suited than a host bus or a TDMA bus to handle packet based bursty traffic such as is found in T1 packet based TDMA traffic, or ISDN or DSL or IP telephony packet packet based traffic as multimedia stream traffic.

BRIEF DESCRIPTION OF THE DRAWINGS

FIGS. 7A through 7D are a flowchart for processign that occurs in the PEUs by the microcontroller and DSPs to support PBX activities.

FIGS. 8A through 8C are a flowchart of the process the microcontroller in each port expansion unit carries out to interface with the telephone line interface circuits such as 122 in FIG. 1 for an incoming call.

FIGS. 10A and 10B are a flowchart of the processing in a TEU interface to a T1 line by the microcontroller to implement loop start, ground start and wink start signalling protocols for an incoming call.

DETAILED DESCRIPTION OF THE PREFERRED AND ALTERNATIVE EMBODIMENTS

Figure 1:
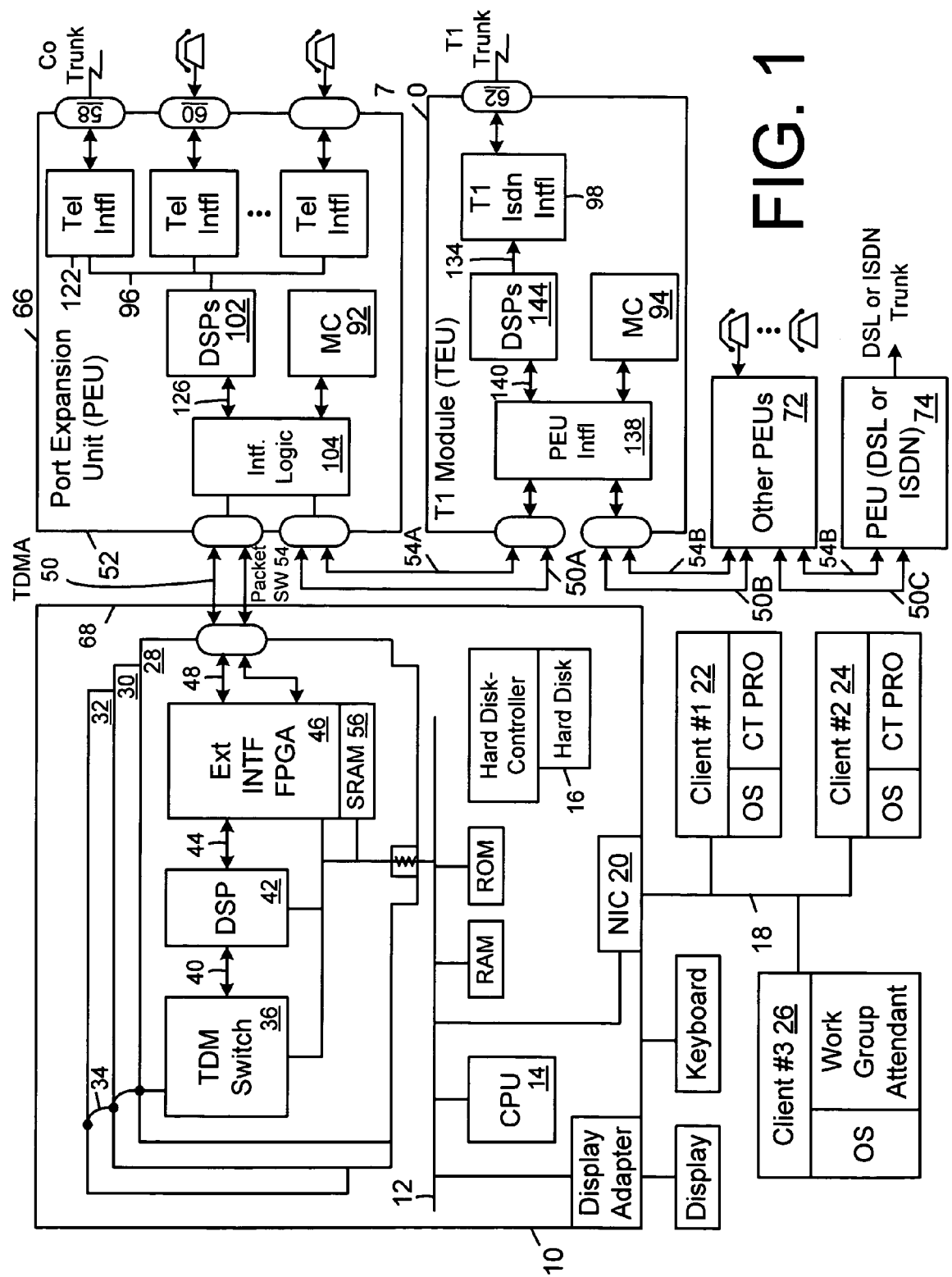
FIG. 1 is an overall block diagram of a PBX system according to the teachings of the invention.

Distributed Multicard DSP Architecture with TDMA and Packet Switched Buses Coupling PEU Cards to Switch Cards Referring to FIG. 1, there is shown a block diagram of an easily expandable, highly capable PBX system built around a conventional, unmodified personal computer 10 which can interface not only to analog POTS lines but to digital services such as T1, ISDN or DSL as well. The personal computer 10 can be any type personal computer such as a Windows based Pentium/Celeron class machine or a Power Macintosh class machine. Slower machines with less capable operating systems and less spacious hard drives could also be used with a resulting loss in system speed. In the preferred embodiment, the conventional personal computer is a Pentium/Celeron class microprocessor 14 running the Windows NT operating system and communicating with a PCI system bus 12. Not all the components of the personal computer are shown, but some of the more important components are shown.

A PBX control program is stored on hard disk 16 and controls the CPU 14 to control the various other components of the system to implement at least PBX functionality. Any PBX control program which can control the switch card to do the proper switching and which uses the TDMA bus to the PEU cards for real time PBX voice connections and uses the packet switched bus to send and receive control packets will suffice to practice the invention. Optionally, the control program also uses the packet switched bus to send and receive packets containing prerecorded voice messages, voicemail, IP telephony, and other digital data traffic from ISDN, T1 or DSL lines to and from the PEU cards. These other digital services implement such things as wide-band internet access, NetMeeting traffice, multimedia stream data etc. Optionally, the control program distributes those packets on a local area network 18 via a network interface card 20.

In the preferred embodiment, server 10 is coupled via any type local area network 18 to one or more client computers, of which computers 22, 24 and 26 are typical. The PBX software on host 14 communicates with these telephony enabled client applications via the TAPI interface. In alternative embodiments, the server 10 is not coupled to any client computers by a local area network and is only coupled to central office POTS or T1 or DSL or ISDN or other digital service lines and to lines out to one or more extension phones. In the preferred embodiment, the client computers are programmed with telephony enabled applications which can be used to send commands over the LAN to control switching, dialing, or other PBX functionality provided by the server such as sharing connections to a T1 line or sharing an ISDN or DSL connection or sharing a CO POTS trunk line between data/FAX modems in each client computer.

The computer 10 is modified to provide basic PBX switching capability by the addition of one or more switch cards 28, 30 and 32. Each switch card can drive two chains of PEU cards to which it is coupled. Each switch card has two connectors for each chain. One connector is for a TDMA bus like bus 50 which has 128 channels or timeslots per frame with an 8 KHz frame rate. The other connector is for a packet switched bus like bus 54. Each switch card is coupled to the other switch cards by a time division multiplexed bus 34. In the preferred embodiment, this bus 34 follows the ICTF H.100 standard, which is hereby incorporated by reference, but any TDMA bus with sufficient bandwidth for the possible maximum traffic volume will suffice. The H.100 bus has 32 lines each of which has a bit clock rate of 8.192 MHz with 128 timeslots per line per frame and 8 bits per timeslot and a frame rate of 8000 frames per second (matching the T1 frame rate and the frame rate on buses 50 and 126 and matching the timeslot size on the T1 lines and buses 50 and 126) for a data rate on each line of 64 KBPS which is the necessary data rate for digitized voice. Over 32 lines, this provides 4096 available channels per frame that can carry data from one port to another. Hereafter, because there are several TDM buses in the system, bus 34 may be referred to as the H.100 bus.

In the preferred embodiment, each timeslot is one channel having 64 KBPS bandwidth. This is not enough for compressed video which typically requires at least 2 MBPS. However, in alternative embodiments, bigger timeslots could be used to obtain the needed bandwidth to carry compressed video data such as video conferencing data or video on demand data. In other alternative embodiments, groups of smaller timeslots all carrying compressed video data from a single program can be switched together to provide the necessary bandwidth. Typically, the ports 58, 60 etc. are mapped sequentially at startup time to corresponding single channels of the 256 channels through the TDM switch circuit 36 (the 256 channels through the switch card are split between two 128 timeslot/frame TDMA buses like bus 50). Any T1 port is mapped to 24 consecutive timeslots to match the 24 timeslots of the T1 line. The data rate of each T1 timeslot is 64 KBPS so the data from each T1 timeslot can be carried by a single channel on the TDMA bus 50.

Obviously, in a small system with only 10–15 ports, most of the bandwidth on the TDMA bus 50 is wasted. Thus, in small systems, there is bandwidth to spare on the TDMA bus, and an alternative embodiment is to use the unused channels in blocks which are large enough to support compressed video and switch all the blocks of channels together. This requires a modification of the PBX control software controlling host 14 to write control bits into the control registers of the TDM switch 36 appropriately such that channels that are all carrying parts of the compressed video of a single program are switched together. Likewise for the T1/ISDN interface 98 and DSP 100 of the PEU card 70. T1 lines carry 24 timeslots in each direction each of which carry 8 bits. If, for example, six timeslots are blocked together as a superchannel to carry incoming compressed video of a single video conference, all six timeslots will be switched as a block and mapped onto six corresponding timeslots of TDMA bus 50 by DSP 100.

In the preferred embodiment, each switch card is also coupled to the host microprocessor 14 by the system bus 12 and an expansion slot through a conventional PCI bus interface chipset 38. The host can be any personal computer with sufficient disk space and clock speed to handle the expected volume of traffic, and this depends upon the number of ports and the expected volume of voicemail traffic if voicemail is implemented. A PCI bus based computer is preferred, and there are some Power Macs that have PCI buses, but in alternative embodiments, other buses, host computers and operating systems may also be used so long as the PBX and any other driver software for the specific switch card and PEU designs in use are ported to the host's operating system.

Each switch card includes a TDM switching circuit 36 such as an OKI Semiconductor 53812-Model CTB12 chipset which drives the H.100 bus. This switching circuit is controlled by the PBX application software through messages passed to it through the operating system and the system bus 12 or by memory mapping of I/O register bits on the switch cards I/O registers into the I/O memory space of the host 14 with each bit having predefined functions for its on and off state, or by any other known mechanism for transferring control information to hardware and/or software processes running on the switch card. In the preferred embodiment, control bits in registers on each switch card are read by the host to determine status of the switch cards. Likewise, the host controls switching and other functions of the switch card by writing these bits.

The TDM switching circuit 36 on each switch card does switching of data between timeslots on the H.100 bus 34 in the following way. Each switching circuit 36 has two sets of 256 registers therein. If the timeslots on the H.100 bus are numbered 0 through 4095, the host 14 will write a number from 0 to 4095 into a control register on the switch card and that is how the host controls the PBX connections that are made through specific timeslots. The switching circuit logically functions as if there were 256 multiplexers for each direction of data travel. Each of these 256 multiplexers represents one channel. Each of these 256 logical multiplexers has 4096 inputs each receiving the data from one of the 4096 timeslots on the H.100 bus. Each multiplexer has one output line at which the data from a selected one of the 4096 input timeslots appears, and that data will be the data for that channel for that direction of travel. Each of the 256 multiplexers has its switching control input coupled to one of the 256 registers. The number written into the register by the host controls which timeslot's data is coupled to the output.

TDMA data multiplexing requires synchronization, I.e., frame alignment by the transmitter and receiver so each is synchronized to put data into and take data out of the correct timeslots. The H.100 bus includes a control line which carries a frame sync signal which indicates the occurrence of the beginning of timeslot zero so all circuits coupled to the H.100 bus can stay in synchronization.

The selected 256 timeslots of data travelling in the direction away from the switch 36 are output on a TDMA bus 40 for input to a digital signal processor (DSP) 42. The 256 timeslots of data travelling from the ports and the DSP 42 toward the switch are output by the DSP on "local" TDMA bus 40. The term ports will be used herein to refer to the external ports coupled to central office POTS lines, extension phones, T1, ISDN or DSL lines. Ports such as 58 and 60 and 62 are typical. The 256 timeslots travelling in each direction on local TDMA bus 40 will be referred to as the local timeslots.

The overall function of the switching circuit is to provide switchable data paths at least between ports to implement at least PBX connectivity under the control of the PBX application software.

Virtual Conference Rooms

The DSP 42 is programmed to implement conference calling so that "virtual conference rooms" can be set up in the phone system. This is done by routing the data from all the timeslots of each participant in the conference to each of the ports to which a participant is coupled.

Figure 2:
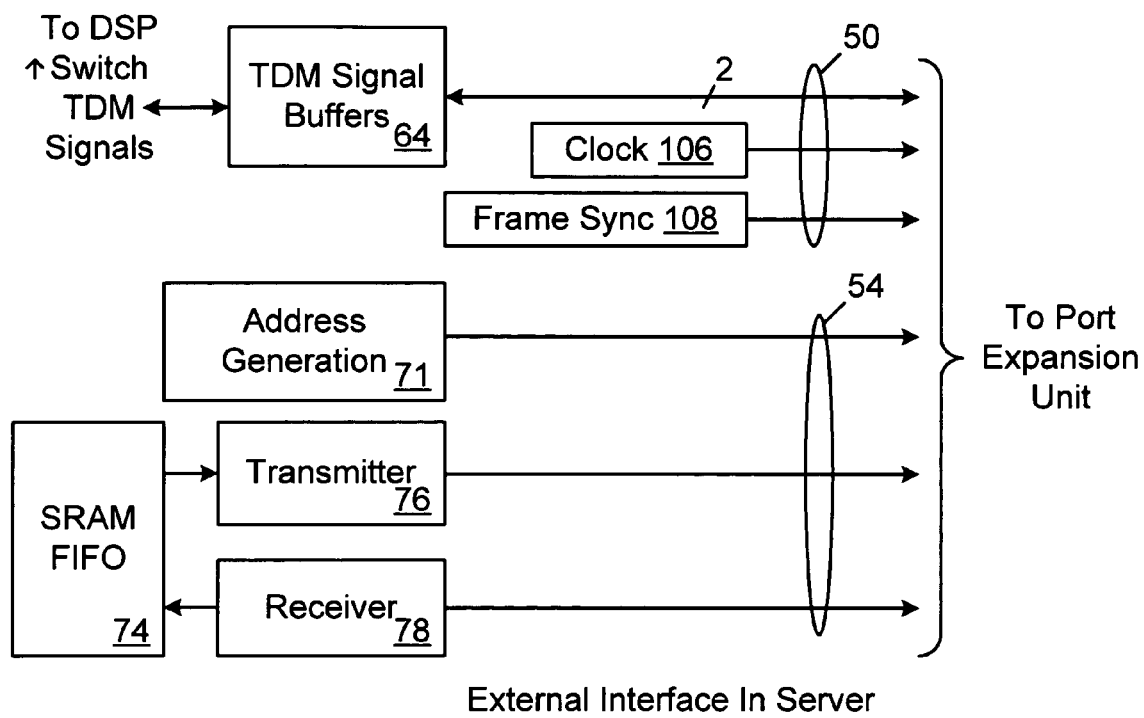
FIG. 2 is a block diagram of the FPGA external interface 46 in FIG. 1.

The DSP is coupled by another local TDMA bus 44 to an external interface FPGE 46. The external interface 46 is shown in block diagram form as FIG. 2. The external interface has buffers 64 to buffer the timeslot data traveling in both directions to and from the PEU card 66 on TDMA extension buses 40, 44, 48 and 50. There is an FPGA interface circuit 46 on each switch card and an FPGA interface circuit 104 on each PEU. The functionality of each of these FPGA types is described below in VHDL language in Appendices A and B.

The PEU 66 is comprises of one or more port expansion unit circuit boards (hereafter referred to as a card) of which cards 66, 70, 72 and 74 are typical. Each PEU card has one or more ports for coupling to CO POTS trunk lines, T1, ISDN or DSL lines or lines to extension phones. The PEU cards do not use up expansion slots in the personal computer 10. Each PEU card is coupled to its neighboring PEU cards by a TDMA bus 50 and a packet switched bus 54 to form a daisy chain. The first PEU in the chain is coupled to the personal computer 10 by a TDMA bus 50 and a packet switched bus 54. The significance of this architecture is that the system can be easily expanded to grow to as many extension phones and CO POTS trunk lines and T1 or DSL lines as needed to meet the needs of the customer while using a conventional personal computer with only a limited number of expansion slots as the server. In addition, it is new to have a packet switched bus interface in each PEU and it is also new to use the packed switched bus for voice mail traffic. Prior art PBX on a card type circuitry uses the TDMA path and the switching resource to couple the voice resources such as voice mail files stored on the hard disk to the codecs at the ports. Typically, only a fixed number of TDMA channels are devoted to voicemail traffic, so when those channels are all busy, the system has a bottleneck and other ports cannot play or record voicemail. This centralized limitation of voicemail channels to some fixed number severely limits the expandability of the system in terms of the number of extension telephones, T1, ISDN or DSL lines or CO POTS lines which can be coupled to the system.

The external interface 46 is preferably a field programmable gate array. It is coupled to the first PEU card in the chain via the TDM signal buffers 64 and the TDMA bus 50. Clock generation circuit and frame sync signal generator 108 generate the remaining two signals on the TDMA bus 50. The external interface 46 also includes an address generation circuit 71, an SRAM FIFO 74 and conventional transmitter and receiver circuits 76 and 78 the outputs of which form the packet switched bus 54.

Figure 3:
FIG. 3 is a diagram of the general format of packets transmitted on said packet bus.

The format of the packets transmitted back and forth on the packet bus 54 is shown in FIG. 3. Each packet includes a size field 80, a destination address 82, a source address 84, a type field 86 that contains data indicating whether it is voicemail data, a command or some other type of data such as an IP packet etc., a payload section 88 and CRC bits 90 for error detection and correction.

The host CPU 14 is coupled to the packet switched bus for sending and receiving messages via the host system bus 12, the bus interface circuit 38, the SRAM FIFO 74 and the transmitter 76 and receiver 78 circuits. The transmitter and receiver circuits function to receive control message packets, voicemail packets, multimedia stream packets, IP packets and IP telephony packets travelling in both directions between the PEU circuits, the host 14 and drive them onto or receive them from the packet switched bus 54.

The packet data interface between each PEU and the server 68 via the packet switched bus is implemented by a microcontroller on each PEU card, of which microcontrollers 92 and 94 are typical. The microcontroller on each PEU card also functions to control signalling on the telephony interface of whether it is POTS or an extension line or a T1 or other digital port. The microcontroller also transfers packetized voice data back and forther in packet format over the packet switched bus 54 to play and record voice messages. The microcontroller on each PEU card also coordinates with the digital signal processor (hereafter DSP) on the PEU card to implement DTMF tone recognition and generation.

The function of the DSP on each PEU card is to convert packetized voice data received from the microcontroller to the TDMA format of the telephony interface used on a TDMA PEU bus in each PEU. The DSP on each PEU card also does tone recognition and generation, and also functions to implement a gain control. Because both the DSP and microcontroller on each PEU are software controlled, their roles and functionality are flexible and can be changed or expanded in the future. The clock speed and bandwidth of the local TDMA bus 96 on each PEU card is different and slower than the clock speed and bandwidth on the TDMA bus 50. The DSP 102 on each PEU card resynchronizes the data transfer between the buses using synchronization signals from the interface logic 104. Each TDMA bus in the system is comprised of four wires: a clock, a synchronization signal, an input data, and an output data wire. The clock speed on the local bus 96 is 2.048 MHz and there are 32 timeslots per frame each carrying 8 bits at a frame rate of 8000 frames per second. There are up to 16 ports per PEU card and up to 14 PEU's in the chain coupled to each switch card. The TDMA bus 50 between a switch card and the first PEU in its chain has 256 timeslots per frame and a clock speed of 8.192 MHz with 8 bits per timeslot and a frame rate of 8000 frames per second. The local bus 96 runs as a lower clock speed because the particular CODEC in the telephone interface 122 that digitizes the incoming audio signals from the port and which receives digital data from the timeslots on bus 96 and converts it to audio signals cannot run at a higher clock speed. However, in alternative embodiments where a faster CODEC is used, the local bus 96 can run at the same clock rate as the TDMA bus 50.

The DSP 102 on each PEU resynchronizes the data coming in from the timeslots on TDMA bus 50 to the timing of the corresponding timeslots on the local TDMA bus 96 and vice versa. There are actually two DSPs per PEU card if the PEU has sixteen ports. Each DSP handles eight of the ports.

The DSPs are synchronized to the timeslots on the local TDMA bus 96 by a synchronization signal received from the interface logic FPGA 104. The interface logic FPGA 104 synchronizes each DSPs with a sync pulse.

Each port is mapped at startup time to one timeslot on the local TDMA bus 96 and a corresponding timeslot on the TDMA bus 50. If a port is coupled to a T1 line, then 24 timeslots on the TDMA bus 50 are assigned to it. When the sync pulse arrives from the interface logic 104, the DSP knows that the next eight timeslots on the TDMA bus 96 belong to it. The data in and data out wires of TDMA buses 96 and 50 are frame synchronized, so when the DSP receives its sync pulse, it reads the data coming in from the eight ports assigned to these eight timeslots and writes data going out to these same eight ports into the timeslots assigned to those ports.

There are no collisions on the TDMA bus 50 because each of the ports on all the PEUs is assigned to one unique timeslot. A PEU coupled to a T1 line maps the 24 timeslots of the T1 data input line to 24 timeslots on the TDMA bus 50 and maps the 24 data output timeslots to 24 different timeslots on the TDMA bus 50.

Figure 4:
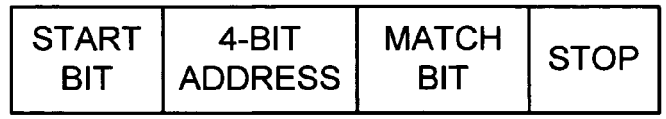
FIG. 4 is a diagram of the polling token.

However, some mechanism must be employed to prevent collisions on the packet switched bus 54 between transmissions from various PEU cards in the chain and the server. Any known mechanism to do this will suffice to practice the invention. In the preferred embodiment, a token based polling scheme is used. FIG. 4 is a diagram of the polling token. The token is comprised of a start bit, a 4-bit address, a match bit and a stop bit. There are 16 possible addresses of which 0 is illegal and 15 is broadcast. The address generator generates tokens with addresses 1–14 sequentially without any knowledge of how many PEU cards are actually connected in the preferred embodiment. In alternative embodiments, the address generation circuitry could periodically send out discovery tokens requiring a reply with the address of the PEU that replies to determine how many PEUs are on the bus and what their addresses are and then generate tokens sequentially in a round robin fashion directed to only the PEUs that are actually connected to the bus 54.

Each PEU watches the address line for the token, and when a token arrives, it compares the address in the token to its own address. If the address does not match, the token is transmitted to the next PEU in the chain on the address line of the packet bus 54. If the address does match, the PEU changes the match bit from 0 to 1 and retransmits the token. The next PEU, if it already has an address, will change the match bit back to 0 and retransmit the token. The PEU with the matching address then has full control of the packet bus 54 until a token arrives that has an address that does not match. Thus, each PEU gets control of the packet bus for the interval during which the token address matches its own address. During that interval, packets of data stored in a transmit buffer of the interface logic 104 are transmitted to the server using packets of the form shown in FIG. 3, and packets addressed to that PEU are transmitted from the server to that PEU.

The match bit is used by new PEUs that have just been plugged into the bus to learn and acquire the next sequential address on the bus. If for example, two PEUs are already plugged into the bus, they will have already acquired addresses 1 and 2. Suppose now a third PEU is plugged into the bus. The third PEU learns its address by watching the match bit of tokens it receives. When PEU receives a token with address 1, it changes the match bit from 0 to 1 and sends the token to PEU 2. PEU 2 changes the match bit back from 1 to 0 and retransmits the token to the new PEU. When the new PEU powers up, it defaults to invalid address 0 and never finds a token addressed to it. However, when a token with address 2 arrives at PEU 2, it changes the match bit from 0 to 1 and sends it along to PEU 3. When PEU 3 sees the match bit of 1 and the address of 2, it automatically determines that its address will be 3 and stores that in its memory for future comparisons to token address fields. Other schemes could also be used. For example, a switch on each PEU could be set with that PEU address as is done on SCSI buses so that each PEU has a different address. In another alternative embodiment, a discovery process by the server could be periodically carried out and the server could assign an address each time a new client PEU is found.

Figure 5:
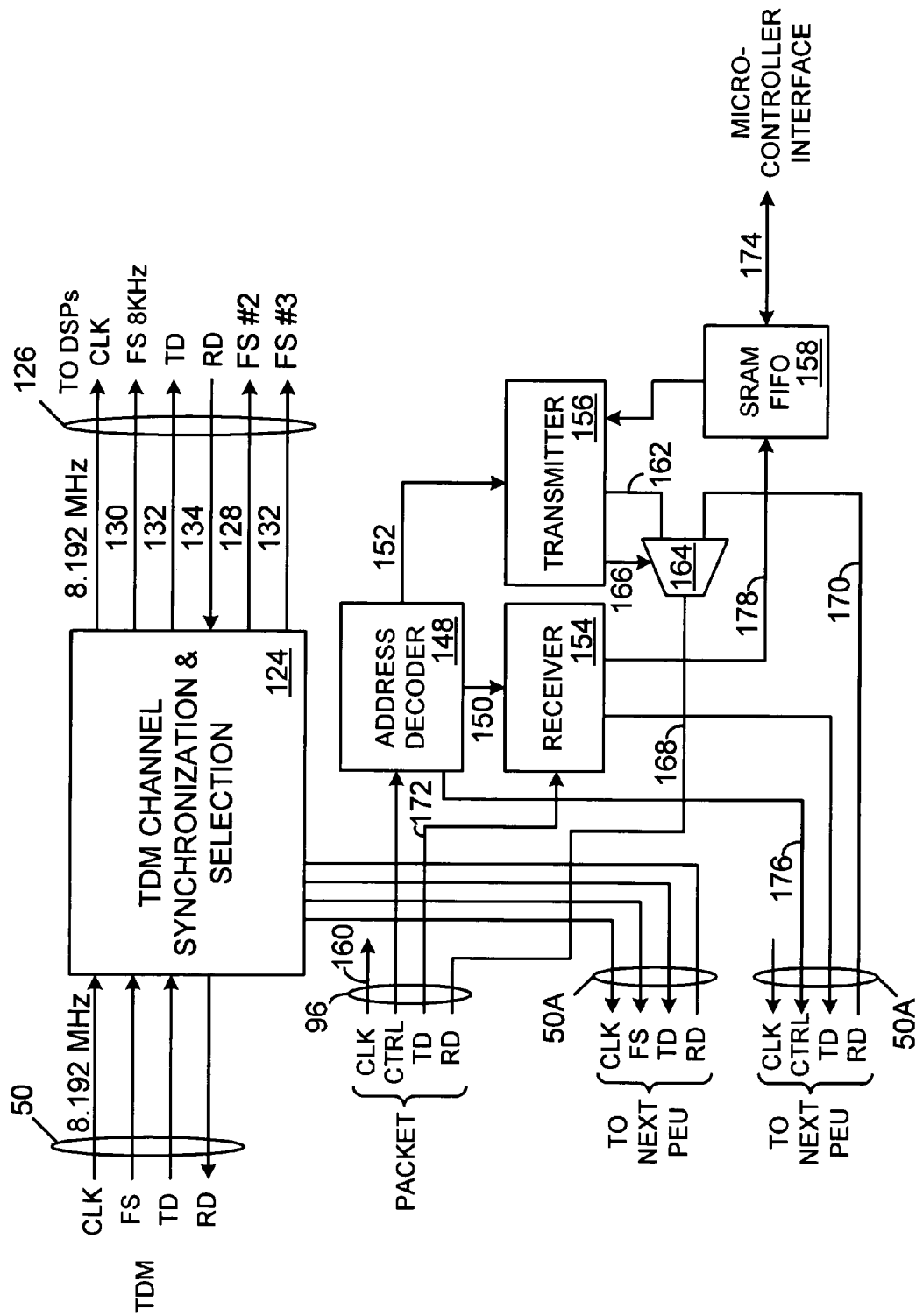
FIG. 5 is a diagram of the bus interface logic FPGA in each PEU.

A block diagram of the PEU interface logic FPGA is shown in FIG. 5. The four lines of the TDM bus 50 are coupled to a TDM channel synchronization and selection circuit 124. Those four lines are a clock CLK, a frame synchronization signal line FS, a transmit data line TD and a receive data line RD. The purpose of the sync and selection circuit 124 is to retransmit the incoming data from bus 50 to the DSP on another TDMA bus 126 but to generate a second frame sync signal FS#2 on line 128. Bus 126 is coupled to each of the DSPs on the PEU (if there are more than one) and has the same clock rate of 8.192 MHz as bus 50 and has a frame sync signal FS on line 130 that keeps the DSP 102 synchronized to the timeslots on the transmit data line 132 and the receive data line 134. The function of each DSP is to put the data from timeslots on bus 126 directed to particular ones of the ports the DSP is controlling onto the proper timeslot of the local bus 96. This will require some re-timing and synchronization from the synchronization and selection circuit 124. This synchronization function is performed by the frame sync signals FS#2 and FS#3 on lines 128 and 132. These frame sync signals are at the same 8 KHz frame rate as on the faster TDM buses 50 and 126 because the total duration of a 32 timeslot frame on local bus 96 is the same as the total frame duration of the 128 timeslots on TDM buses 50 and 126.

However, the frame sync signals on lines 128 and 132 are offset in time from each other by ¼ of the total frame time on local bus 96. Line 128 is coupled to one of the DSPs coupled to the local bus 96 and line 132 is coupled to the other DSP coupled to the local bus 96. Each frame sync signal on lines 128 and 132 when it occurs tell the DSP to put received data onto the next 8 timeslots on the local bus 96 and to take data received during the next 8 timeslots on bus 96 and put it on timeslots of the receive data line 134 of bus 126.

Each DSP receives incoming data from the switch card on line 132 and stores it into its receive buffer and then processes it for volume control and writes it to its transmit buffer. The DSP also may write data for generated DTMF tones into the transmit buffer for the appriate timeslot and port that needs these tones (such as for dialing numbers). The DSP also receives data from the ports and stores it in a receive buffer coupled to the local bus 96. That data is processed for volume control, DTMF tone recognition etc. and written into the appropriate portion of a transmit buffer for the bus 126.

In the case of a PEU which is a T1 interface, such as PEU 70, there are three DSPs per T1 port 62 and there are two T1 ports per PEU. The three DSPs each process the data from 8 of the 24 T1 timeslots to do volume control, DTMF tone generation and recognition. These three DSPs are daisy chained and only the first one is coupled to bus 126 of the synchronization and selection circuit 124. Only the last one interfaces via an 8.192 MHz TDMA bus 134 to the T1/ISDN interface chipset 98. In the preferred embodiment, the T1/ISDN interface (ISDN lines are also 24 timeslots per frame) is the DS2152 chipset commercially available from Dallas Semiconductor. Each of the 24 timeslots of data on TDM bus 50 mapped to the 24 T1 timeslots is output by PEU interface FPGA 138 in FIG. 1 on a 8.192 MHz TDM bus 140 similar to TDM bus 126 in FIG. 5. The 24 timeslots of data to be output to the T1 slots is written into the receive buffer of the first DSP 144 (only one DSP is shown in FIG. 1) and is then copied to its transmit buffer. The first DSP processes its 8 timeslots and then outputs this data to the receive buffer of the second DSP in the chain. The second DSP processes its 8 timeslots, respectively, and then copies the data of all 24 timeslots to its transmit buffer. The second DSP then outputs all 24 timeslots to the receive buffer of the third DSP in the chain. The third DSP then processes the data of its 8 timeslots and outputs the processes data to its transmit buffer. The third DSP then outputs all 24 timeslots of processed data to the T1/ISDN interface 98 via TDM bus 134.

Another function of the TDM channel synchronization and selection circuit 124 besides copying data from bus 50 and the timeslots assigned to the local ports onto bus 126 (or 140 for a T1 PEU), is to implement the daisy chain to the other PEUs. Each PEU is coupled to its neighboring PEUs in the chain by an extension of both the TDMA bus 50 and the packet switched bus 54. These extensions are shown as 50A, 50B, 50C. The extensions of the packet switched bus 54 are shown as 54A, 54B and 54C.

The circuitry of the PEU interface logic that controls the packet switched bus 54 is also shown in FIG. 5. An address decoder compares the tokens transmitted by the address generator 71 in FIG. 2 to the address of this particular PEU. If there is a match, the decoder activates the enable lines 150 and 152 thereby enabling the receiver 154 and transmiter 156, respectively. The transmitter 156 then transmits any packets stored in SRAM FIFO 158 by outputting them in serial format on line 162 at the bit rate established by packet bus clock CLK on line 160. A multiplexer 164 is enabled by a switch control command on line 166 to couple line 162 to line 168 anytime transmitter 156 is transmitting but to couple the receive data line 170 of packet bus extension 54A to line 168 at all other times. In alternative embodiments, the multiplexer 164 will select line 162 for coupling to line 168 at all times when the token is in possession of this PEU.

Simultaneously, incoming packets from the server on transmit data line 172 of the packet data bus are received and written into the receive data FIFO 158 via bus 178. FIFO 158 is actually two FIFO, one for packets travelling in each direction. The microcontroller 92 constantly polls the FIFO 158 for new received packets, but in alternative embodiments, the receiver can generate an interrupt to the microcontroller each time it writes a packet into the FIFO. When there is a packet in the FIFO for the microcontroller, it is read via the interface represented by line.

The address decoder 148 also re-transmits any received tokens out to the other PEUs on the chain via control line 176 of packet bus extension 54A.

Figure 6:
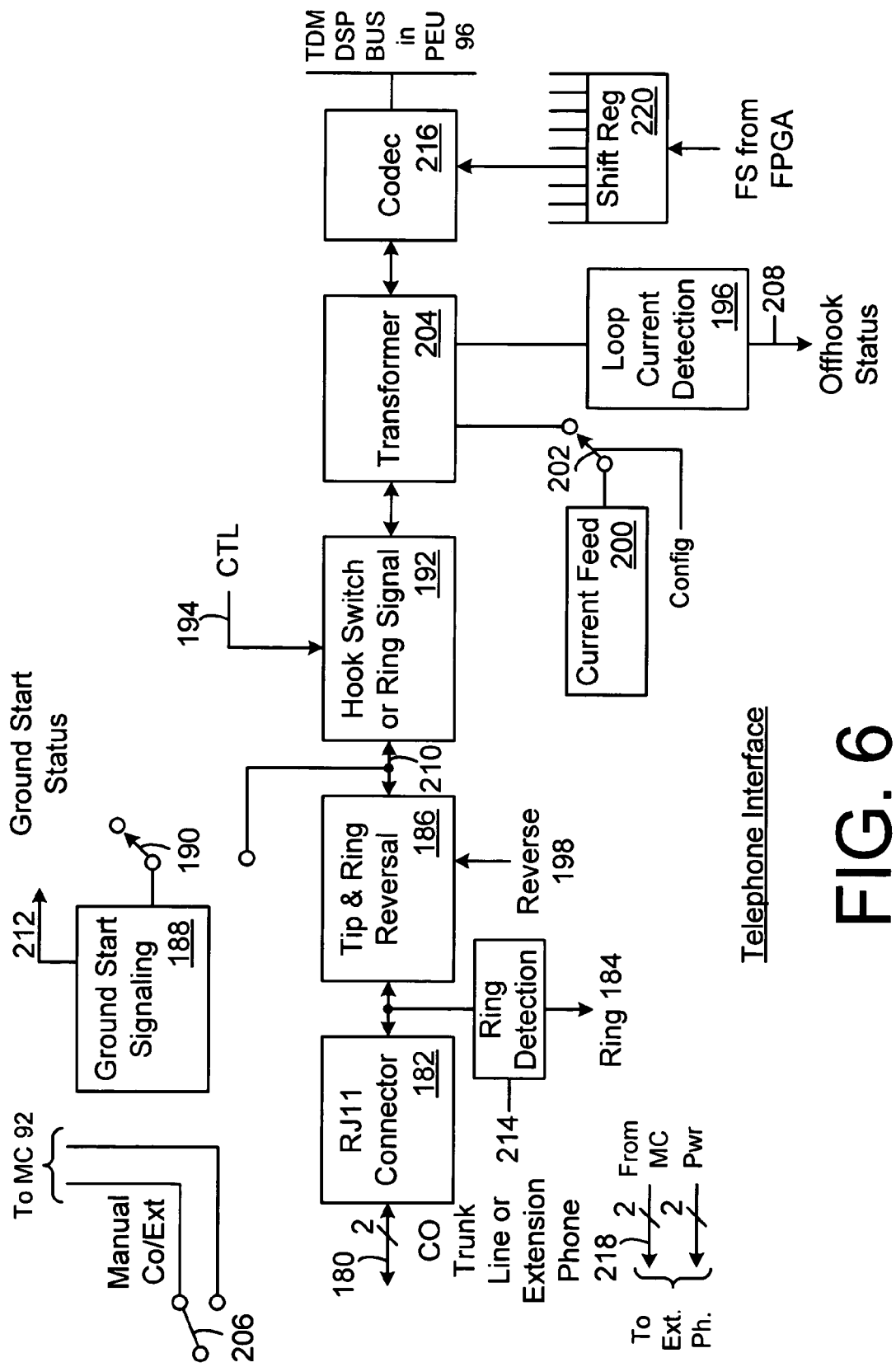
FIG. 6 is a block diagram of the PEU telephone interface circuit.

Referring to FIG. 6, there is shown a block diagram of the PEU's telephone interface circuit 122 in FIG. 1. This interface will work for connection either to a trunk line, a conventional telephone or one of the proprietary phones sold by the assignee Picazo Communications, Inc. The trunk line etc is represented by line 180 and couples to an RJ11 connector 182. A conventional ring detection circuit detects the ring voltage on the line and sets a bit which can be read by the microcontroller via line 184 via a polling cycle. In alternative embodiments, the ring detection circuit can cause an interrupt to the microcontroller, which then executes an interrupt service routine to read the status of the ring detector.

A conventional tip and ring reversal circuit 186 functions to reverse the tip and ring lines when necessary to support an incoming direct inward dialing (DID) call. In DID calls, the caller dials a number that is mapped to a particular extension on the PBX system. The CO signals the PBX when it wishes to direct a DID call to the PBX by taking the CO line off-hook (closing the tip and ring loop). The off-hook condition is detected by a conventional loop current detection circuit 196. Ring signals are detected by a conventional ring detection circuit 214. The microcontroller polls (or retrieves in response to an interrupt service routine) the off-hook status and sees, by the absence of ring status on line 184, that a DID call is incoming. This fact is sent to the host 14 by the microcontroller as a control packet. The host then sends back a control packet ordering the microcontroller to do a tip and ring reversal to signal the CO that the PBX is ready to receive the call. The PEU microcontroller then sends a REVERSE command via line 198 to the tip and ring reversal circuit 186 causing it to reverse the tip and ring voltage condition to +48 volts on the tip line relative to the ground reference on the ring line (as opposed to the normal −48 volts on tip relative to ring). In a DID call, the battery voltage or loop current feed is supplied by the PBX to the CO to signal the CO that the PBX is ready to receive the DID call. Each port is configured at the system initialization as to whether it will be coupled to a CO line or an extension line, and, if coupled to a CO line, whether the CO line supports DID. To support DID or when the port is coupled to an extension phone, it is necessary to supply the loop current (−48 volts on tip relative to ring) from the PBX, and that is the function of current feed circuit 200 and switch 202. Switch 202 is controlled by the microcontroller 92 on the basis of configuration data defining whether the port is coupled to an extension phone or supports either type of DID that requires the PBX to send loop current to the CO for signalling. The switch 202 is closed to connect the current feed circuit 200 to the 2-wire to 4-wire transformer when the port is coupled to an extension or supports DID. This causes the normal loop current to be supplied to line 180. For DID signalling, the tip and ring reversal circuit 186 can reverse the polarity of the voltage on the tip line relative to the ring line for DID signalling that the PBX is ready to receive the call.

A ground start signalling circuit 188 functions to implement the ground start or loop start signalling protocol on analog signal lines and is switched into the circuit by switch 190. Switch 190 is set at initialization time for each port by the microcontroller based upon configuration data which is set for each port coupled to a CO line to control whether the PBX responds to control signals appearing on the tip and ring lines in accordance with either the ground start or loop start protocol.

A conventional hook switch or ring signal circuit 192 is coupled to the microcontroller 92 via control line 194. The hook switch/ring signal circuit 192 cooperates with the ground start signalling circuit 188 to implement the ground start or loop start signalling protocol on analog CO lines.

Switch 206 is manually operated and exists for every port. It is set by the installer when the port is coupled to a CO line or an extension phone. One position of the switch indicates the port is coupled to a CO line. The other position indicates a connection to an extension phone. The microcontroller reads switch 206 for each port to determine whether the port is coupled to the CO or an extension phone. Circuit 192 performs an off-hook function when line 180 is coupled to the CO When the microcontroller has determined line 180 is coupled to the CO and the microcontroller receives a control packet from the host 14 indicating the line 180 is to be taken off-hook, a control signal is sent to the circuit 192 on line 194 causing it to force line 180 off-hook. If pair 180 is coupled to an extension phone and microcontroller 92 receives a control packet containing a command to ring whatever phone is coupled to pair 180, the control signal on line 194 is activated and that causes circuit 192 to drive ring signal voltages onto pair 180.

When the phone coupled to line 180 goes off-hook, this condition is detected by circuit 192 and can be read by the microcontroller via a polled read of a status register in loop current detection circuit 196 via line 208. The control lines and status lines shown in FIG. 6 may, in some embodiments, actually be the data bus of the microcontroller in some embodiments with the microcontroller address bus being used to individually address each circuit the status of which is to be read or to which a command is to be sent.

Analog signals from the CO or from an extension phone via pair 180 are digitized in CODEC 216 and put on local TDM bus 96 in the appropriate timeslots. A shift register 220 shared by all the ports on the PEU controls when the CODEC 216 puts its data onto the local bus. The shift register receives the frame sync signal FS for the particular local bus 96 in question from the FPGA 104. All the ports are mapped sequentially onto timeslots of the local bus, so the shift register just starts shifting a bit through it at each frame syn activation. The output of each cell of the shift register acts as the activation signal for the CODEC and is activated when the bit arrives in the cell corresponding to that port.

Digital data can be sent to the extension phone by the microcontroller if the phone is so equipped, and digital data may also be sent by the phone to the microcontroller via pair.

This digital data can include caller ID of the caller and any digital data indicating certain function keys on the phone were pressed.

Figure 13:
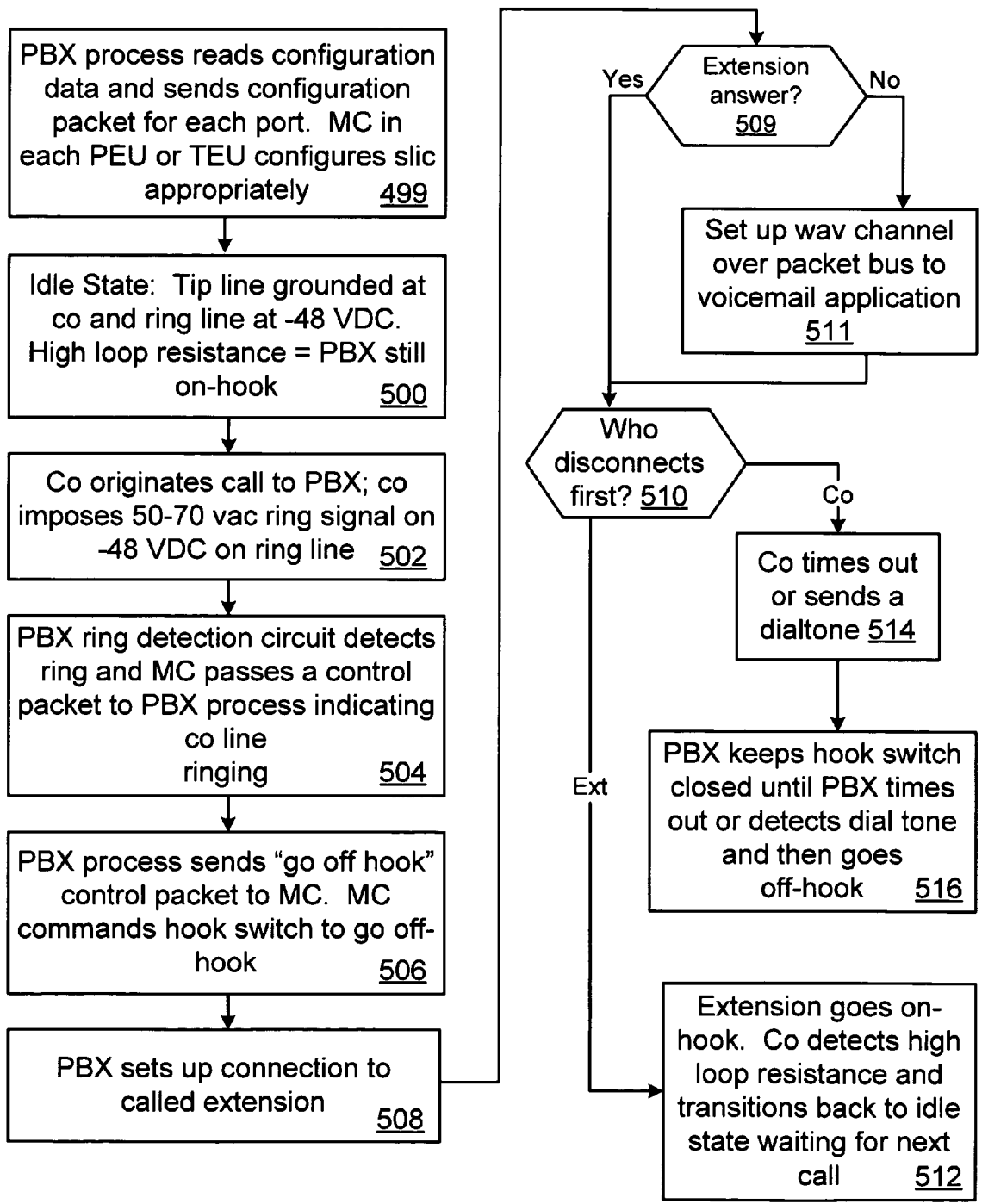
FIG. 13 is a flowchart of the preferred processing that occurs between the CO and the PBX of FIG. 1 when the CO originates a call on an analog loop start line.

Referring to FIG. 13, there is shown a flowchart of the processing that occurs between the CO and the PBX of FIG. 1 when the CO originates a call on an analog loop start line. Step 499 represents the process wherein the PBX reads the configuration data at initialization time and sets up the subscriber line interface circuits like that shown in FIG. 6 for each analog CO line port to operate on the protocol specified by its configuration data. The PBX sends a configuration packet over packet bus 54 in FIG. 1 to each PEU coupled to an analog CO line. This packet specifies whether the signalling protocol on the analog CO line is loop start or ground start. The MC 92 in each PEU receives this packet and appropriately configures the subscriber line interface circuit for the port to which the configuration packet pertains. The subscriber line interface circuit is the circuit of FIG. 6. If the CO line uses loop start, the ground start signalling circuit 188 is disabled. This can be done by the MC commanding switch 190 to open to disconnect circuit 188 from the tip and ring lines 210, but in other embodiments, circuit 188 is always connected to the tip and ring lines and is internally disabled by a command from the MC 92. If the CO line is ground start, MC 92 enables ground start signalling circuit 188 by either coupling it to the tip and ring lines or internally enabling it. This all happens at initialization time. The unit then transitions to an idle state waiting for a call.

Step 500 represents the idle state wherein the CO switch grounds the tip line and imposes a −48 volts DC (VDC) level on the tip line. There is high loop resistance in this state because the PBX is still on-hook. Step 500 also represents the step which occurred earlier at startup of reading configuration bits in a control message sent by the PBX process for each analog CO line port which establishes whether the loop start or ground start protocols will be used for that particular port.

In step 502, the CO signals it wants to create a telephone connection to the PBX for an incoming call. The CO signals this by imposing a 50 to 70 volt AC ring signal on top of the −48 VDC signal on the ring line. Upon initialization of this port, the MC received a configuration packet indicating the loop start protocol is to be implemented, so MC 92 commands switch 190 in FIG. 6 to open thereby disconnecting the ground start signalling circuit 188 from the tip and ring lines represented by bus 210. In some embodiments, the ground start signalling circuit 188 is always connected to the tip and ring lines, but an internal switch controlled by the MC disables the circuit 188 when loop start signalling is in effect.

The PBX detects the ring signal via ring detection circuit 214 and polling thereof by the MC via status line 184. This status line 184 may represent simply a polling of a status register which has a bit dedicated to ring status which is set by the ring detection circuit 214. The MC passes a control packet to the PBX process running in host CPU 14 in FIG. 1 telling it a ring signal has been detected on a particular port, all as represented by step 504.

In step 506, the PBX process reacts to the incoming ring signal by sending a control packet to the MC commanding it to force the CO line off-hook. The MC responds by activating a control signal on line 194 in FIG. 6 to cause the hook switch or ring signal circuit 192 to force the CO line off-hook by closing the loop and lowering the loop resistance. At this point the connection is made so the MC sends a control packet back indicating the connection is made. The PBX then processes the connection between the CO line port and the called extension in any conventional manner. One way of setting up the connection to the extension is setting up a connection to a human attendant or auto attendant extension where an extension is entered. The human attendant or auto attendant then enters commands to set up a connection via the TDM bus 50 and the TDM switch 36 in FIG. 1 to transfer digitized PCM data to the extension and sends a command packet via the packet bus 54 to the MC of the PEU having the port coupled to the extension requesting the MC to issue the appropriate commands to ring the extension. Another way to set up the transfer, if the line is DID, is mapping the received DID digits (recognized by DSP in PEU and indicated to PBX process in a packet sent over the packet bus 54 by the MC) to a particular extension in the PBX process. The PBX process then issues the appropriate commands to set up the connection via the TDM switch 36 and the TDM bus 50. The PBX process the also sends a command packet to the MC 92 of the PEU coupled to that extension to cause the MC to issue the appropriate commands to ring that extension. All these steps for carrying out the transfer are symbolized by step 508.

Step 509 represents the process of determining whether the extension phone answered. This is done by the MC polling the loop current detection circuit 196 in FIG. 6 or by an interrupt to the MC from it. The MC sends a packet over the packet bus informing the PBX when the extension goes off-hook. If the extension does answer, the conversation proceeds until the extension or CO switch hangs up.

If the extension does not answer, in some embodiments the extension will just be allowed to continue ringing until the caller gives up and hangs up. In the preferred embodiment, the call will be connected to a voiceamail or integrated voice response (IVRS) application to record a voicemail message or play a menu of other options. In this preferred embodiment, the PBX will timeout or count rings and determine that the call should be transferred to voice mail or IVRS application process. Either application process, after a predetermined number of rings with no answer, plays a prerecorded message giving the user more options. In either a voicemail or IVRS embodiment, the PBX process issues commands to set up a WAV channel to carry play and/or record data in packets on the packet bus 54 between an application program running on host 14 and the CO port, as symbolized by step 511. The details of how this WAV channel is set up are given in FIG. 18.

Step 510 symbolizes the events that start to happen when either the PBX or CO disconnects to take down the connection. Step 510 is a test to determine who disconnects first. The reality is that test 510 and the subsequent steps on each branch coming out of step 510 represents the sequence of events when either the PBX extension or the CO switch goes on-hook. If the extension goes on-hook first, the loop resistance goes high and this fact is detected by the CO in step 512. The CO reacts by transitioning back to the idle state to wait for the next call, as symbolized by block 512. If the CO disconnects first, the CO switch actually does not do anything and just times out or sends a dialtone on the tip and ring lines, as symbolized by block 514. In this case, the PBX does not do anything and hookswitch circuit 192 keeps the loop closed until the PBX times out or detects the dialtone. After time out or detection of the dialtone, the PBX sends a command to the MC telling it to go off-hook. The MC then sends a command to the hookswitch circuit 192 via line 194 (or writing control bits into a control register in some embodiments) ordering it to go off-hook, as symbolized by block 516.

Figure 14:
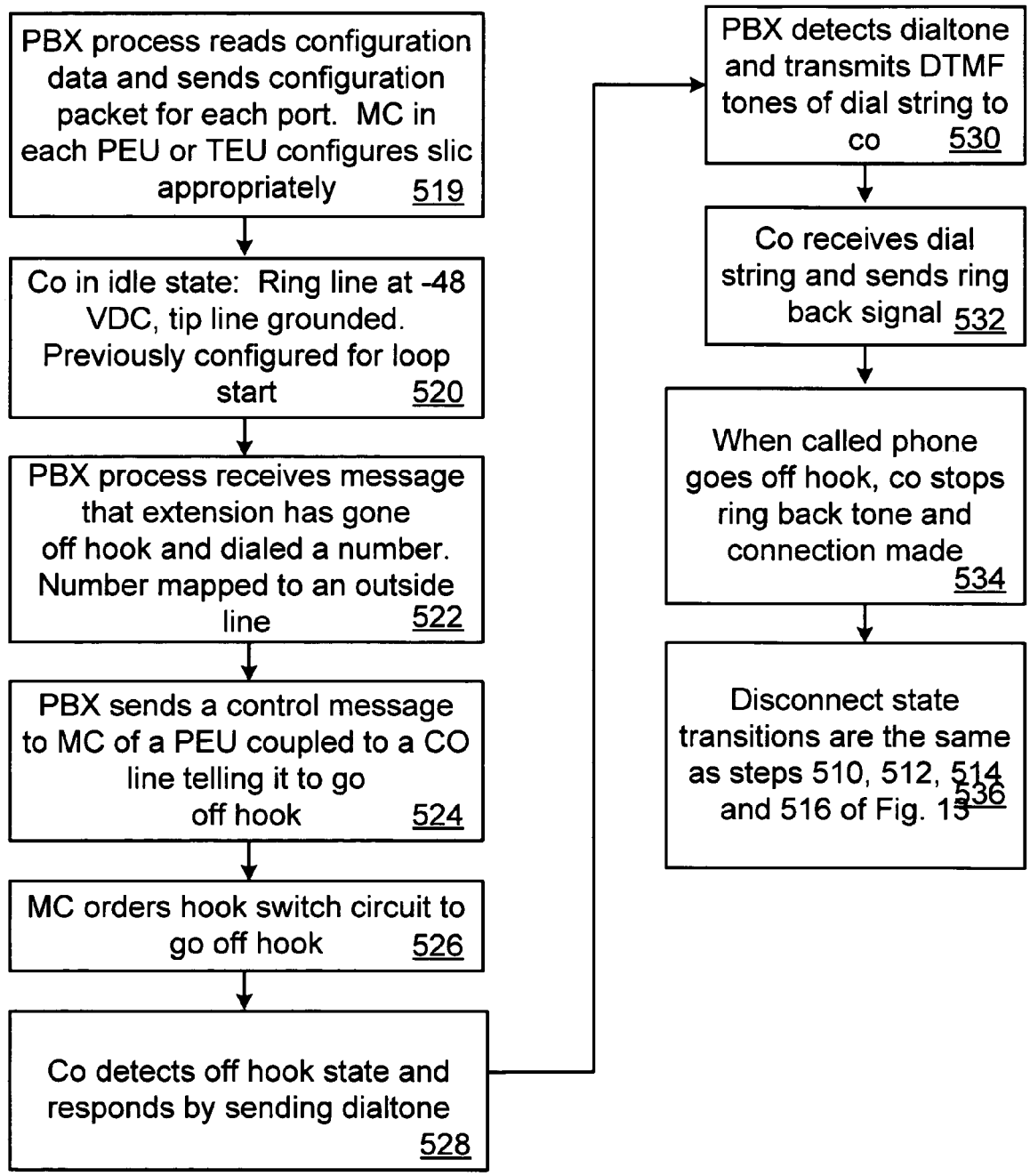
FIG. 14 is flowchart of the preferred processing that occurs between the CO and the PBX of FIG. 1 when the PBX initiates a call on an analog loop start line.

FIG. 14 is a flowchart of the processing between the PBX and the CO on an analog loop start type line where the PBX originates the call. Step 519 represents the same initialization process previously described for step 499 in FIG. 13. Step 520 represents the idle state at the CO where the ring line is held at −48 VDC and the tip line is grounded. Step 520 also represents the step which occurred earlier at startup of reading configuration bits in a control message sent by the PBX process for each analog CO line port which establishes whether the loop start or ground start protocols will be used that particular port. In step 522, the PBX process running on host CPU 14 receives a control message either via the packet bus 54, or, in embodiments with no packet bus, over a control channel on the TDM bus 50, that an extension has gone off-hook and dialed a number. The PBX process attempts to match the dialed number to all of its local extensions and, realizes that the call is to an outside line. In some embodiments, the PBX process simply examines the dial string and determines that it is an outside call from the number of digits dialed or from the dialed digits themselves.

In step 524, the PBX process sends a control message over the packet bus 54 in FIG. 1, or, in embodiments with no packet bus, over a control channel of the TDM bus 50 (dedicated timeslot(s) or via robbed bits) to the microcontroller 92 in FIG. 1 of a PEU 66 that has an available CO line. The control message tells the MC to control the telephone line interface circuit 122 of the available CO line to take the line off-hook. In step 526, the MC responds to this command and activates a control signal or writes control data to the telephone line interface circuit 122 causing its hookswitch control circuit 192 in FIG. 6 to go off-hook. The hookswitch control circuit then closes the tip and ring line loop which lowers the loop resistance. The ground start signalling circuit 188 is disabled by the MC by opening switch 190.

In step 528, the CO detects the low resistance in the loop and determines that the PBX has gone off-hook on that particular loop. The CO responds by sending an analog dial tone signal on the tip and ring lines of that loop.

In step 530, the PBX detects the dialtone and sends the dial string previously received from the extension as DTMF tones. This is done by sending a control message to the MC of the PEU having that port telling it to write DTMF tone data into the buffer of the DSP 102 mapped to the port being used to dial the call.

In step 532, the CO receives the dial string and sends a ring back signal to the PBX indicating the called number is ringing. When the called phone goes off-hook, the CO stops sending the ringback tone and the connection is made, as symbolized by step 534.

Termination of the connection, represented by block 536, is via the same state transitions as shown in steps 510, 512, 514 and 516 of FIG. 14.

Figure 15:
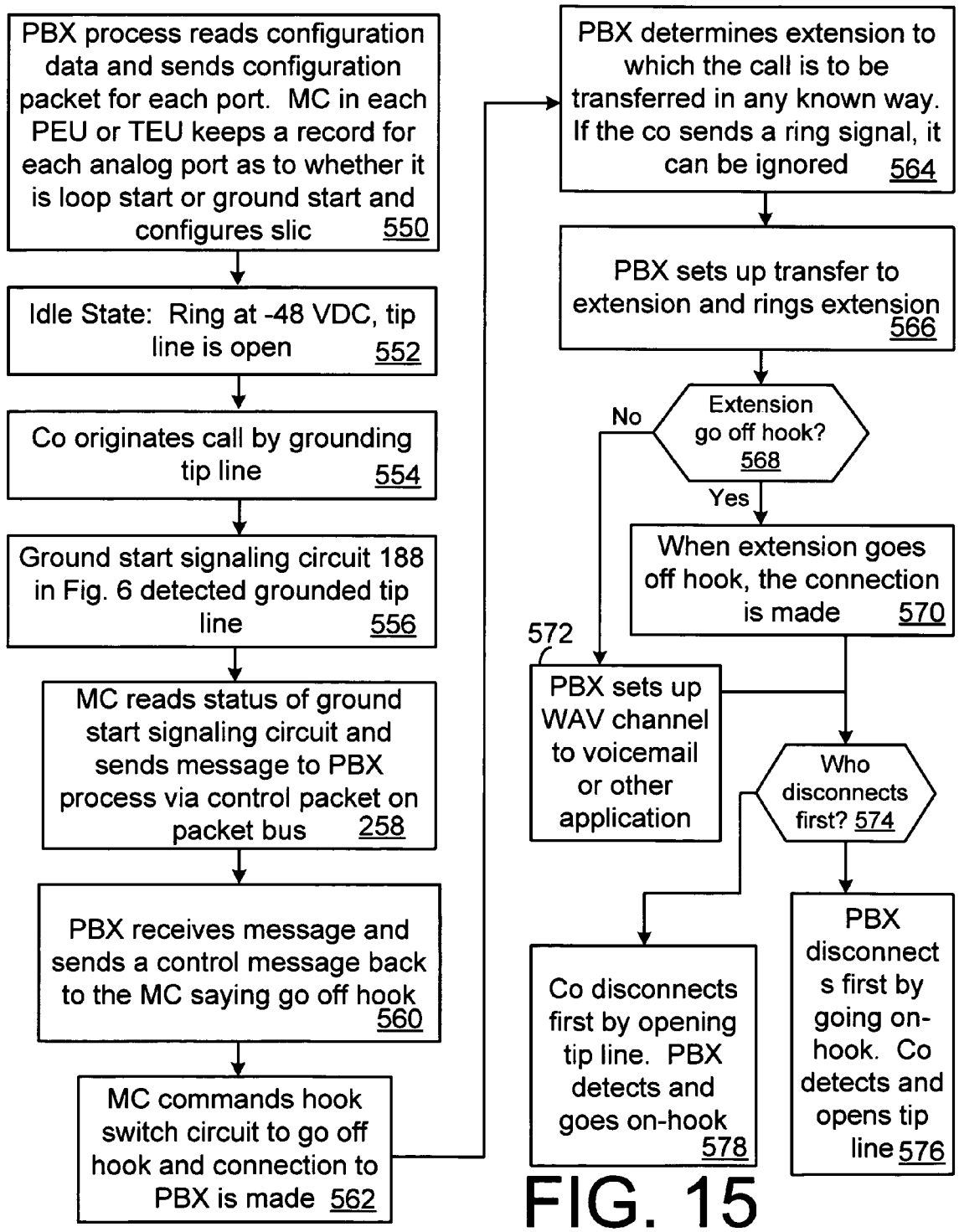
FIG. 15 is a flowchart of the preferred processing that occurs between the CO and the PBX of FIG. 1 on a ground start signalling analog line when the CO originates the call.

Referring to FIG. 15, there is shown a flow diagram of the process that occurs between the CO and the PBX for a ground start signalling protocol on an analog CO line when the CO originates the call. Step 550 represents the same process of initialization to set up each analog port for ground start or loop start signalling protocol by reading configuration bits. Step 550 results in a configuration packet being sent to the MC 2 which causes it to send a command to the ground start signalling circuit 188 in FIG. 6 to enable it or, in some embodiments, close switch 190 to connect the circuit to the tip and ring lines 210. Step 552 represents the idle state wherein the CO switch holds the ring line at −48 VDC and holds the tip line in an open condition.

Step 554 represents the CO originating the call by grounding the tip line. In step 556, the ground start signalling circuit 188 in FIG. 6 detects the grounded tip line with any circuitry capable of detecting this condition.

The MC reads the status of the ground start signalling circuit either by polling or as the result of an interrupt in step 558. The MC then sends a control packet on the packet bus to the PBX process running on host 14 indicating the CO switch wishes to make a connection on a particular CO line port. The PBX process responds by sending back a control packet via the packet bus 54 telling the MC 92 of the PEU connected to the CO port telling it to take the CO line off-hook in step 560. The MC 92 responds in step 562 by sending a command to the hookswitch circuit 192 in FIG. 6 telling it to go off-hook which it then does.

In step 564, the PBX determines which extension to which the call is to be transferred in any known way as described in step 508 of FIG. 13. If the CO sends a ring signal in this protocol, it can be ignored since the PBX already knows the CO wants to make a connection. Step 566 represents the process of the PBX issuing the proper commands to the switching circuitry to cause a connection to be set up over the TDM bus 50 in FIG. 1 between the CO port and the extension to which the call is to be transferred. The PBX process also sends a command packet to the MC telling it to ring the called extension. The MC 92 responds by sending a command to the hook switch or ring signal circuit 192 via control data path 194 causing it to put a ring signal on the extension tip and ring lines.

Step 568 represents the process of determining if the extension went off-hook.

In step 570, the extension goes off-hook to answer the call. The MC detects this fact by polling the loop current detection circuit 196 in FIG. 6 or receiving an interrupt therefrom and sends a control packet so indicating to the PBX process over the packet bus. The PBX stops counting rings or stops its timer so that a transfer to a voicemail or other application process to play a prerecorded message to give the caller more options will not occur.

If the extension phone does not answer after a certain time or a certain number of rings, then process 568 optionally vectors processing to step 572 to record a voicemail message. In some embodiments, the extension phone will simply be allowed to ring until it is answered or the caller gives up. However, in some alternative embodiments, after a predetermined number of rings, the call will be connected via a WAV channel to a voicemail or IVRS application to record a voicemail message or play a menu of other options for the caller. Step 572 represents this alternative embodiment process of setting up a WAV channel between the CO port and an application process. The WAV channel can connect the CO port to a voicemail application process to take a voicemail message or to an integrated voice response (IVRS) application process which plays prerecorded data out the CO port giving the user more options. A flowchart of the process of setting up the WAV channel is given in FIG. 18. The WAV channel transmits packetized play data to the CO port over the packet bus 54 and transmits packetized record data over the packet bus to the application. The advantage of operating in this way is that play and record data do not consume the bandwidth of the TDM bus which is reserved for carrying real time data of ongoing conversations or modem transmissions.

Step 574 represents the start of the process to break the connection. If the PBX disconnects first by going on-hook, the MC 92 of the PEU having the port coupled to the extension phone detects the extension going on-hook when loop current detector 196 in FIG. 6 detects the loss of loop current. The MC sends a message to the PBX process running on host CPU 14 over the packet bus 54 indicating the extension went on-hook. The PBX process responds by sending a packet back to the PEU having the port coupled to the CO line telling it to go on-hook. The MC 92 of this PEU then sends a command to hookswitch circuit 192 ordering it to go on-hook. The CO detects this fact by loss of loop current and opens the tip line, all as symbolized by step 576.

Step 578 represents the process of the CO switch disconnecting first by opening the tip line. The MC 92 of the PEU coupled to CO line detects this fact when the loop current detection circuit 196 in FIG. 6 detects the loss of loop current. The MC sends a message to the PBX process indicating the CO switch has disconnected. The PBX process responds by sending a control packet to the PEU coupled to the extension phone telling it to go on-hook. The MC 92 of that PEU responds by controlling the hookswitch circuit 192 to put the extension phone's port on-hook.

Figure 16:
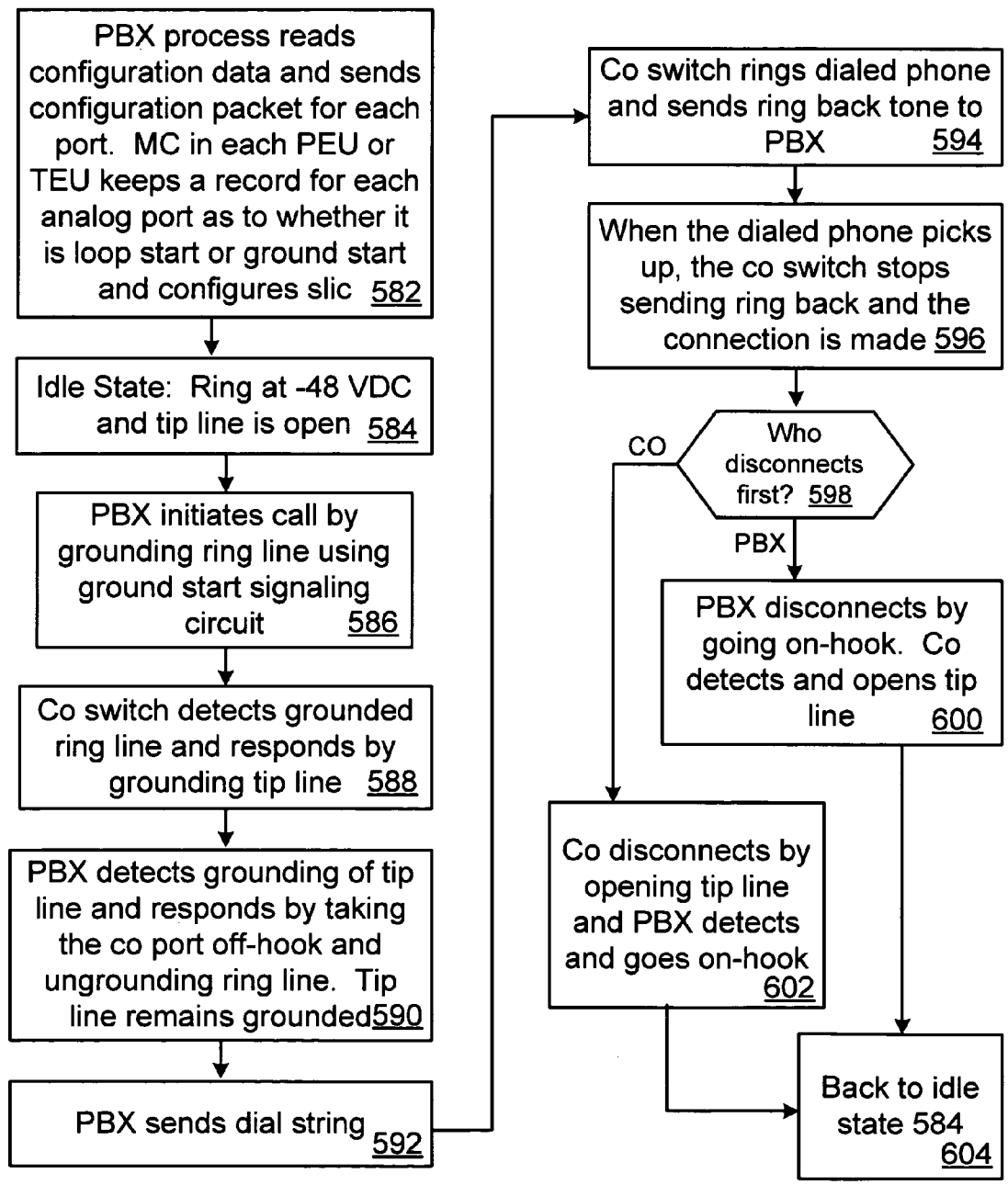
FIG. 16 is a flowchart of the preferred processing that occurs between the CO and the PBX of FIG. 1 on a ground start signalling analog line when the PBX originates the call.

Referring to FIG. 16, there is shown a flowchart of the processing between the CO switch and the PBX for an analog CO line using ground start signalling protocol. Step 582 represents the initial configuration process wherein the PBX process reads the configuration data and sends a configuration packet for each port having an analog CO line or a T1 line to each PEU or TEU. The configuration packet for each port indicates whether ground start or loop start signalling is in effect on the analog port. The MC then responds to the configuration packet by sending a command to the subscriber loop interface circuit of FIG. 6 for each port to enable or disable the ground start signalling circuit 188, as the case may be.

Step 584 represents the idle state before the PBX initiates the call. In this state, the CO switch holds the ring line at −48 VDC and holds the tip line open.

Step 586 represents the initiation of the call by the PBX. Typically, an extension picks up and dials a number. The MC in the PEU detects the extension port going off-hook with the loop current detector and sends a message to the PBX process. The DTMF tones dialed on the extension are detected by the DSP 102 in the PEU and the MC is interrupted. Either the MC interprets the DTMF tone or the DSP does, and the MC retrieves the dialed digits or decides what they were, packetizes them and sends them to the PBX process. The PBX process examines them to determine if they are an outside call, and, if so, picks a free CO line port (the PBX process can also do least cost routing based upon an analysis of the dialed number, the long distance services available and the time of day) and sends a packet to the PEU ordering initiation of the call. This packet is received by the MC which responds by sending a command to the ground start signalling circuit 188 in the SLIC of FIG. 6 coupled to the selected CO line port. This command causes the ground start signalling circuit to ground the ring line.

In step 588, the CO switch detects the grounded ring line and responds by grounding the tip line.

In step 590, the PBX detects the grounding of the tip line using the ground start signalling circuit 188 in the SLIC of the CO port. The MC regularly polls this circuit 188 or the circuit interrupts the MC and the interrupt service routine for this interrupt reads the status of circuit 188. The MC sends a control packet to the PBX process indicating the switch has acknowledged the call initation by the PBX. The PBX process responds by sending a control packet to the PEU of the CO port telling it to take the CO port off-hook and to unground the ring line. The MC 92 of this PEU responds by sending a command to the ground start signalling circuit 188 telling it to unground the ring line and by sending a command to the hook switch circuit 192 telling it to take the CO line off-hook.

In step 592, the PBX sends the dial string by sending a control packet to the PEU containing the dial string. The MC responds by putting data for the DTMF tones of the dial string in the DSP's tone buffer for the CO port. The DSP then sends that data to the port where the A/D converter in CODEC 216 converts the data into DTMF tones which are launched on the tip and ring lines.

In step 594, the CO switch receives the dial string and map it to the proper phone. The CO switch then rings the dialed phone and sends ringback tone to the PBX.

In step 596, when the dialed phone goes off-hook, the CO switch stops sending ringback and the connection is made (possibly to a voice mail application at the location of the dialed phone).

Step 598 represents the start of the process to break the connection. Step 600 represents the process that occurs if the PBX disconnects first. In this case, the extension phone which initiated the call is hung up. The MC in the PEU coupled to the extension senses this fact using the loop current detector 196 in FIG. 6 and sends a control packet to the PBX process informing it that the extension hung up. The PBX process responds by sending a control packet to the PEU coupled to the CO line telling it to go on-hook. The MC in this PEU responds by sending a command to the hook switch circuit 192 telling it to go on-hook. The CO switch senses the loss of loop current and responds by opening the tip line.

Step 602 represents the process that occurs if the CO switch disconnects first which happens when the called phone hangs up first. The CO switch will sense the loss of loop current when the called phone hangs up and will respond by opening the tip line. The ground start signalling circuit 188 detects this fact, and the MC, upon polling the ground start signalling circuit or being interrupted by it, will generate and send a control packet to the PBX process indicating the CO switch hung up. The PBX process will respond by sending a control packet to the PEU coupled to the CO line telling it to go on-hook. The MC in this PEU responds by sending a command to the hook switch circuit 192 to cause it to put the CO line on-hook. After either step 602 or 600, the CO switch and PBX are back in the idle state 584, as represented by step 604.

Figures 7A, 7B:
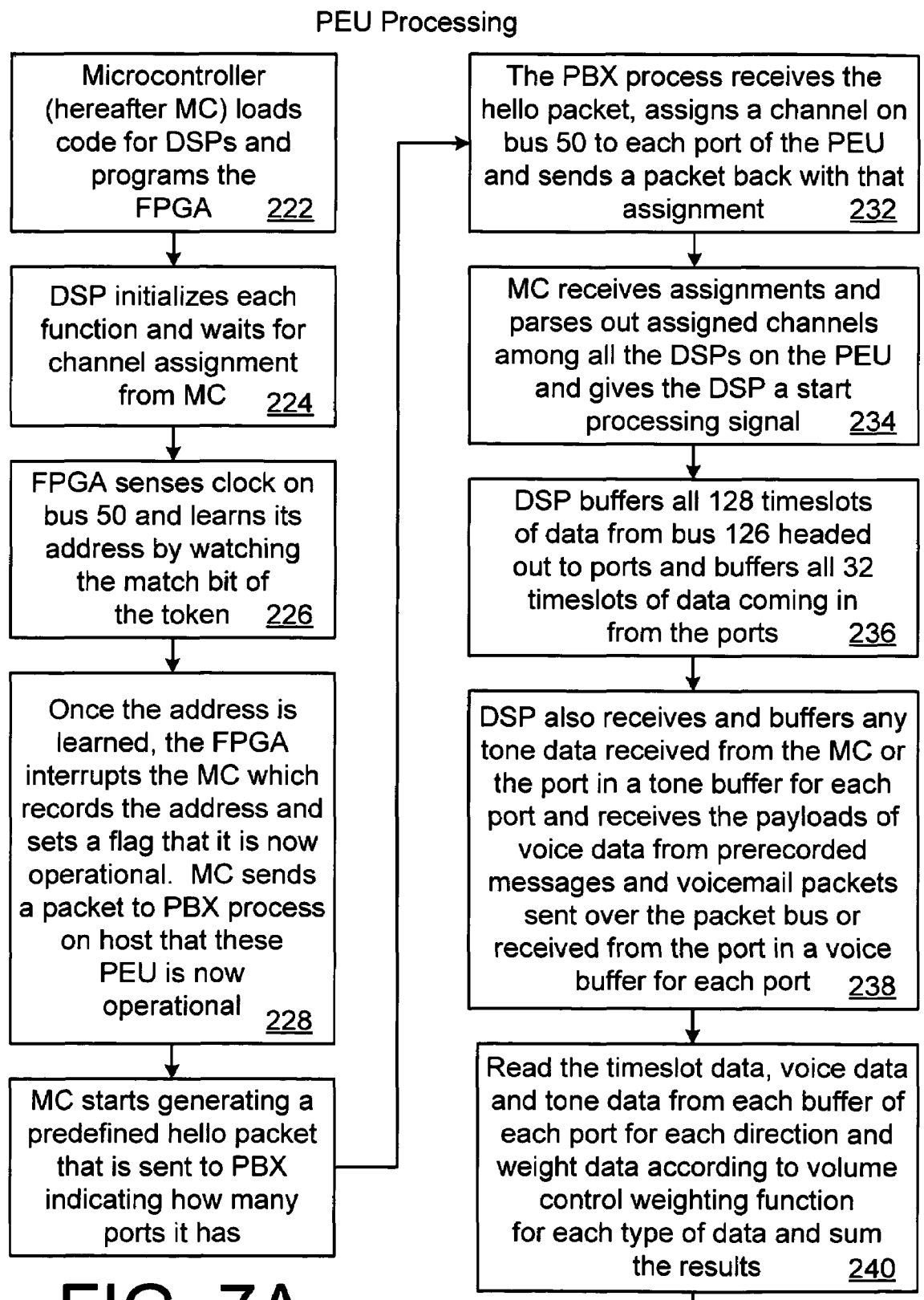
Figure 7B:
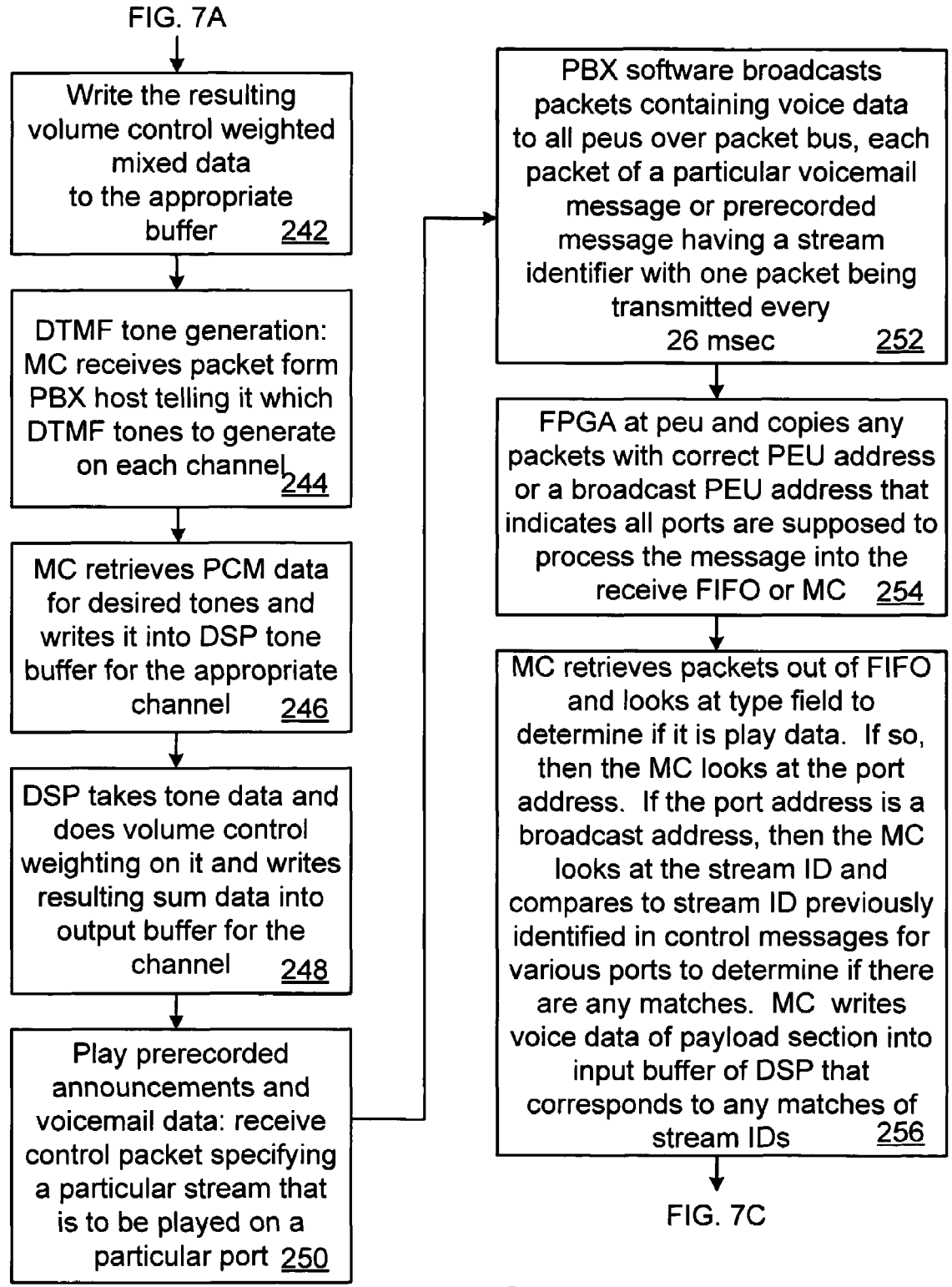
Figure 7D:
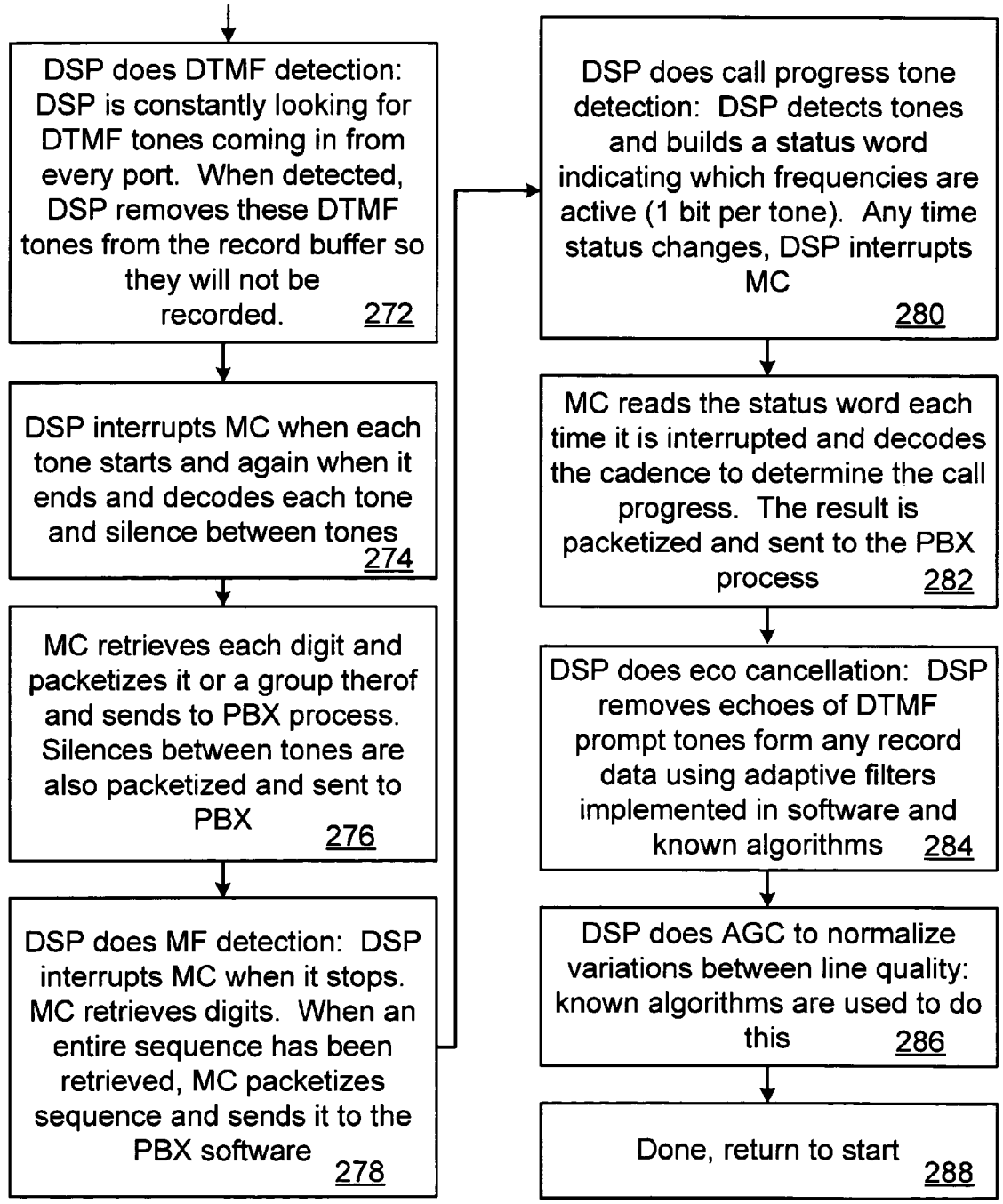

Referring to FIG. 7 (comprised of FIGS. 7A through 7D), there is shown a flowchart for processing that occurs in the PEU by the DSPs and microcontroller to carry out the commands of PBX call control and driver processes running on host 14. Step 222 happens at initialization and represents the microcontroller loading the program code into RAM in the DSPs from the microcontroller ROM. The microcontroller (hereafter MC) then programs the FPGA 104 by by writing programming bits therein. In step 224, the DSP initializes each of its function routines and waits for channel assignment from the MC. The channel assignment is not the channels on the local bus 96 because those are assigned sequentially at startup. The channel assignment is which channels on TDM bus 50 are assigned to carry the data from every port. The PBX process on the host 14 keeps track of which port is assigned to each channel on TDM bus 50. The channel assignment has not yet occurred, but the DSP has started waiting for it.

In step 226, the FPGA listens for the clock on bus 50 and when it detects it, it starts learning its address by watching the match bit of the tokens transmitted to it by the server or other PEUs in the chain.

In step 228, the FPGA interrupts the MC when the FPGA has learned its address. The MC interrupt service routine reads and records the address and sets a flag that the PEU is operational. Each packet travelling in the downstream direction on the packet bus has only a destination address and that destination address can be a broadcast address. The FPGA of the PEU that each packet is addressed to sees an address match and takes the packet off the bus and reassembles it if necessary and writes into a receive FIFO that the MC either constantly polls for new messages or reads in response to an interrupt from the FPGA. The same type process occurs on the switch cards for packets addressed to the host 14.

The MC starts sending a predefined "hello" packet to the PBX process indicating what its PEU address is and how many ports it has in step 230. The PBX process responds in step 232 by assigning a channel on bus 50 to each port of that PEU and sends a packet back to the MC 92 telling it which channels have been assigned to each of its ports. The MC receives the channel assignment packet and parses out the assigned channels among the DSPs on the PEU in step 234. The MC then gives the DSP a start signal to cause it to start all its processing routines.

The processing performed by the DSPs involves routines that: generate and detect DTMF tones and MF DID signalling and call progress tones; do mixing of data from different sources and volume control weighting of the data; play prerecorded messages and recorded voicemail messages out to the ports or CO lines; record of voicemail messages; decoding of caller ID data; echo cancellation and automatic gain control functions. These routines are called either periodically or upon software interrupts in some embodiments. In the preferred embodiment, all processes are performed on a continuous basis as each is called on round robin basis from the main loop during every frame even if there is no data for a particular routine to process. In other words, all the functions that the DSP performs are performed for every channel during every frame. These processes will be discussed sequentially even though they may not occur in the sequence given in the flowchart in some embodiments. In alternative embodiments, each process will be called only when there is data for it to process.

Step 236 represents the beginning of the re-timing and data transfer process and the volume control and mixing process. This is a process which takes data from all 128 timeslots on the bus 126 in FIG. 5 and data from the packet bus directed to various ports and performs a volume control weighting function on the data and mixes it and writes it out onto the appropriate timeslot of the local bus 96. Step 236 represents the process of buffering all 128 timeslots of data from bus 126 in FIG. 5 headed for the ports, and the process of buffering all 32 timeslots of data from local bus 96 headed for the switch cards. The DSP has or is coupled to RAM with a buffer space for each of the 128 inbound timeslots from bus 126 as well as a buffer space for each of the 128 outbound timeslots. Likewise, a buffer space exists in the DSP or in RAM outside the DSP for each of the 32 inbound timeslots and the 32 outbound timeslots of bus 96. The DSP also has a tone buffer for each port to receive data from the MC representing DTMF tones and multifrequency tones for signalling. It also has a buffer for each port it services for voice mail data and outgoing announcement data received from the host via the packet bus.

When data is written into any of the buffers for an outbound timeslot, the circuitry of the DSP automatically writes that data into the corresponding timeslot of the corresponding bus using the frame sync signal for that bus to keep track of the timeslots and get the data into the proper timeslot. The PEUs of the invention are different than the prior art though in that each is coupled to the switch cards by both a packet bus and a TDM bus. The packet bus can carry voicemail message data and prerecorded message data that needs to be played out to a port. In addition, certain call progress tones need to be played out to either the CO line or an extension phone at certains times in a call. For example, when an incoming call comes in on a CO line and the PBX directs it to an extension phone, the extension phone must be caused to ring and "ringback" tone must be sent out the CO port so the caller knows the extension phone is ringing. Likewise, in integrated voice response applications, a prerecorded message giving a menu of options may be played to a user and the user enters a DTMF tone to respond. In such a situation, the user's phone plays the DTMF tones he enters back as a sidetone, but the volume of the outgoing menu message must be kept loud enough so that the sidetone DTMF tones do not drown out the menu message. Likewise, when a user picks up an extension phone and dials out certain DTMF tones, those tones must be played out on the CO line loudly so the CO switch can properly detect what they are.

The PEUs of the invention are unique in that the DSP that services each port can do a volume control function specifically for that port for both the inbound and outbound directions based upon the call situation for that particular port for that particular time. The DSP does this by reading all the timeslot data, announcement or voicemail data and tone data going in each direction, weights each with an appropriate weighting function, sums the resulting data and writes it out the appropriate outbound timeslot's buffer. The process of buffering the outbound and inbound timeslot data for each port is represented by step 236. The process of receiving any tone data from the MC directed to a particular port and buffering it in that port's tone buffer and receiving any incoming tone data from the port and buffering it is represented by step 238. Step 238 also represents the process of receiving the payload sections of data from packets bearing outbound prerecorded message data or voicemail messages and buffering it in an outbound voice buffer and receiving any inbound voice data to be recorded as a voicemail message or to record a conversation in real time is also represented by step 238. Step 240 represents the volume control process of reading the data from each of the sources in each direction, multiplying the data values by a volume control multiplier, and summing the results. Step 242 represents the process of writing the volume control weighted data out to the output buffer that is mapped to the appropriate timeslot on the local bus 96 for traffic out to the port of bus 126 for traffic headed toward the switch card. As soon as the data is written into the output buffer, the hardware of the DSP automatically puts it on the bus in the appropriate timeslot.

Step 244 represents the start of the process of DTMF tone generation wherein the microcontroller receives a packet from the PBX software telling it which DTMF tones to generate for each channel. In step 246, the microcontroller retrieves from its ROM or some other nonvolatile memory the PCM data for the DTMF tones and writes that data into the tone buffer in the DSP corresponding to the channel on which the DTMF tones are to be played. In alternative embodiments, the MC can simply send a message to the DSP telling it which DTMF tones need to be generated on each channel. This is better because the set of possible tones that can be generated is not limited. The DSP can then retrieve the appropriate data that encodes such DTMF tones from its own ROM or other nonvolatile memory and writes into the tone buffer. The DSP then does a volume control weighting function on the tone data with any other data to be played out on the port and writes the resulting sum data into the output buffer for that port which causes the data to be put on the timeslot for that port, as symbolized by step 248.

Step 250 represents the beginning of the play data process that is carried out to play precorded announcements, pages, and voicemail messages out to extension phones or to the CO lines. The first thing that happens is a control packet is received by the MC from the PBX software that specifies a particular stream of data is to be played on a particular port, with the particular stream identified by a stream ID.

Step 252 represents the process carried out by the PBX software on the host to broadcast packets on the packet bus 54 to all PEUs every 26 milliseconds. All packets contain PEU destination addresses, but one of the PEU destination addresses is defined as a broadcast address and all PEU FPGAs will pass such a packet on These packets contain digital data encoding prerecorded voice such as voicemail, outgoing announcements of IVRS systems or live voice pages. The 26 millisecond interval, or some other similarly short interval, is important to prevent noticeable delays in the voice being generated by the CODEC at the port. It is necessary to use a packet size and transmission interval which are short enough such that, considering the latency caused by delays as data propagates through various software layers on the host and through the PEU software and hardware that there be no noticeable delay in the sounds being generated at the port for best performance.

In step 254, the FPGA 104 of every PEU looks at every packet arriving on the packet bus and culls out only those with the PEU addresses which match the address of the PEU or which is a broadcast address. All such packets get copied into the receive FIFO of the MC.

The MC retrieves the packets out of the FIFO in step 256 and looks at the type field. If the type is play data, then the MC looks at the port address. Each packet has a PEU address and a port address. One PEU address is defined for broadcast and one port address is defined for broadcast. If the port address is broadcast, then the MC looks at the stream ID. If the stream ID matches the stream IDs given in any of the previously received control packets, the MC strips out the mu law voice data of the payload section and writes it into an input buffer(s) of the DSP that corresponds to the ports having any matches in the stream ID or IDs given in the previous control packets.

Step 258 is the process that happens if the port address is not a broadcast address.

In that case, the MC just strips out the payload data and writes it into the input buffer of the DSP that corresponds to the port identified in the port address of the packet. In alternative embodiments, the voice mail packets can be directly addressed in the port address field to only the ports to which they are being played. In another alternative embodiment, instead of copying the entire payload section into the input buffer of all the ports on which the voice data is to be played, the MC can simply strip out the payload section and write it into shared memory with the DSP and then write a pointer to the data into a pointer store in the DSP for each channel on which the voice data is to be played. Broadcast works best because the play data function is also used to play music on hold or promotional tapes to all CO and extension ports on hold, which in a large system can be a fairly large number of ports.

In step 260, the DSP reads the voice data written into its packet data buffer for each port by the MC and does volume control weighting and mixing with any data off the TDM bus 126 bound for the same port (stored in the DSP TDM buffer for that channel) and any tone data in the tone data buffer, e.g., call waiting tones, to be played on the port and sums the resulting weighted data. The results are then written into the output buffer(s) of all ports on which the voice data is to be played. The particular volume control settings for each direction are set by the PBX software on the basis of requests made by the users by, for example, pushing buttons on her phone.

Step 262 represents the beginning of the recording process. The DSP receives data coming in from the port via the local bus and stores it in a TDM input buffer. TDM data going out to the port is stored in a TDM output buffer. The DSP volume control process reads the TDM data going in each direction in a volume control process for each direction. The volume control process also reads packet data and tone data going in each direction from their respective buffers. Each set of data going in each direction is multiplied by a volume control weighting function and the resulting weighted data is summed. The weighting functions are set by the PBX software on the basis of functions requested by the user.

In step 264, the resulting summed data is written into a record buffer. Once 208 bytes of record data has been accumulated in the record buffer (208 frames), the DSP interrupts the MC and which executes an interrupt service routine. The service routine reads the record buffer data, packetizes it in a packet to be sent to the PBX software and writes it into a transmit FIFO. The FPGA then takes the packet out of the transmit FIFO and transmits it over the packet bus. At the server, the FPGA 46 receives the packet and writes it into a FIFO for the driver software running on the host 14. The driver software takes the packet out of the FIFO and passes it up through the software layers to the process responsible for recording messages or conversations where the payload data is written into a file on the hard disk 16.

The recording and playing of data can be occurring simultaneously.

Step 266 represents the start of the caller ID detection process. The MC is constantly polling the ring detectors 214 in each telephone interface circuit, e.g., 122 in FIG. 1, for every port. In the meantime, the DSP is constantly looking for incoming caller ID data from all ports. Caller ID data is sent as a 1200 baud modem signal from the CO between the first and second ring. When the MC detects the first ring on a CO port, it sets a status in the DSP to start transferring caller ID data to the PBX software.

In step 268, when the DSP has decoded one byte of caller ID data, it interrupts the MC. The MC retrieves the caller ID data and accumulates it by port. When it has received all the CID data for that call, it verifies the checksum. If the caller ID data is correctly received, the MC packetizes it and sends it to the PBX process. The PBX process maintains an object in memory for every call. An object is a small program with an associated data structure that records data defining the attributes of the entity to which the object pertains. The attribute data is updated with the caller ID data, in step 270. The configuration data can be setup to cause the PBX process to automatically route the call to a particular extension based upon the caller ID data without the caller having to dial the extension. Regardless of how the configuration data is setup, the PBX software process always displays the caller ID data by sending it out to the extension phone which the PBX connects to the CO port. This can be done by packetizing the caller ID data and sending it back to the MC with a command in that packet or another packet telling it to send the data to the extension phone via a PCOM digital communication via pair 218 in FIG. 6. In alternative embodiment, the MC may retain the caller ID data in memory after it is sent to the PBX, and the PBX just sends a command packet telling the MC to send that caller ID data to a particular extension phone via the PCOM digital communication interface.

Step 272 represents the process of DTMF tone detection. The DSP is constantly looking for DTMF tones from every port. When DTMF tones are detected, the DSP examines the record buffer and removes these DTMF tones (or mimics thereof) from the record buffer to prevent any DTMF tones appearing in, for example, voicemail recordings or recordings of conversations. This is an optional step, but is preferred since an unintended DTMF tone in a recording can cause unintended results such as deleting the voicemail message at the moment in time when a DTMF tone that means delete in the voicemail context occurs even if the user has not fully listened to the message. This process is done the same way as it was done in the legacy VS1 product and as described in U.S. patent application Ser. No. 09/019,193, filed Feb. 5, 1998, which is hereby incorporated by reference.

Step 274 represents the process of the DSP interrupting the MC when each tone starts and when it stops and decoding each tone including the silence between tones.

When a particular tone is starting, the DSP interrupts the MC with an interrupt that says for example, "a 1 is starting". When the tone stops, another interrupt occurs which says "the tone is stopping and nothing is being detected. The MC responds to these interrupts by retrieving each decoded digits and the representation of silence and packetizing these digits one by one or as a complete seqence and sending them or it to the PBX process in step 276.

Step 278 represents the start of the MF tone detection process. MF tones are like DTMF tones and are used for various signalling functions. For example, on T1 lines, MF tones are used for Automatic Number Signalling which is caller ID on T1 service and for a service that is like Direct Inward Dialing on POTS lines. The DSP interrupts the MC each time an MF tone starts and when it stops. The MC retrieves each digit, and when a complete sequence has been retrieved, it packetizes the sequence and sends it to the PBX process. In alternative embodiments, the MC can packetize each digit and send it individually to the PBX process.

Steps 280 and 282 represent the process of call progress tone detection. The DSP detects which tones are being generated and builds a status word with one bit per tone set.

Any time the status word changes, the DSP interrupts the MC which reads the status word and decodes the cadence of the tones to determine where the system is in the call. Combinations of tones mean different things. For example, a combination of 440 Hz and 480 Hz is ringback, and 440 and 350 signal dialtone and 620 and 480 is a busy signal. Each has its own cadence. Once the status of the call is determined by the MC, a packet indicating the current state of the call is sent back to the PBX process.

Step 284 represents the optional but preferred step of echo cancellation carried out by the DSPs in each PEU. When recording voicemail messages for example, it is not desired to record echoes of DTMF tones generated by the PBX system for prompts while the user is speaking since such DTMF tones in the recorded message can cause unintended results.

Telephone lines are not perfectly terminated always, and an outgoing DTMF prompt can be reflected off an impedance mismatch and come back to the PEU while the caller is recording his message and get into the recorded data. Step 284 prevents this from happening. Removing DTMF tones from recorded data was done in the legacy VS1 system and the details thereof are incorporated by reference. Basically, the DSP uses known algorithms to implement adaptive filters set to filter out DTMF tones.

Step 286 represents the process of performing automatic gain control carried out by the DSP. This is done to normalize variations between line quality and is done using known algorithms in a known way.

Step 288 represents the end of the main loop and return to the top of the loop.

Figure 8A:
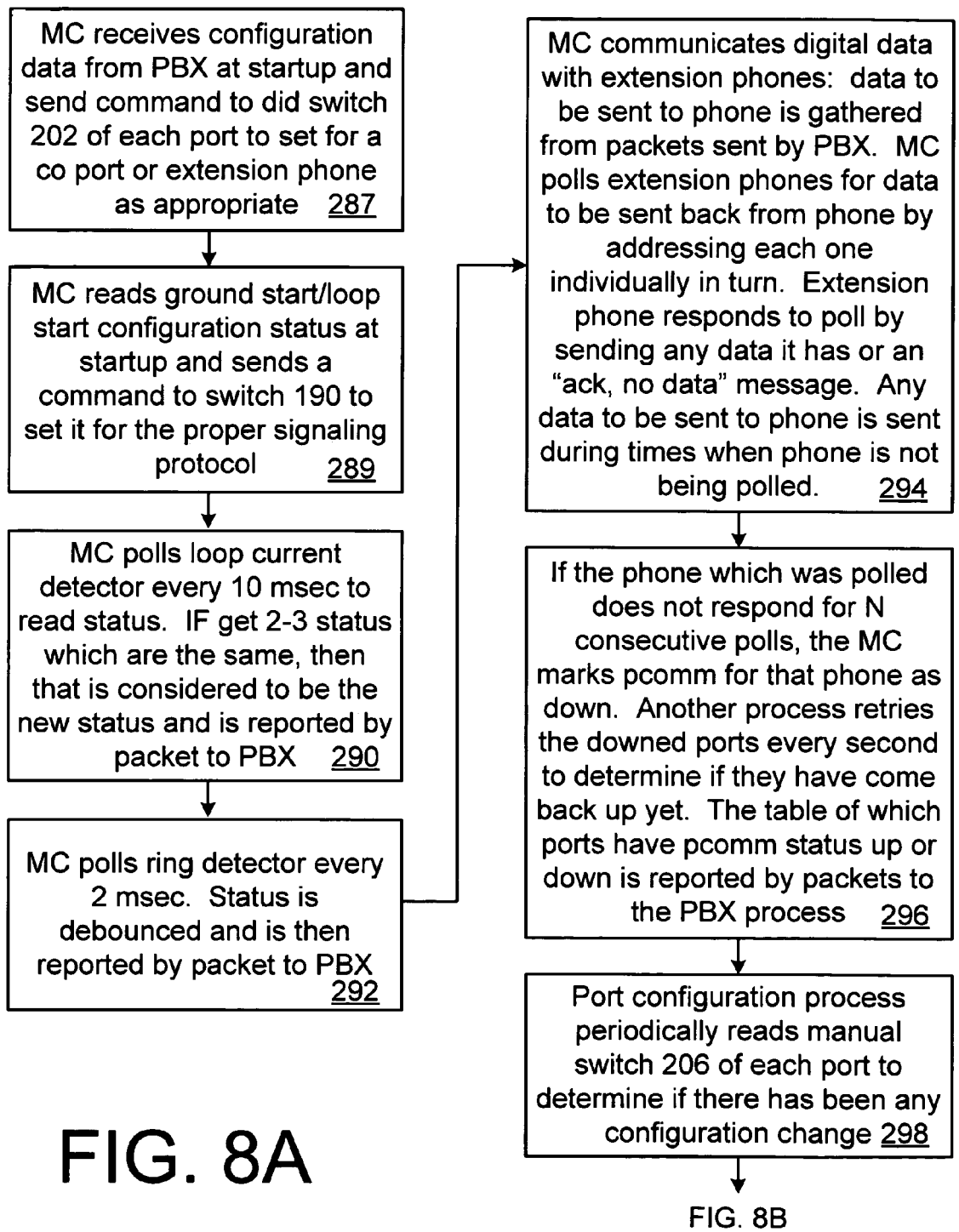
Figure 8C:
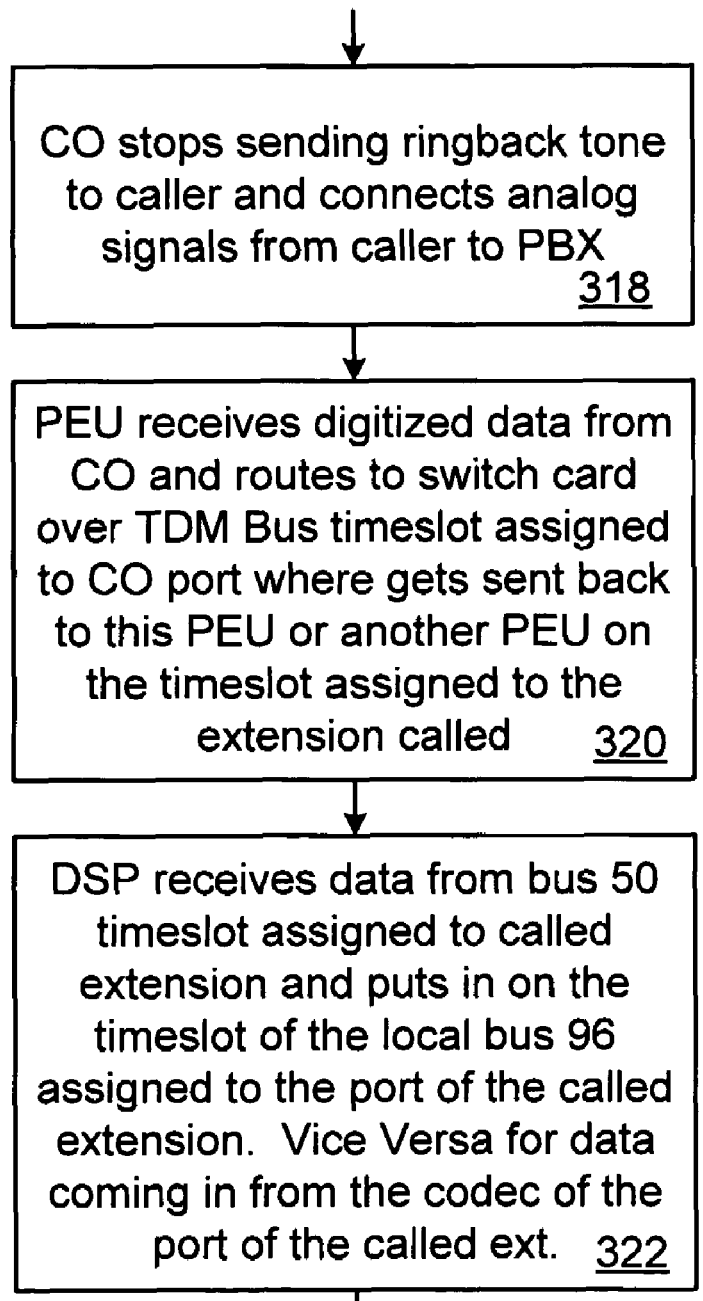

Referring to FIG. 8, comprises of FIGS. 8A through 8C, there is shown a flowchart of the process the MC carries out to interface with the telephone line interface circuits such as 122 in FIG. 1. Step 287 represents the process of reading configuration data sent to the MC from the PBX at startup time and setting DID switch 202 (FIG. 6) in the telephone interface 122 (FIG. 1) as appropriate. Each port has a switch 206 that is manually manipulated by the installer when the system is set up that tells whether a port is coupled to a CO line or an extension phone. The MC has a process which periodically reads this switch to determine the configuration of each port. This process sends a configuration packet for each port to the DSP which records that data. In alternative embodiments, the DSP need not send back the configuration data packets to the MC because it already knows the configuration of the ports. The DID switch must be in a position to couple the current feed circuit 200 to the transformer 204 when the port is coupled to a CO line to support DID signalling. In certain forms of DID, the PBX signals that it is ready to receive the call by sending loop current back to the CO with the tip voltage polarity reversed from negative to positive 48 volts relative to ring by tip and ring reversal circuit 186. If the port is coupled to an extension phone, switch 202 is set by the MC so that the current feed circuit is no coupled to the transformer.

Step 289 represents the process of reading the configuration data sent by the PBX process indicating whether ground start or loop start or wink start signalling protocol is in effect and sending a command to switch 190 in FIG. 6 to set it appropriately. If the ground start signalling protocol is in effect, the MC sends a command to set switch 190 to connect the ground start signalling circuit 188 to connect it to bus 210 so that the ground start protocol signals can be detected. The MC reads the status of these ground start protocol signals via bus 212.

Step 290 represents the process of polling the loop current detector 196 in FIG. 6 every 10 milliseconds. If the same status is found on 2–3 consecutive polls, then the status has been "debounced" and that will be considered to be the new loop current status. In alternative embodiments, interrupts or any other communication mechanism can be used to get the status to the MC.

Step 292 represents the process of polling the ring detector 214. The status is debounced by sampling every 2 msec for multiple 70 msec intervals (70 msec exceeds the slowest ring period by 3 msec). If two consecutive 70 msec periods show a ring signal present (as determined by a count of the number of samples above a certain magnitude greater than a threshold), a ringing status is assumed and reported to the PBX by a packet.

Step 294 represents the PCOMM process of sending digital data such as caller ID data to extension phones capable of receiving and transmitting digital data over bus 218 in FIG. 6. Data to be sent to the phones is collected from the payload sections of packets sent by the PBX process. Data going to the phone is transmitted to the phone over bus 218 during times when the phone is not being polled for data to be sent from the phone. Bus 218 is only half duplex, so reception of data from the phones, such as which function keys were pressed, is done by a polling process. Each phone known to the MC to be operable and PCOM capable (regular analog only phones may also be connected to the ports) is individually addressed (a single character that the phone understands to be a poll) and that poll acts as a permission to send. If a phone has data to send back, it does so in response to the poll. If not, it sends back an "ack, no data" message to indicate it is still up but has no data. In alternative embodiments, the bus 218 may be full duplex and be a TDMA bus or packet bus with the MC buffering data from all the phones sent either during their respective timeslots or via packets addressed to the MC.

Step 296 represents a process of monitoring PCOM status and reporting it to the PBX. If a phone does not respond to its poll for N consecutive polling periods, its its PCOM status is marked as down in a table maintained by the MC and reported periodically (or every time the table changes in some embodiments) to the PBX process by one or more packets. Another process in the MC tries to reestablish contact with the downed phones every second to see if they have come back up. If they have, their status is marked as "up" in the table. In the preferred embodiment, the table is reported on a port by port basis.

Step 298 represents a process which executes periodically to read the manual switch 206 on every port to determine if it is coupled to a CO line or to an extension phone. If any change has been made to a port, a packet is put together by the MC and sent to the PBX process in step 300. The status of a port determines what happens when the command on line 194 from the MC is activated in response to a command packet from the PBX process. If the port is coupled to a CO line, when a packet arrives from the PBX saying "go off-hook", line 194 is activated and this causes the hookswitch or ring signal circuit 192 to close the loop thereby causing an off-hook status. If the port is coupled to an extension phone, when a command packet saying "ring the extension phone" is received from the PBX, line 194 is activated thereby causing circuit 192 to send a ring signal to the extension phone at the cadence specified in the control packet sent from the PBX.

Step 302 represents the process of monitoring all CO ports configured by DID for the existence of an incoming DID call. This is done by the MC by monitoring the loop current detector's status and the ring detector's status. When the CO is ready to send a DID call, it sends loop current but does not send the ring signal. When the MC detects this status, it sends a command to the tip and ring reversal circuit 186 to cause it to reverse the polarity of the tip voltage to +48 volts relative to ring in step 304. This signals the CO that the PBX is ready to receive the digits of the dialed number. The MC then sends a control packet to the PBX indicating there is a DID call inbound.

Step 306 represents the process of the CO sending the dialed digits as DTMF tones. The DSP detects each DTMF tone and interrupts the MC which reads each tone as it starts and packetizes the digit the tone represents and sends it to the PBX process.

Step 308 is the PBX process receiving the dialed digits and mapping them to the extension phone assigned to that dialed number. The PBX process then sends a command packet addressed to the appropriate PEU and the appropriate port saying "ring port x". In step 310, the MC activates line 194 in FIG. 6 to cause the ring signal circuit 192 to start sending the ring signal to the extension phone named in the control packet at the cadence named in the control packet.

In step 314, the PBX process sends back a control packet to the MC instructing it to answer the call and sends the proper control signals to the proper switch card(s) to set up the switch connection between the CO port and the extension port.

To answer the call, the MC deactivates the Reverse command on line 198 in FIG. 6 to cause the tip and ring reversal circuit 186 to reverse the polarity on the tip and ring lines to signal the CO that the call has been answered by the extension phone, as symbolized by step 316.

In step 318, the CO stop sending ringback tone to the DID caller and and connects the analog signals from the caller to the PBX where they are coupled to the extension phone. Steps 320 and 322 represents the process of the analog signals arriving at the port of the PEU coupled to the CO line, digitizing it and putting the data on the timeslot of the TDM bus 50 assigned to that CO port. At the switch card, this data gets transferred to the timeslot assigned to port of the called extension and gets sent back to the PEU having that port where it gets put on the timeslot of the local TDM bus 96 assigned to the port of the called extension. The data is then converted back to an analog signal and output to the extension on pair 180. Incoming analog signals from the called extension make the reverse trip to the CO port in the same way using the timeslots on local bus 96 and bus 50 assigned to the called extension and the CO port.

PEU Processing for an Outgoing Call

Figures 9A, 9B:
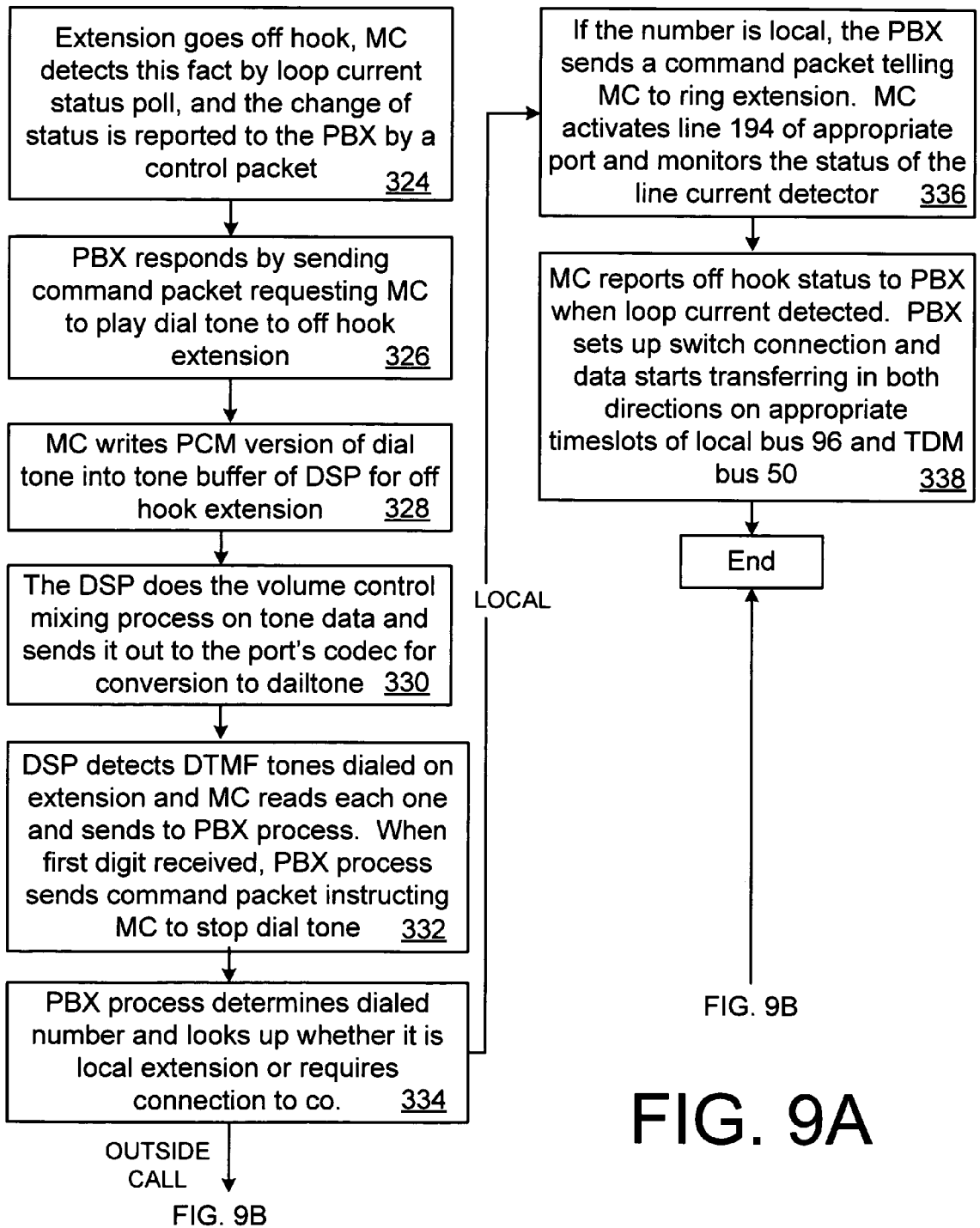
FIGS. 9A through 9B are a flowchart of the process the microcontroller in each port expansion unit carries out to interface with the telephone line interface circuits such as 122 in FIG. 1 for an outgoing call.
Figure 9B:
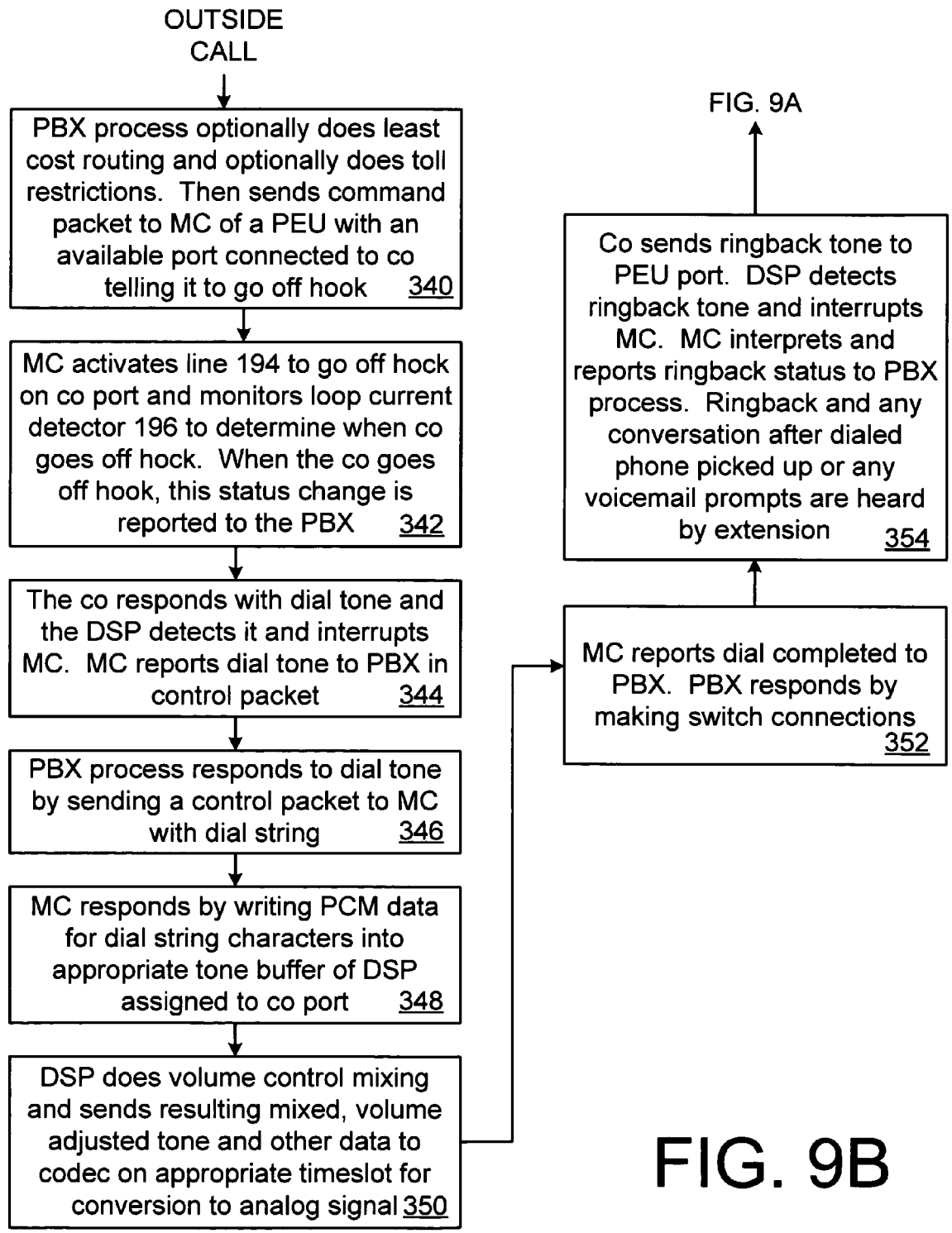

Referring to FIG. 9, comprised of FIGS. 9A and 9B, there is shown a flowchart of the PEU processing for an outgoing phone call placed from an extension phone coupled to the PBX. When an extension phone goes off-hook, the regular polling of the loop current detectors of all ports by the MC detects the changed status and reports it to the PBX by a control packet in step 324. In step 326, the PBX process responds by sending a control packet to the MC requesting the MC to play dialtone to the off-hook extension. In step 328, the MC writes PCM data for a dialtone into the tone buffer of the DSP assigned to the off-hook extension. In step 330, the DSP does the volume control mixing process on the dialtone data and sends it out to the codec for conversion to dialtone analog signals.

In step 332, the DSP detects DTMF digits dialed on the extension phone and interrupts the MC in the manner described above. The MC retrieves the digits and sends them to the PBX process which responds to receipt of the first one by sending a control packet to the MC requesting cessation of the dialtone.

Step 334 represents the process carried out in the PBX process or determining the dialed number and looking up whether it is a local extension or requires a connection to the CO.

If the dialed number is local, the PBX process sends a command packet telling the MC to ring the dialed extension in step 336. The MC responds by activating line 194 in FIG. 6 for the appropriate port to cause the ring signal to be sent. In some embodiments, the cadence is different for inside calls as opposed to calls from the outside. The MC then monitors the status of the loop current detector for that port to determine when and if the extension goes off-hook.

In step 338, the MC reports off-hook status to the PBX process when loop current is detected. The PBX process responds by setting up the switch connections and data starts transferring in both directions between the extension phones in the appropriate timeslots.

If the dialed number requires a connection to the CO switch, processing vectors out of step 334 to step 340. There, the PBX process optionally does least cost routing and optionally does toll restrictions. Least cost routing is the process of picking a CO connection that will be cheapest for the destination of the call. For example, some companies have leased lines to their subsidiaries in other states. Other companies have different rates for T1 service than POTS service and one or the other may be cheaper for certain destinations. Likewise, different CO lines may have different long distance carrier with different intralata, interlata or out-of-state rates at different times of day so the PBX process takes all factors into consideration and picks the port with the cheapest service at that time for that called destination. Toll restrictions can be applied to certain extensions such as lobby or conference phones to prevent abuse by making unauthorized long distance calls.

The MC responds by activating line 194 to cause the hook switch circuit 192 to take the CO port off-hook in step 342. The MC continues to monitor the loop current detector 196 via polling to determine when the CO has gone off-hook as indicated by the presence of loop current. When the CO goes off-hook, this status is reported to the PBX process.

The CO responds with dialtone, and in step 344, the DSP detects the dialtone and interrupts the MC. The MC reports the dialtone to the PBX via a control packet.

In step 346, the PBX process responds to the dialtone by sending a control packet with a dial string to the MC. The dial string includes the number dialed and may include the area code, a 9 prefix, a pause, prefix numbers, 10-10-xxx numbers, credit card numbers and long distance carrier access numbers. The MC responds in step 348 by writing PCM data for numbers in dial string into appropriate tone buffer of appropriate DSP.

In step 350, the DSP responds by mixing the tone data with any other data to be played out on the CO port and doing volume control adjustments. The resulting data is sent to the codec of the CO port and played to the CO as an analog signal. The MC reports completion of dialing in step 352 to the PBX. The PBX process responds by writing the appropriate switching bits to couple the extension port to the CO port.

In step 354, the CO sends a ringback tone to the PEU. This ringback is detected by the DSP which interrupts the MC. The MC interprets the tone and sends a status packet to the PBX saying ringback detected. The ringback tone and any conversation after the dialed phone is picked up or any voicemail prompts are heard by extension.

Figure 10B:
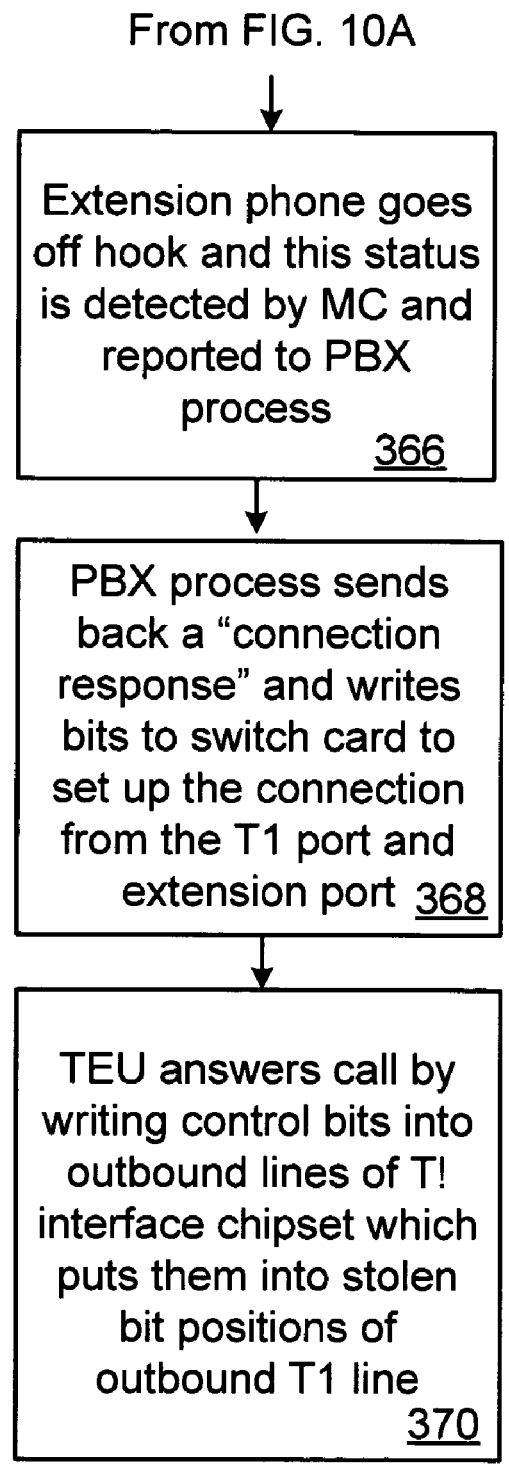

Referring to FIG. 10, comprised of FIGS. 10A and 10B, there is shown a flowchart of the processing of a TEU for incoming T1 calls. A TEU serves the same function as a PEU but for T1 and ISDN digital service port or ports. In the claims, the phrase "port expansion unit" will be used to collectively refer to both PEUs and TEUs. The physical circuitry of a TEU for T1 ports and ISDN ports is the same. The difference between T1 and ISDN services is in how the TEU detects incoming calls and does signalling with the CO. A T1 line has 24 timeslots per frame with 8000 frames per second with 8 bits per timeslot. Signalling between the CO and the PBX is accomplished by stealing some of the bits in each frame of a channel's timeslots to signal such things as off-hook, ringing etc. In ISDN, there are 24 timeslots per frame and 23 timeslots of every frame are used to send digitized voice data and the 24th timeslot of every frame is used to send the signalling bits pertaining to all the other channels. There are two different types of ISDN, one of which is referred to as PRI. The PBX system disclosed herein supports PRI. The control of the MC, in the preferred embodiment, is done by commercially available software called TS Link 3 and Multi PRI with the Euro ISDN ETSI PRI and Robbed Bit T1 upgrades. This software may be obtained from Telesoft International in Collierville, Tenn. The flowcharts given below for T1 inbound and outbound calls is an alternative embodiment.

Typically, each TEU can service two T1 ports or ISDN ports. The T1/ISDN interface chips 98 strip out the signalling bits from the T1 or ISDN frames coming in from the CO and puts them on signal bit lines which are monitored by the MC 94 in FIG. 1. Step 360 in FIG. 10 represents the beginning of the loop start signalling protocol. Step 360 is the process of the MC constantly polling the interface chips 98 to read the signal bit lines for changes in status. If a ground start protocol is being used, step 380 is performed wherein the MC detects ringing by polling the signalling bits output by the T1/ISDN interface circuit 98. If a wink start protocol is in use, the MC polls the signalling bit outputs of the T/ISDN interface circuit 98 to detect an off-hook condition in step 400.

Step 362 represents the process by the TEU of sending the incoming connection control packet to the PBX in the loop start protocol. This packet tells the PBX that there is an incoming T1 call that is ringing and includes any dialed characters that were detectd by the DSP. This packet is accumulated by the MC during a short wait after detection of ringing. T1 loop start protocols do not include DNIS (direct inward dialing) signalling and are simply routed to a predetermined port defined by the configuration data. This predetermined port may be a high speed modem or an auto attendant. If it is an auto attendant, prerecorded announcement data will be played out the T1 port channel with the incoming call asking the person calling to dial the extension of the person they wish to reach. The dialed DTMF tones will be digitized and the DSP in the TEU will detect them and decode them into the characters dialed. The start and end of each DTMF tone will cause the DSP to interrupt the MC, and, in response to the first interrupt, the MC will read the decoded dialed digit from the DSP as described above. The MC will then include the dialed digit in a control packet sent to the PBX process. If there are no dialed digits, the incoming connection request packet generated and sent in step 362 will simply say "there is an incoming connection request on T1 port x". If there are no dialed digits, the PBX process then looks up a predetermined port established by configuration data. If there are dialed digits, the PBX process maps the dialed digits to a port havng that extension number in step 364. The PBX process then sends a control packet addressed to the correct PEU and port requesting the MC of that PEU to ring the named extension. The MC then activates control line to the ring signal circuit to ring the extension.

The MC then monitors whether the extension goes off-hook via the continuous polling of the loop current detection circuit for the port in step 366. When loop current is detected, the MC generates a control packet advising the PBX process that the extension went off-hook.

In step 368, the PBX process reacts to the extension going off-hook by sending a "connection response" packet back to the MC and then writes bits to the switch card to cause it to set up a connection between the T1 port and the extension. The "connection response" packet causes the MC to write signalling bits to the outbound signal bit lines of the T1/ISDN interface circuit 98 telling the CO that the call is answered and to send any data it has and the call progresses, as symbolized by block 370.

If there were no dialed digits and the predetermined port or extension was an auto attendant, the auto attendant plays a prerecorded announcement out the T1 channel in the same manner as previously described. Basically, the data of the prerecorded announcement is packetized and sent over the packet bus 54 to the TEU where it is received by the MC and written into the voice buffer of the DSP handling the channel on which the connection is occurring. The DSP does volume control mixing and writes the data out to the appropriate output buffer mapped to the timeslot on the local bus 134 mapped to the T1 channel in use. The T1/ISDN interface circuit then puts it out on the outbound timeslots of the channel in use. The outbound message will prompt the user to dial the extension of the called party or some other extension. These DTMF tones will be decoded by the DSP 144 for the channel and passed to the MC which passes them to the PBX via a control packet. The PBX then maps them to the extension and sets up the call in the manner previously described (ring phone, monitor off-hook, advise CO of connection made status and set up switch connection).

Returning to the consideration of the ground start protocol, step 380 detects ringing in the known signalling manner of the ground start protocol. After ringing is detected, the processing is the same as steps 362, 364, 366, 368 and 370 for the loop start protocol.

The wink start protocol for incoming T1 digital service starts with step 400 where the MC detects off-hook status in the signalling bits. Wink start protocol supports DNIS (the T1/ISDN equivalent of DID) and ANI (the T1/ISDN equivalent of caller ID). Any DNIS data and ANI data will be sent as DTMF digits grouped in two fields of a string that starts and stops with an asterisk and has the two fields separated by an asterisk. ANI data will be in the first field and DNIS data will be in the second. If either field is blank, there will simply be two asterisks next to each other, but there are always three asterisks. Wink start also supports dialing manually.

The MC responds to the detection of off-hook status by waiting 120 milliseconds to effectively debounce the off-hook status and see if the CO is still off-hook, and then sending back a "wink", as symbolized by step 402. A wink is defined as transmission back to the CO for a short interval of control bits that indicate off-hook status. The duration of the wink is set by the configuration data.

In step 404, the MC waits for the end of the wink and then starts looking for ANI and DNIS digits. As digits arrive, they are accumulated until one second passes without receiving any further digits. In step 406, the MC collects all the DNIS and ANI digits collected during the previous dialing timer intervals and packetizes them and transmits the packet to the PBX process. From there, the process is the same as described in steps 364, 366, 368 and 370.

Figure 11A:
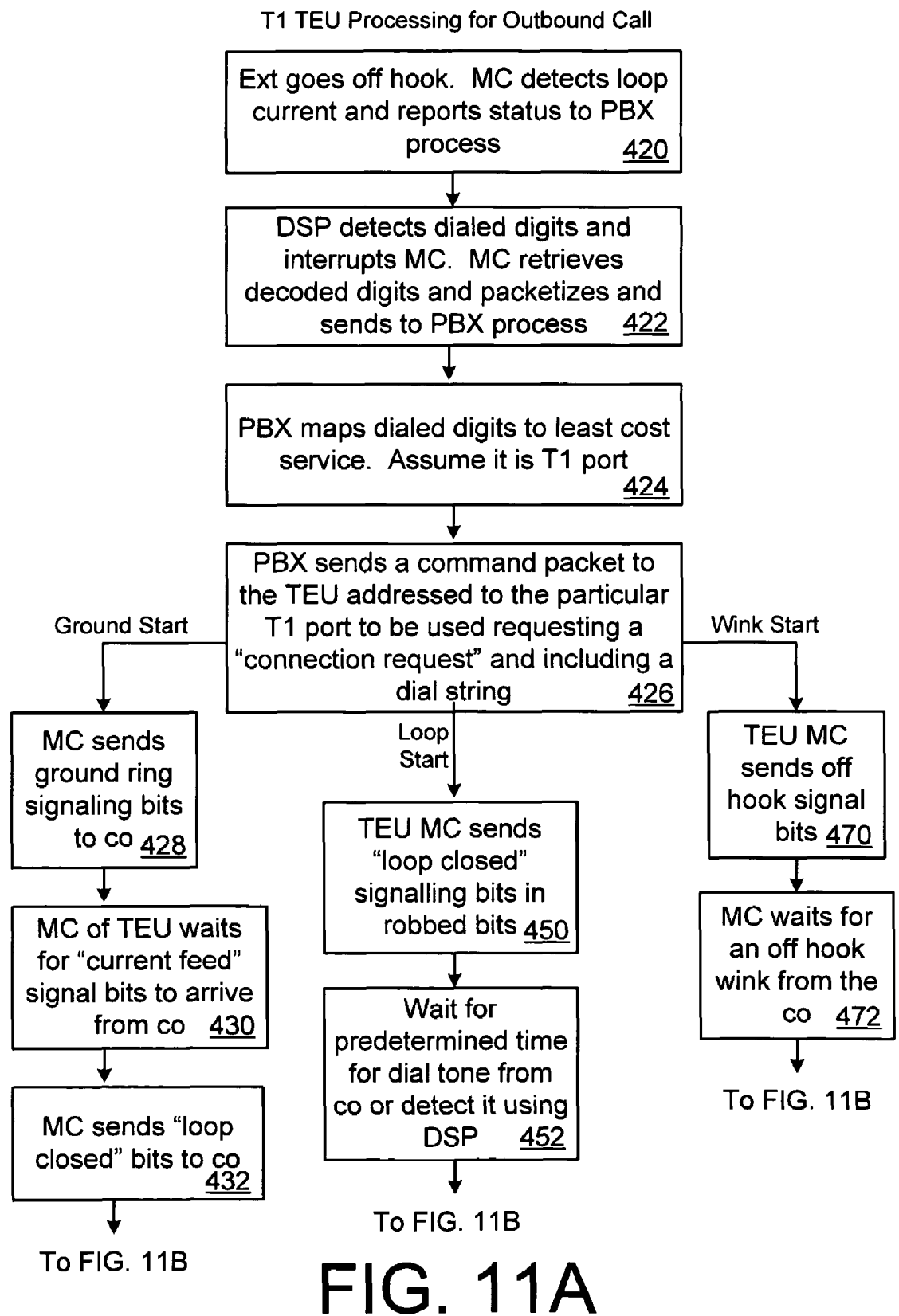
FIGS. 11A through 11B are a flowchart of the processing in a TEU interface to a T1 line by the microcontroller to implement loop start, ground start and wink start signalling protocols for an outgoing call.
Figure 11B:
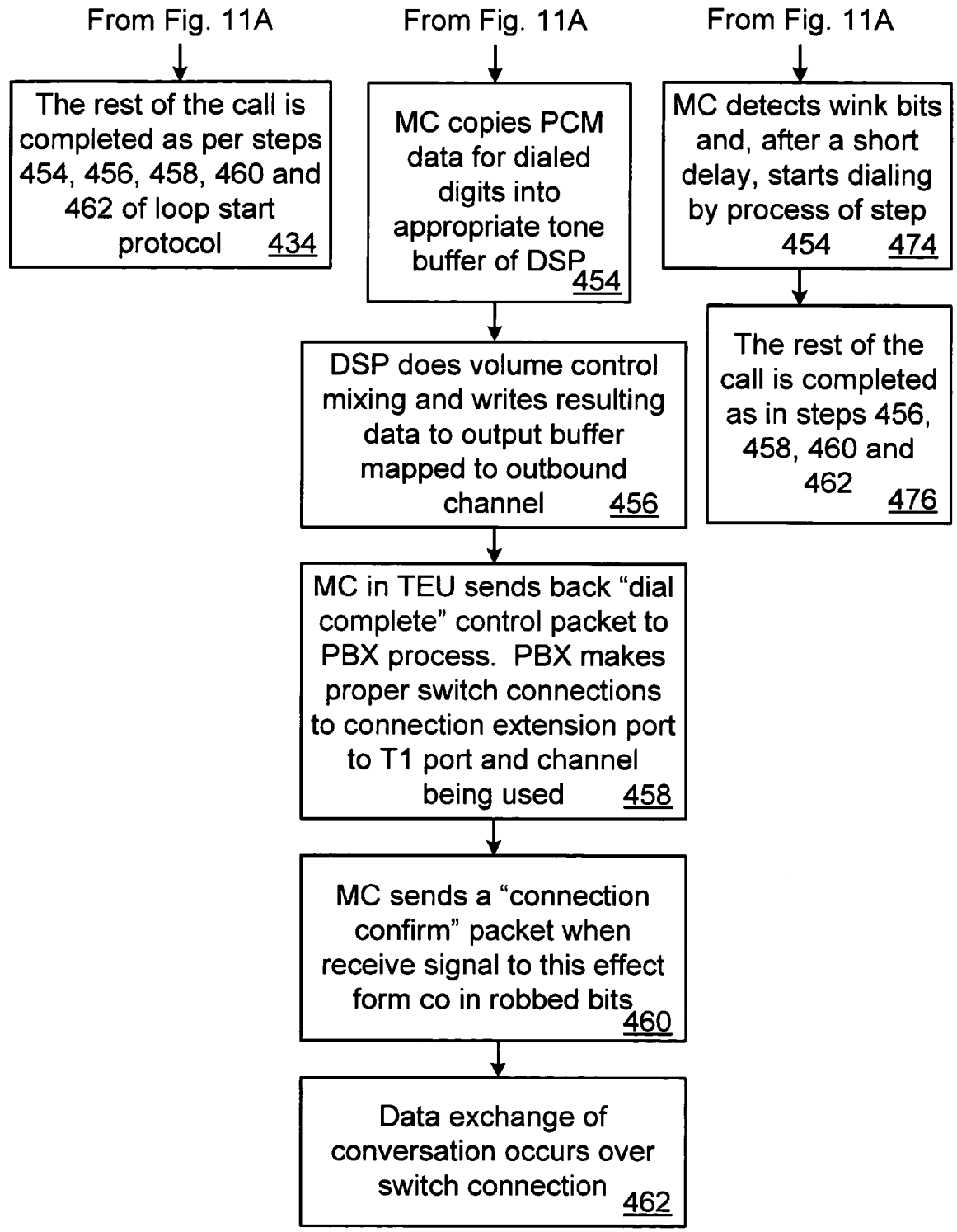

Referring to FIG. 11, comprised of FIGS. 11A through 11B, there is shown a flowchart of the processing of an alternative embodiment for placement of an outbound call on a T1 port. Step 420 represents the process of the extension phone going off-hook and this fact being detected by the MC in its regular polling of the loop current detector. The MC reports this off-hook status to the PBX process.

In step 422, the DSP detects any DTMF tones of dialed digits and decodes them. The DSP interrupts the MC which retrieves each dialed digit and packetizes it (or collects them all and packetizes the group) and sends them to the PBX process.

The PBX maps the dialed digits either to a local extension or to an outside line and, in some embodiments, does least cost routing. For purposes of this discussion, assume that the least cost routing process indicates that the T1 service is the cheapest. In that case, the PBX process sends a command packet of the TEU coupled to the T1 port to be used (the PBX picks an unused channel of a T1 port that does not have all channels in use) and addressed to a particular channel of a particular T1 port requesting the MC to make a connection request. This packet also includes a dial string.

What happens next depends upon the protocol in use. In the case of ground start, the MC sends ground ring signalling bits to the CO on the outgoing robbed bits in step 428. In the case of loop start protocol, the TEU MC sends "loop closed" signal bits in the outgoing robbed bits in step 450. In step 452, the MC either waits a predetermined time for dialtone from the CO and assumes it is there at the end of that time or the MC actually detects dialtone in the incoming robbed bits. In some embodiments, the MC also sends a control packet indicating the presence of dialtone to the PBX process.

In step 454, the MC copies PCM data for the dial string into the appropriate tone buffer of the DSP that is handling the outbound channel of the particular T1 port upon which the call is to be made. In step 456, the DSP does volume control mixing of the tone data with any other data to be played out on the channel, and the resulting volume adjusted data is written into the output buffer corresponding to the channel to be used for the phone call. When the data is written into the output buffer, the DSP hardware automatically puts it onto the correct timeslot mapped to the channel and to that output buffer.

In step 458, the MC sends back a "dial complete" control packet, and the PBX process responds by setting up the switch connection between the extension port and the appropriate channel of the appropriate T1 port.

Returning to the consideration of the ground start protocol, step 430 represents the process of the MC waiting for the "current feed" signal bits to arrive from the CO. The MC responds to the "current feed" signal bits in step 430 by sending "loop closed" signal bits to the CO indicating to the CO that the MC is ready to send the dial string. The rest of the call is then completed as described above in steps 454, 456, 458, 460 and 462.

Turning to consideration of the wink start protocol, step 470 represents the process of sending the off-hook signal bits to the CO to initiate the connection process. The CO responds by sending a "wink", i.e., a momentary transmission of off-hook signal bits to the PBX. The MC detects the wink signal bits in step 474 and waits a short interval and then starts dialing the dial string by the process of step 454. The rest of the call is then completed as detailed in steps 456, 458, 460 and 462, as symbolized by step 476.

The process carried out by the system in handling incoming and outgoing PRI digital service calls is as embodied in the software previously referred to from Telesoft.

Figure 12:
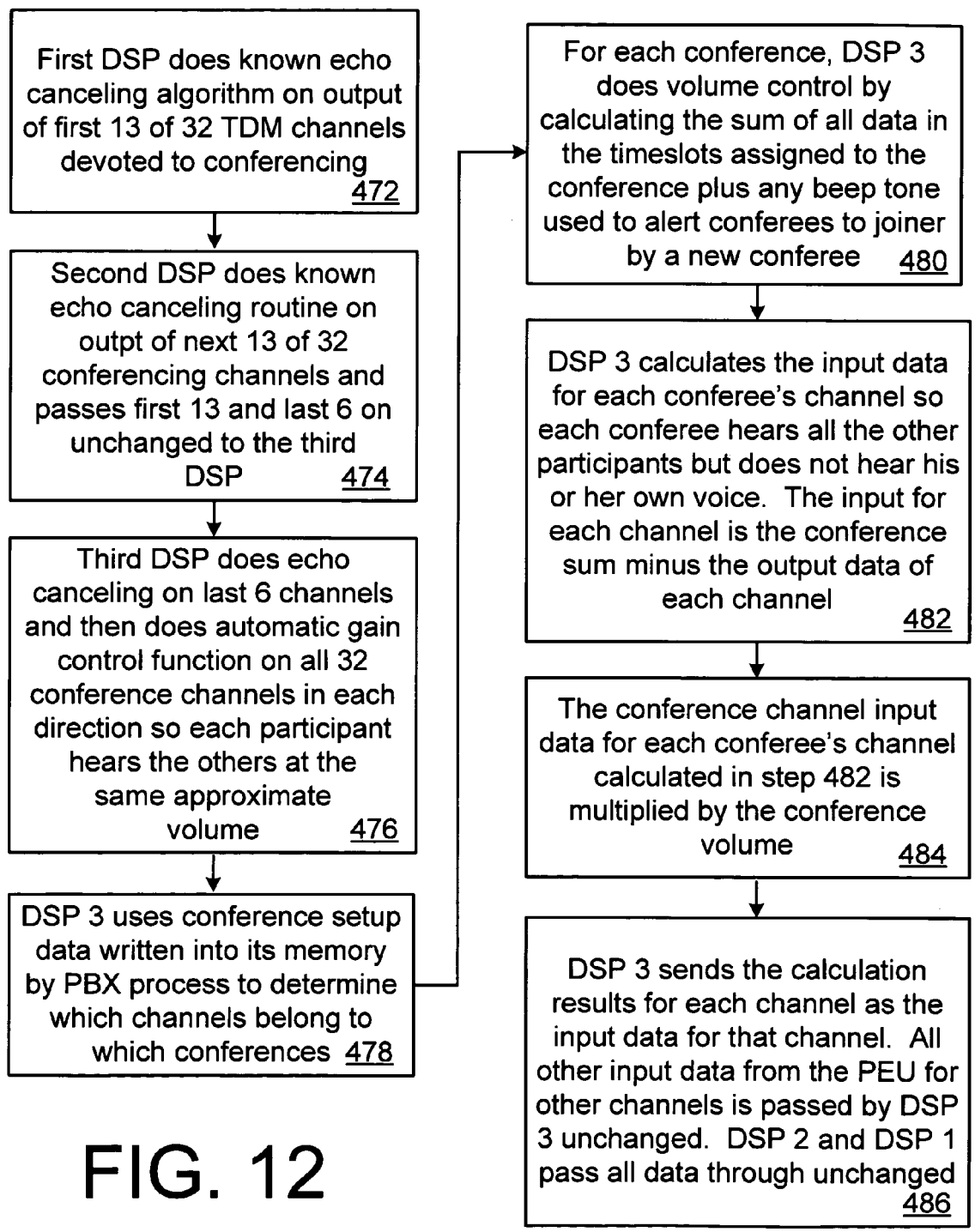
FIG. 12 is a flowchart of the DSP conferencing process in the switch card.

Referring to FIG. 12, there is shown a flowchart of the processing of the DSPs 42 on the switch cards 28. These DSPs do conferencing. Conference calling was done on the prior art VS1 system available from the assignee, but it was done on the switch chips in those systems. The DSPs 42 do conference calling along with volume control and automatic gain control functions and they are the first DSPs so programmed in a distributed DSP personal computer based PBX system such as described herein.

There are 128 channels on the TDMA bus 50. The last 32 of these are used for conferencing by the DSPs 42 and the remaining 96 channels are passed through unmodified in each direction. The DSPs such as 42 perform echo cancelling on the conference channels, perform automatic gain control and volume control in mixing the data from the different channels together to generate the combined sound that all conference participants hear. DSP 42 is actually three DSPs which are daisy chained in the preferred embodiment since one DSP does not have enough processing power to do echo cancelling on all 32 channels. Thus, the echo cancelling function is split among the 3 DSPs with the first one doing any known echo cancelling routine on the outputs from the switch 36 for the first 13 channels and passes the other channels on to the second DSP untouched, as symbolized by step 472. The second DSP in the chain then does a known echo cancelling routine on the next 13 of the 32 conferencing channels and passes the first 13 and the last 6 on to the third DSP, as symbolized by step 474. The third DSP then does echo cancelling on the last 6 conferencing channels and passes all the channel data on to the FPGA or the switch chips 36, for transmission on the TDMA bus 50 or switching to another timeslot depending upon direction of travel of the data. Each of the three DSPs has a separate input buffer and output buffer for each of the 128 channels going in each direction. The echo cancelling process goes on for the last 32 channels in each direction.

The third DSP in the chain in each direction does automatic gain control on all 32 of the conference channels after it has done echo cancellation on its 6 channels and has received the echo cancelled data from the other 26 conference channels from the first two DSPs, as symbolized by step 476. The automatic gain control function is performed such that each conference participant hears the other participants at approximately the same volume despite the differences in volume of the raw data arriving from the different CO POTS or T1 lines.

In step 478, the third DSP uses conference setup data written into its memory by the PBX process to determine which channels belong to which conferences.

In step 480, the volume control process is started. This is done for each conference by calculating the sum of all data from the timeslots assigned to the conference plus any beep tone data stored in the tone data buffer for the conference. The beep tone is used to advise all conferees that a new conferee has joined the conference.

In step 482, the process of calculating the input data that will be put into each channel's timeslot, i.e., the data that will be converted into the sound that the conferee assigned to that channel will hear, is started. This is a two step process. The general idea is to allow each conferee to hear all the other participants but not his or her own voice, and then to adjust the resulting data by the overall conference volume. The first step is symbolized by step 482 where the conferees own voice data, i.e., the "channel output", is subtracted from the conference sum. The second step is to take the resulting data for each channel and to multiply it by the conference volume, as symbolized by step 484. The conference volume is specified in the DSP memory by the PBX process.

In step 486, the third DSP writes the calculated conference input data for each channel and writes it into its output buffer assigned to that channel so that it will get passed to DSP 2 and thence to DSP1. Data from all other channels is passed through unchanged. DSP 2 and DSP 1 pass all data from all channels including conference channels through unchanged.

Preferred Software Architecture For Host

Figure 17:
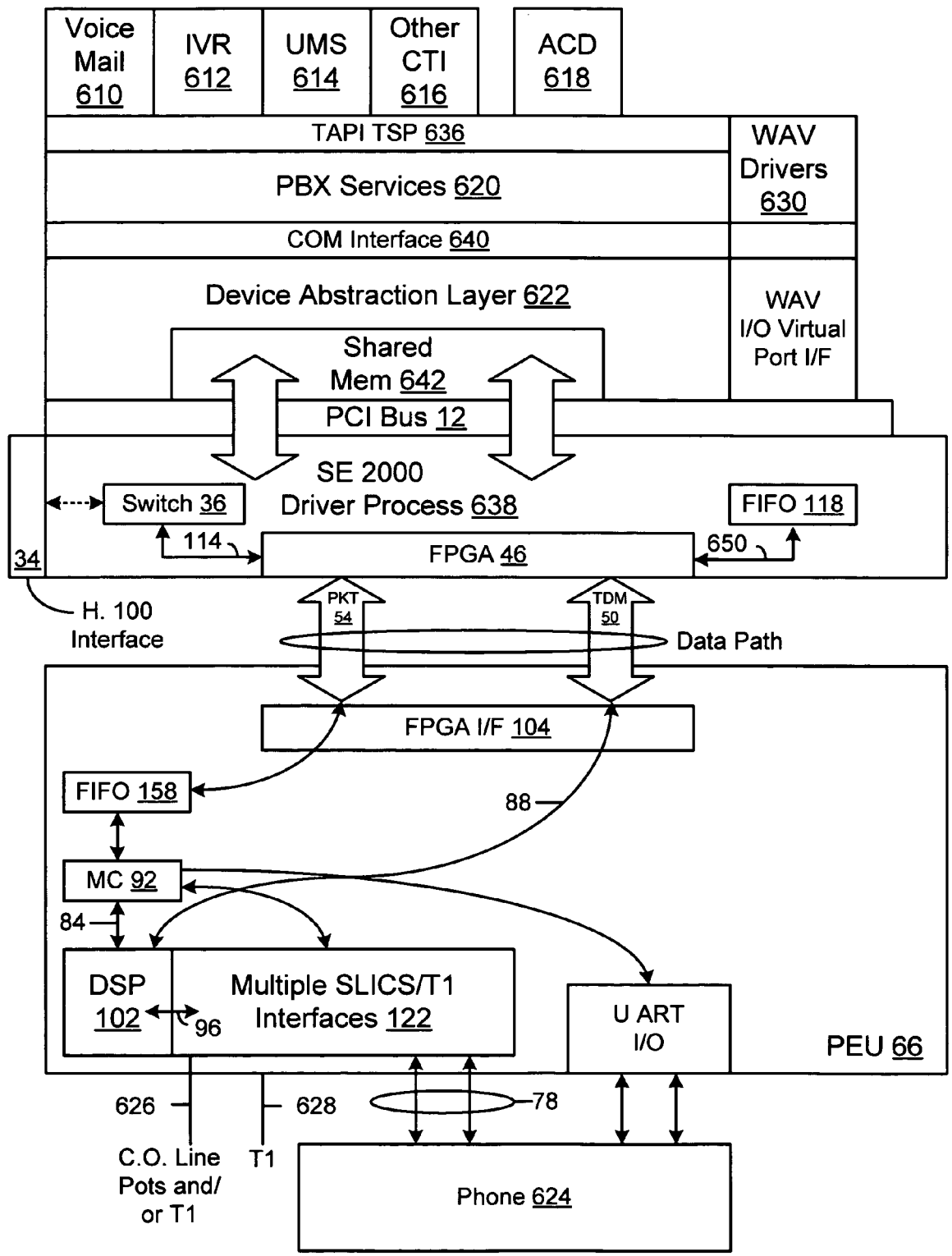
FIG. 17 is a block diagram of the software architecture of the host showing data flow paths to various hardware elements of species within the genus of the invention.

Referring to FIG. 17, there is shown a diagram of the software architecture of one embodiment of the invention. A plurality of one or more application programs such as voice mail 610, integrated voice response auto attendant 612, universal messaging system 614, computer telephone integration 616 and automatic call distribution 618 give the overall PBX system added functionality. The PBX according to the invention does not require all of these applications or even any of them, and only requires a PBX switching process 620 which controls each call and makes the necessary connections.

An additional point of novelty beyond the configurable signalling protocol SLICs and T1 interfaces and the packet bus 54 is the device abstraction layer 622 (DAL). The DAL plays a key role in setting up and switching WAV channels to couple applications to ports for playing and recording digitized voice data. In the preferred embodiment, WAV channel play and record data is delivered via the packet bus 54 in FIG. 1 thereby freeing the TDM bus 50 to carry data of ongoing conversations and modem traffic only.

The DAL 622 also functions to decouple the PBX services layer 620 from the actual physical or software nature of the hardware and software ports that serve as sources and sinks for data. That is, the device abstraction layer provides an interface to the PBX services layer such that all hardware ports and all WAV driver software ports can be manipulated by the PBX services layer in providing PBX functionality in the same way. The notion of software ports in the form of WAV channels which can be switched by the PBX process and used to carry play and record data via a packet bus between application processes and hardware ports is believed to be new. The DAL creates and uses a floating pool of WAV channels that are assigned to applications to couple play and record data to a hardware port only when play or record data transfer is needed.

Figure 18:
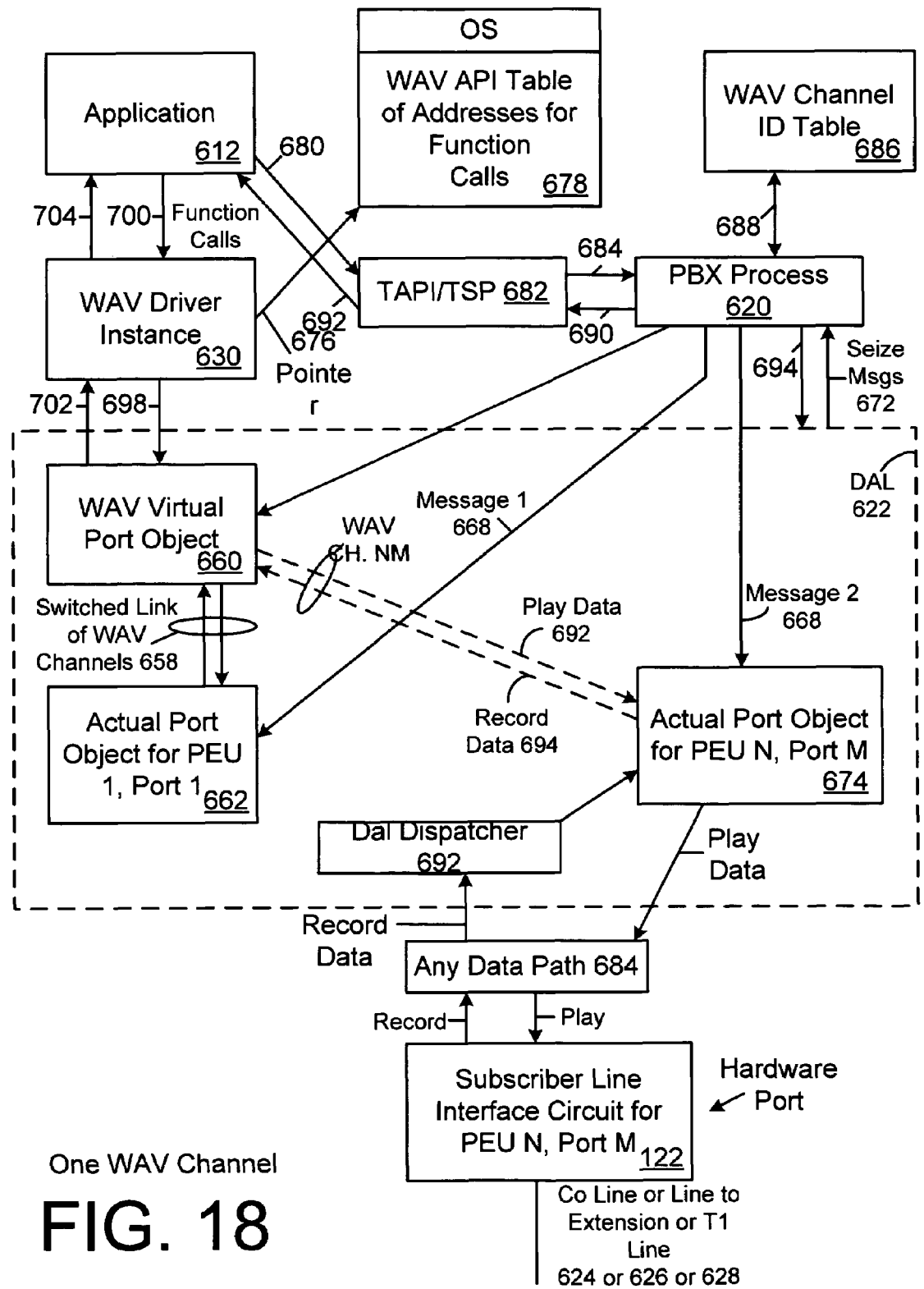
FIG. 18 is a diagram of the processing that occurs to establish a WAV channel and software switch each WAV channel to couple an application process to an extension port or CO port to deliver play and record data via a packet bus.

FIG. 18 is a schematic diagram of how WAV channels are allocated and switched. It will be explained as the need for illustration arises in the following discussion. Please refer to FIGS. 17 and 18 for following discussion. The exact details of how the various software components shown in FIGS. 17 and 18 work together to transport play data from applications to ports and transport record data from ports to applications is given in the table of Appendix A. The processes in Appendix A will be described in more detail below.

The WAV channels use WAV ports like 660 and Actual Port Objects like 662 and 674 to transmit play and record data. Each Actual Port Object is mapped to one telephone line or a timeslot on a T1 port on one PEU. At start up time, the number and type of PEUs coupled to each switching circuit 36 in FIG. 1 is learned. Each PEU has a plurality of subscriber line interface circuits 122 each of which interfaces to an extension telephone 624 or a CO POTS line 626 or T1 line 628. Each of these ports is assigned a port ID and is mapped to a particular Actual Port Object created by the DAL 42.

A "hardware port" is a subscriber line interface circuit to a CO POTS or T1 line or to an extension phone. Each hardware port is reached through a physical channel through whatever PBX circuitry has been added to the personal computer such as the switch card and the PEU circuitry and the bus or buses that connect the PEU clusters to the switch card. A software port is a WAV channel. Each WAV channel, as the term is used herein, is comprised generally of the combination of WAV driver instance 630 linked to a particular application process such as 612 and a WAV WAV port 660 and a software switched linkage 658 to an Actual Port Object 662 and a physical data delivery path 664 to a hardware port 122 either over the packet bus 54 or the TDM bus 50. The sofware switched linkage 658 between the WAV WAV port 660 and an Actual Port Object 662 is controlled by the PBX process 620 in cooperation with the DAL process 622 by a series of messages, represented by arrows 666, 668 and 672 which will be referred to as message 1 and message 2 and are implemented by function calls to WAV ports and Actual Port Objects. There are two arrows marked 668. These represent the message 2 to two different Actual Port Objects telling them to register as a listener to WAV WAV port 660. Normally, only one message 2 is sent to the particular Actual Port Object that is linked to a particular hardware port 122 to which play data is to be sent and record data received.

The ability to link by software switching any WAV port 660 to any of the Actual Port Objects 662 through 674 on an as-needed basis allows any application process such as 612 to be coupled to any hardware port to play and record digitized voice data through the packet bus or shared timeslots. This prevents unnecessarily consuming system resources by having WAV channels and timeslots on the TDM bus continually allocated to applications that are not currently using them to play or record data.

In the preferred embodiment, the physical data delivery path 664 for play and record data only is via the packet switched bus 54 in FIG. 1. However, in alternative embodiments, the physical data path for play and record data can be via dedicated or shared play and record data timeslots on the TDM bus 50 with the novelty residing in the software switching of WAV ports to Actual Port Objects as needed when playing or recording of digitized voice data to or from a particular hardware port is needed. Also, in embodiments where the PEU is an expansion card coupled to the PCI bus 12 of the host CPU 14, the data path 664 for play and record data can be the PCI or other system bus of the host.

A WAV driver is an application programmatic interface implemented by the operating system, but multiple instances of it can be formed like that shown at 630 for application 612. Each WAV driver instance is comprised of a data block stored in the application's dedicated memory space. Each data block contains the device number of the WAV driver and a pointer 676 to the shared WAV API function call table 678 that gives the starting address of each program that implements one of the WAV function calls that can be invoked.

WAV channels switched as needed by cooperation of the PBX process 620 and the DAL process 622. Switching together of a WAV port and an Actual Port Object of a WAV channel allows the WAV channel to be used by an application program which needs to play WAV file voice data out to a hardware port or record voice data such as voice mail messages or recorded telephone conversations by storing digitized voice data in a WAV file to be stored on a hard disk.

Most of the blocks on FIG. 17 represent processes running on the personal computer host 14 in FIG. 1, e.g., processes 610, 612, 614, 616 and 618. Other blocks that represent processes running on the host computer are: the TAPI and TSP (Telephony Services Provider) APIs 636 of the operating system (the operating system is not shown), WAV drivers 630; the WAV WAV port I/O interface API 632; the PBX services process 620; the Device Abstraction Layer or DAL 622; and, the switch card driver process 638. All these processes are in execution or load for execution on the host microprocessor of the personal computer. As such, each process has access to the resources of the personal computer through the operating system. The function of each process in the combination will be discussed more fully below.

A WAV device cannot talk directly to a port or other hardware so it needs another program to translate between the generic WAV functions and the specific actions and interaction with the particular hardware and/or other software present to make the desired function happen. In the software architecture of FIG. 17, this other program is called a WAV port 660. Block 632 in FIG. 17 represents the programmatic interfaces to the WAV ports defining the function calls each instance of a WAV port object can carry out.

When the PBX is loaded, it determines from configuration data which hardware ports (sometimes referred to herein as lines) support WAV interfaces. At this time, the PBX allocates a WAV channel to each line that has been configured to support WAV play and record. If an application wants to use the WAV interface for a port to play a digitized voice prompt to it or record digitized voice data generated at the port, it makes a TAPI call to get the device ID of the WAV driver for that port. The PBX will return the device ID for the WAV channel allocated to that line, and the application can use the WAV interface at any time to play data to or record data from the port. The application uses the device ID with the standard WAV API to play and record data via the appropriate WAV driver. The WAV channel is dedicated to the line, and is switched when needed to any caller or called party such that the application can play prompts to the connected party or record the connected party's voice.

Each WAV port instance contains a datablock which includes a pointer to the WAV I/O virtual port interface 632. The WAV I/O virtual port interface is a table of addresses for the shared programs that carry out the functions of each WAV virtual port software object.

A WAV port like 660 is a software object that has programs that can manage buffers of play and record data. That is, each WAV port has functions it can perform to manage data buffers which may be invoked through WAV I/O virtual port interface 50. One of those functions is to register as a listener to any of the Actual Port Objects 662 through 674 mapped to the hardware ports. When a WAV port is registered as a listener to an Actual Port Object, it can receive record data from the harware port through the Actual Port Object and record it in a buffer.

An Actual Port Object is a software object that contains programs that can implement the functions defined herein for the Actual Port Objects. There is one Actual Port Object mapped to each hardware port. Another function of each WAV port 660 is to transmit data from its buffer to any Actual Port Object(s) registered as a listener(s). Each WAV port and Actual Port Object also has a data structure. Each WAV port 660 acts as a translator. Each translates between the generic WAV functions needed for play of prerecorded announcement data and voicemail message data and record of voicemail messages etc. and the specific interaction needed with the Actual Port Objects, PBX process 620 and DAL process 622 and the hardware circuitry to make each function happen. The details of a typical transaction in the preferred embodiment are given in the diagram of FIG. 18.

Each hardware port 122 may be configured to have or not have WAV channel support by configuration data. The PBX process uses this configuration data when it receives a function call from an application process to set up a WAV channel. Such a function call (680 in FIG. 18) will be made via the TAPI/TSP interfaces 682 when the application wishes to play data to a particular port or to record data from a particular hardware port. The TAPI/TSP interfaces convert function call 680 into a request(s) 684 to determine if the particular hardware port is configured to support WAV and to set up a WAV channel to the specified hardware port in some embodiments although, in the preferred embodiment, WAV devices are allocated and assigned IDs at configuration time for the PBX and only switching to couple specific WAV ports to specific actual port objects is done on an as-needed basis. The PBX process 620 also invokes function calls 672 at configuration time to the DAL process 622 through the COM interface 640 (shown only in FIG. 17) to that an interface to each WAV port so allocated be provided. The DAL then establishes an interface for each such WAV port.

When an application needs to play or record data to a port, it makes a TAPI call asking for the WAV device ID mapped to that port. The PBX process then returns the WAV device ID to the application that needs WAV channel support, as symbolized by arrows 690 and 692. For purposes of illustration, we will assume that the hardware port to which the WAV channel is to be set up is 122 and that actual port device 674 is mapped to that hardware port and that the WAV channel ID is NM symbolizing the software switched link play data and record data linkage portions, 692 and 694, respectively, of the WAV channel coupling WAV port 660 to Actual Port Object 674.

In some embodiments, the DAL 622 responds to the function calls 672 by determining if the WAV port object and Actual Port Object specified in the function calls are already in existence. In the preferred embodiment, the DAL does this when the PBX configures and allocates WAV channels to lines and makes a function call to the DAL for each WAV port asking the DAL to provide an interface to that WAV port. This causes the DAL to check if that WAV port already exists. If the specified WAV port already exists, the address of the data block for the specified WAV port object and the specified Actual Port Object are returned to the PBX process 620, as symbolized by arrow 694. If the WAV port object or Actual Port Object specified in the function calls 672 are not already in existence, the DAL 622 creates them and returns the addresses of their data blocks (referred to as the "handle") to the PBX process. The process to link the proper WAV port object to the proper Actual Port Object will be described below.

After switching together of the software objects of a WAV channel, it will be used to transport play and record data to and from the specified harware port or extension thereafter until the PBX reboots. If the request from the application is to play or record data with a port that is not configured to support WAV, then no WAV driver identity is returned to the application.

The application layer, i.e., processes 610, 612, 614, 616 and 618 can be any third party applications that have a TAPI interface and need to avail themselves of the functionality of the PBX. Each of these applications communicates bidirectionally with the PBX services process 620 through the TAPI and TSP processes 636 (these are application programmatic interfaces) for function calls and messages in a known manner. The PBX process controls calls and provides its other services by making function calls to the device abstraction layer 622 through a known COM interface 640. The DAL 640 exports the functions of a plurality of interfaces it defines, and is loaded when the PBX service 620 loads and identifies a specific COM interface to the DAL. The COM interface 640 loads the DAL 622 and returns a table with pointers to all the programs in the DAL 622 that implement the function calls that define the interface between the PBX process 620 and the DAL 622.

The DAL 622 has a high level interface which includes a function which can be invoked by the PBX process 620 to obtain a list of all the PEUs. Each PEU has an interface exported by the DAL 622 which includes a function call which the PBX process 620 can invoke to get a list of all the ports on the PEU 66. Each port also has an interface of function calls that can be invoked by the PBX process 620 which results in sending a control packet over a control channel to the MC 92 to do things like go offhook, dial specific numbers, hookflash, ring etc. Invocation of these functions cause the appropriate steps to happen in the DAL 622, the SE2000 driver 638, the MC 92 and the circuitry of the PEU 66 and the particular port interface SLIC 122 in the PEU to make that function happen.

The DAL 622 carries out switching connections between timeslots on the H.100 bus 34 in FIG. 1 requested by the PBX process generally by sending an appropriate message through shared memory 642 and PCI bus 12 of the host personal computer to the SE2000 driver process 638. The driver process 638 controls the expansion card or other circuitry on switch cards 28, 30 and 32 in FIG. 1 to carry out the switch connections ordered by the PBX process 620. Other functions the PBX process 620 can invoke cause software switching of WAV channels by ordering Actual Port Objects to register as listeners to WAV ports and vice versa are explained more fully below.

The overall function of the device driver process 638 is to translate between desired functions ordered by the DAL 622 and the functions and commands needed for the actual hardware in use to make the functions ordered by the DAL 622 happen. In the case of the hardware of the preferred embodiment, the driver 638 performs the following functions.

First, it writes the appropriate switching control bits through the H.100 interface 34 to control switching of switch 36 to connect ports together as-needed through their timeslots on the H.100 bus. Typically, each port and PEU combination has an address which uniquely defines it in the form PEU.Port. Thus, port 1 on PEU 1 would be address 1.1. These addresses are the physical layer of the system.

The layers above the DAL such as the PBX process 620 work on a logical level. The PBX process has a map of the system in its memory that is stated in terms of "extensions". An extension in the case of an actual port is a number that needs to be dialed to reach that extension. An extension can also be an automatic call distribution queue, a voice mail WAV channel or any other address that can be called in the system. The PBX process controls switching on this logical level ordering connections between different extensions by making function calls to the DAL and passing as arguments the extensions to be connected.

The DAL functions, among other things, to cooperate with the PBX process to drive the driver process 638 to control the switch and couple the appropriate WAV port objects to the appropriate Actual Port Objects so as to convert the connections between logical extensions ordered by the PBX process into actual connections between PEUs and ports over the switch 36 and TDM bus 50 and between PEUs and ports and specific applications through WAV channels and the packet switched bus 54. Thus, when the PBX orders a connection between extensions 101 and 102 for a real time conversation, the DAL 622 determines that this requires a switch connection between address 1.1 (PEU 1, port 1) and address 2.3 (PEU 2, port 3) and writes suitable control bits through the H.100 interface 34 to cause the switching circuit 36 to connect whatever timeslot on H.100 bus 34 that is mapped to address 1.1 to whatever timeslot on H.100 bus 34 that is mapped to address 2.3. The upstream and dowstream data of this connection are then physically transmitted between the switch 36 and the PEU by the timeslots on TDM bus 50 that are assigned to the upstream and downstream connections for ports 1.1 and 2.3.

As an example, suppose the PBX process orders a connection between the extension mapped to address 1.1 (hardware port 122) and a voicemail extension via WAV channel NM to play and record data. As part of this process, the PBX will invoke function calls to set up the software switched WAV channel linkage in the DAL that establishes a route for WAV channel NM play and record data to port 1.1. The DAL 622 reacts to these function calls by setting up a data path from port 1.1 through bus 96, DSP 102, MC 92, FPGA 104, packet bus 54, FPGA 46, bus 650, FIFO 118, shared memory 642, a DAL dispatcher, Actual Port Object 674 mapped to address 1.1 and WAV port 660 registered as a listener to the Actual Port Object 674 and linked to the WAV driver 630 that serves the voice mail application 612.

The above description of the WAV channel data path assumed that the data path was the packet bus. In alternative embodiments, where voicemail play and record data are transmitted over dedicated or shared channels on the TDMA bus and there is no packet switched bus 54, the data path will be similar except that the record data will not be sent over the packet switched bus but will be broken up into segments sent in dedicated or temporarily assigned timeslots on the TDM bus 50.

The PBX process 620 sets up a WAV channel software switchable linkage in the following way. Each WAV port instance includes a datablock which indicates to which Actual Port Object it is registered as a listener for record data and which Actual Port Object(s) are registered to it as a listener for play data. These registrations are set up by the PBX process 620 and are the heart of the software switching of WAV channels. The listener registrations are set up by function calls that the PBX process 620 invokes in the WAV ports and the Actual Port Objects. The data block of each WAV port also contains a pointer to a table of function calls for the WAV virtual port interface 632. The table contains the addresses of a program in the WAV virtual port interface which does a particular function that the WAV port is capable of carrying out.

The device abstraction layer 622 provides novel service to the PBX service 620 in decoupling the PBX service from the details of the hardware port communications and WAV channels for play and record data. This allows the PBX service to be decoupled from the complexities of how to play and record digitized voice data. All the PBX service has to do to switch together a WAV channel to play digitized voice data to an actual extension phone or CO line or record data from an actual extension phone or CO line is send two messages to the DAL 622. These two message are what causes the software switched connection (listener registrations) to be made to set up a WAV channel from an application to a particular port or extension.

The first message in our example of WAV channel NM is symbolized by arror 666 in FIG. 18. This function call is directed directly to the WAV port associated with WAV channel NM since the PBX now knows the address of this WAV port. The function call of message 1 666 orders WAV port 660 to register as a listener to Actual Port Object 674 which is linked to port 1.1. This message causes the listener registrations symbolized by arrow 694 to be set up and establishes the upstream path for record data.

The second message is symbolized by arrow 668 and is from the PBX process 620 directly to the Actual Port Object 674. This message is a function call which causes a particular Actual Port Object specified in the message to register as a listener to a WAV port specified in the function call. This establishes the downstream path for play data transmission, as symbolized by arrow 692.

Downstream Play Data Transmission

When the WAV channel was first switched together, after registering as a listener to a WAV port, the Actual Port Object sends a control packet to the PEU telling it to listen for the stream ID that corresponds to the WAV channel just set up. This control message also tells the PEU that play data packets bearing that stream ID need to be routed to a particular port on that PEU. This control message is used by the MC 92 in each PEU to set up a play data routing table that maps stream IDs to play data buffers in DSP 102 for the ports to which the play data is directed. This routing data is used when play data packets come in to determine from the stream ID which play data buffer in the DSP into which the play data is to be written.

Assuming the voicemail or IVR application 612 wants to make a prerecorded announcement on the telephone line on which a voicemail message is to be recorded. To do this, the application 612 first makes one or more calls to the operating system to open and read a data file that contains data encoding a prerecorded announcement such as a greeting file for voicemail. The operating system responds to the open and read function calls by getting the data from the specified file on the hard disk or other nonvolatile storage and writing the data into a buffer and returning a pointer to the buffer to the application 612. This buffer is just a series of storage locations in the memory space dedicated to the application that contains enough capacity to store the data of the announcement to be played.

Next, the WAV channel must be opened and a buffer prepared. To do this, the application 612 invokes an open function of the operating system WAV API (application programmatic interface) for the WAV driver instance 630, as symbolized by arrow 700 in FIG. 18. There is an operating system dynamic linked library (DLL) that loads the WAV driver DLL at boot time. When the application 612 loads, it has references to the WAV driver. These get resolved to the OS DLL which then loads the individual WAV driver instance into the dedicated address space of the application and passes a handle to the WAV driver to the application. The application then opens its WAV driver 630 by invoking an open function call of the shared WAV driver API pointed to by the data block of the WAV driver instance stored in its dedicated address space.

The WAV driver invokes an open function of the WAV port 660, as symbolized by arrow 698. This open function call will be directed to the WAV port 660 that corresponds to the WAV channel ID that was passed back to the application 612 with a message from the PBX process when the WAV channel had been successfully formed by registrations of the upstream and downstream links 692 and 694. The DAL then checks to make sure there is no conflict with another WAV driver having opened the same WAV port, and, if there is no conflict, returns a code to the WAV driver so indicating. This conflict check acts to block more than one application from using the same WAV channel since all the applications have access to the pool of WAV devices as-needed, and one application like voicemail can be using more than one WAV channel simultaneously. This prevents any ill-behaved application that happens to be on the system from ignoring reservations of certain WAV channels to certain applications and attempting to open the same WAV channel that another application is using. The WAV interface is public so other applications can attempt to invoke the function calls of WAV drivers in WAV channels that are already reserved to other applications. If there is a conflict, the system just logs an error and stops functioning in some embodiments or carries out some other conflict resolution routine which is not part of the invention.

The WAV driver 630 next invokes a prepare buffer function call of the operating system which then invokes a prepare buffer function call of the API to the WAV port. The WAV port 660 returns a code that requests the operating system to prepare the buffer. The OS prepares the buffer and returns a pointer to the WAV port 660 that points to the buffer. This pointer gets passed back to the application 612, as symbolized by arrows 702 and 704. This prepare function call tells the OS and the WAV port how big the buffer needs to be and provides the opportunity for the WAV port and the OS to set any status bits it needs to keep track of things and to set up any secondary buffers if need be. The prepare buffer function call includes a buffer size pointer to the buffer and can include arguments which can be used to set the buffer up as a circular queue so the same play data is played over and over and can include some reserve space so the OS and the WAV port to set up status data regarding that buffer. In alternative embodiments, the WAV driver or the WAV port can prepare the buffer themselves upon receiving a prepare buffer function call from the application or from the WAV driver in the case of a WAV port. In other alternative embodiments, the application generally uses Windows interfaces to retrieve the data from the hard disk and write it into a buffer that the WAV channel is pointed to and used to transmit play data.***

Next, the WAV driver 630 invokes a write function of the WAV port 660 and writes at least some of the play data into the buffer just prepared. In the preferred embodiment, there is an OS dynamic linked library (DLL) between the WAV driver and the DAL 42 that governs the traffic therebetween. This DLL can only accept buffers of a certain size or smaller so the WAV driver will only send the maximum amount of data that the DLL can accept and then send the rest later in one or more copy steps. In alternative embodiments, the OS DLL will accept any size buffer of play data and store it in a buffer prepared by the WAV port or operating system.

Next, the WAV port 660 of the WAV channel just opened constructs one or more play data packets with a payload section comprised of 208 bytes from the play data in the buffer just loaded. This packet is written into a downstream play data FIFO in shared memory 642 for the particular WAV channel just created. The shared memory has a play data queue that stores play data packets and a control data queue that stores control packets for each port. For record data packets and control packets coming up from the PEUs, there is only one receive FIFO in the shared memory that is shared by all ports. The downstream play data FIFO is formed in the following way in the preferred embodiment. At the time the DAL acts upon the function calls to establish the WAV channel, it initializes a new FIFO for that WAV channel in shared memory by invoking a function call in the API to the driver 638. This function call informs the driver that the DAL will soon be having play data from a particular WAV channel ID that needs to be transferred to the driver through the shared memory 642. The driver responds by sending the DAL a pointer to a control block for the new FIFO to be created. The control block contains several fields one of which is a pointer to the starting address of the new FIFO for this WAV channel and two others which are the IN pointer of the FIFO and the OUT pointer of the FIFO. The IN pointer is the address where the next play data packet is to be written, and the OUT pointer is the address from which the next play data packet is to be read for transmission to the PEU. The DAL controls the IN pointer and the driver 638 controls the OUT pointer. The FIFO is typically 4 play data packets long.

Each play data packet contains 208 bytes in the preferred embodiment. This size of 208 bytes corresponds to 26 milliseconds of play data at the clock speed of the local TDM bus 96 between the DSP 102 and the SLIC 122 for the port. The 208 byte packet length for the payload portion of the play data packet is not critical to the invention, and other packet lengths may be used. The 208 byte packet length was selected because it corresponds to the length of time it takes to transmit one frame on the local TDM bus 96 in FIG. 1 representing the preferred hardware platform to be transmitted given the clock rate of that bus. If different frame sizes are used, a different play data packet length can be used, and, in some embodiments, the play data packet may have little if any relationship to the frame interval on bus 96. It is desirable however to use a play data packet size selected to be small enough and transmitting of the play data packets frequenctly enough to the CODEC in the SLCI 122 that no audible latency occurs in the play data function.

The play data packet constructed by the WAV port object includes the stream ID of the WAV channel. This stream ID was sent by the Actual Port Object to the destination port PEU as a control message.

After the FIFO for the new WAV channel is initialized, the DAL uses the pointer to the control block, reads the IN pointer and writes the first play data packet into that location of the FIFO and then updates the IN pointer location of the control block to point to the next spot in the FIFO for the next play data packet.

In the preferred embodiment, the WAV port also writes a broadcast address into the destination address field of the play data packet so that all PEUs and ports on the chain will take the packet off the packet switched bus. Play data is generally broadcast. This is because it frequently is a page that needs to be played out all speaker phones of all ports. Also, it may be play data of a conference call that needs to be sent to multiple ports simultaneously and it is more efficient to send the packet as a broadcast than to send the packet repetitively to all ports which must play the data. In alternative embodiments, the destination address may be the specific PEU and hardware port to which the packet is directed and multiple packets with the same play data may be sent in the case of pages and conference calls.

In alternative embodiments where no packet switched bus is present and only a TDMA bus is used to transfer data, the play data in the buffer can be broken up into chunks of data (possibly with sequence numbers for ease of reassembly in some embodiments), each chunk being big enough to transmit in a timeslot on a TDMA bus coupling the driver to the hardware ports. The timeslots used can be permanently mapped to carrying play data to all ports, or may be dynamically assigned as the need for a play data WAV channel arises. Each chunk could also be mixed with other outbound data for the call and transmitted by driver 54 on a timeslot devoted to the call or could be transferred on a timeslot dedicated to the particular application which originated the play data in still other embodiments. Any other interprocess data transfer mechanism of getting the play data to the hardware port could also be used in other alternative embodiments.

The driver process 638 sweeps the shared memory 642 every 26 milliseconds in response to a timed software interrupt generated by a software timer or a hardware timer on the SE 2000 driver circuit board (28, 30 and 32 in FIG. 1). In response to this interrupt, the driver process takes out one play data packet from the location of the OUT pointer for each FIFO in shared memory for an existing WAV channel. The driver process then updates the data block OUT pointer address to point to the next play data packet in the FIFO for every WAV channel. The play data packets so read are then written into FIFO 118 for the FPGA 46. The FPGA then transmits each such play data packet on the packet switched bus 54 of the appropriate switch card.

The interval 26 milliseconds is not critical to the invention. However, because play and record data are transmitted by the same packet based mechanism over the packet bus, the interval for sweeping packets out of the FIFO must be short. Specifically, the interval must be short enough that, taking into account the delays that are incurred as play and record data packets propagate through the various layers of software in the system, such that no noticeable latency or delay in either play or record data is perceptible to the human ear. The 26 msec interval is selected to match the duration of a voice mail packet transmission on the local TDMA bus 96 at the bit clock rate of the local bus 96. In alternative embodiments, some other packet length and event timer interval could be used. Alternatively, play and record data could be sent via a TDMA bus without a packet bus thereby dispensing with the need for packets where timeslots are dedicated to specific ports for voicemail only.

Still another alternative is to break play and record data packets up into bytes with sequence numbers and transmit the bytes over a TDMA bus and reassemble them at the other end.

In alternative embodiments, the play data may be transmitted on timeslots of TDM bus 50 dedicated to carrying only play data for that particular port (if there are many available timeslots on bus 50 and wasting them is not a problem). In such an embodiment, the driver process 638 will look up the dedicated timeslot for play data for that port when a play data packet addressed to that port is found in the shared memory. In another alternative embodiment, when the driver detects a play data packet addressed to a particular port, it will assign a timeslot from a pool of timeslots shared by all ports to send play data or request a bus arbitration process to assign a timeslot. Then the play data will be sent on the timeslot so assigned, and a control message will be sent to the PEU informing it which timeslot upon which its play data will be arriving. There is no fixed mapping between WAV drivers and timeslots however as in the prior art since WAV channels are only created when needed. Further, how the WAV channel data gets to the PEU is unimportant and can be by any of the bus structures and schemes described herein.

The 26 millisecond timed software interrupt is implemented to make sure there is a continuous stream of play data transmitted to avoid latency. When play data is being played, if the various software layers between the source and the A/D converter each add delays some of which are unpredictable, the A/D converter can run out of data and the sound generated can sound like one is talking to a man on the moon with large delays that are audible. The 26 millisecond software interrupts avoid this problem. That specific interval is not critical however and any other suitably short interval that avoids the negative effects mentioned above will suffice.

Each Actual Port Object is mapped to a specific PEU and port and to a specific switch card by mapping data maintained by the DAL 622. The WAV port in DAL 622 writes the play data packet into the play data FIFO of shared memory 642 which is mapped to the specific port, PEU and switch card to which the data is directed or into a broadcast address space of the shared memory. In alternative embodiments, each PEU and switch card would have its own driver instance running in its own dedicated memory space. In such an alternative embodiment, each driver 638 has a play data buffer in its dedicated memory space and the WAV port would write the play data packet or the timeslot chunks and sequence numbers into the play data buffer of the appropriate driver instance's dedicated memory space.

Next, the FPGA or other interface logic 104 in FIG. 17 in the PEU receives the broadcasts packets or packets addressed specifically to it and stores them in FIFO 158. In the preferred embodiment, the FPGA 104 generates an interrupt to the MC 92 each time a packet is written into the FIFO 158. In an alternative embodiment, the MC periodically polls the FIFO to see if it has any new packets.

Next, the MC 92 in the PEU selects the FIFO 158 and reads any packets stored therein. It then compares the address and stream ID data in the destination address and stream ID fields of the play data packet to the PEU's address and the stream ID it previously 210 received in a message from the Actual Port Object for this port.

In the preferred embodiment, the MC 92 next performs the following process to get the data to the proper buffer in the DSP 102, but any other process that get this done so as to not create latency in the playing of the data will suffice.

The MC reads the packets stored in the FIFO 158 every time there is an interrupt from the FPGA 104. The stream ID in the play data packet is used to look up the port. If the port is one of the ports on the PEU on which the MC resides, the MC finds one of its string of buffers that is available and copies at least the payload of the play data packet to that buffer. Every buffer has a header which can store information such as which port or ports to which the play data in the buffer is supposed to go. The MC keeps a queue for each port on the PEU. The queue for each port is a list of pointers to all the buffers of play data received for that port in the order in which they were received. Every 26 msec, the DSP 102 in FIG. 17 generates an interrupt to the MC 92. In response to that interrupt, the MC reads the queue for every port that the particular DSP is responsible for (there may be more than one DSP on each PEU dividing up the work of the ports on that PEU). In response to every 26 msec interrupt, the MC then moves the data from the first play data packet buffer on the list to a play data buffer in the DSP 102 mapped to the port to which the play data was addressed. If there is no play data packet on the queue for a particular port, the MC just writes zero or silence data into the corresponding play data buffer of the DSP. This methodology lessens the control overhead burden and allows maximum capacity in getting play data to the ports without delays.

In some alternative embodiments, the stream ID of each play data packet in the FIFO 158 is used as a search key in a routing table. This routing table is created by the MC as the control messages from the Actual Port Objects come in telling the PEUs and specific ports thereon to listen to particular stream IDs. The routing table maps the stream ID of each incoming play data packet to the particular port which is supposed to play it. Once the port is determined, the MC moves at least the payload data from the play data packet into the corresponding play data buffer of the DSP or sends it directly to the port if no volume control process by the DSP is implemented.

Typically, for every port, the DSP will have a play data buffer, a TDM buffer and a tone data buffer. The contents of these will be weighted and summed in an optional volume control process in the preferred embodiment.

Simultaneously to moving data from the packet bus to the DSP 102, the FPGA 104 in each PEU reads the time division multiplexed data from the timeslots of the TDM bus 50 devoted to the ports on this PEU and writes that data into the TDM buffers of the DSP 102 corresponding to those ports in the DSP.

Sometimes, the PBX process tells the MC to generate certain call progress or DTMF tones on the port. In such a case, the MC 92 writes any tone data necessary for such tones into the tone data buffer of the DSP 102 that corresponds to the port which is to generate the tone.

The DSP 102 then mixes the tone, TDM and play data in an optional volume control process designed to allow individual, programmable weighting of each data to prevent some sound signals generated at the port from drowning out other sound signals. To do volume control for each port, the DSP reads the data from the tone buffer, TDM data buffer and play data buffer corresponding to that port. The data from each buffer is weighted according to a weighting factor which is set such that play data and tone data have appropriate values so that the play data can be heard and the tone data, if any, does not obliterate part of the play data or TDM data. Any appropriate weighting fucntions can be set so that the purpose of the connection can be accomplished.

The resulting volume controlled data is written into an output TDM data buffer corresponding to a timeslot on bus 96 dedicated to the port to which the data is to be transmitted, as symbolized by step 182. The data in the output TDM buffer is then broken into 8-bit bytes and written onto the local TDM bus 86 into the one or more timeslots dedicated to carrying data to the port. In alternative embodiments, where more timeslots than one are assigned to each port, a sufficient amount of data for every port's timeslots are put into those timeslots.

Finally, the data directed to the port is received by the subscriber line interface circuit 122 for that port and converted to analog signals and driven onto the tip and ring lines.

Upstream Record Data Transmission

The play data is sometimes an announcement asking the caller to enter DTMF tones indicating whether he wants to leave a voicemail message. If the caller does want to leave a message, the tones are recognized by the DSP 102 or MC 92 and a control packet informing the application 612 is sent to the PBX process.

The application 612 responds by invokes a "WAV in" function call of the WAV driver interface to prepare a buffer to receive the record data, as represented by arrow 700 in FIG. 18.

The application then invokes a Windows API function call to create and open a file on the hard disk to store the record data of the voicemail message.

The application next invokes an "add buffer" WAV API function of its WAV driver to pass it a pointer to the buffer to be filled with record data by the WAV channel.

When upstream record data is received from the data path, a dispatcher object 692 takes it out of a queue in shared memory 642. The packet is examined for its stream ID, and dispatched to the appropriate Actual Port Object (674 in our example) in the WAV channel having that stream ID. The Actual Port Object 674 then passes a pointer to the record data message which has been stored in a buffer to whatever WAV port has registered with it as a listener (660 in our example). The WAV port then retrieves the record data and copies it into a buffer designated by the application program to store it when the WAV driver 630 was first notified to create a buffer. When the buffer is full, the WAV port passes a message to a WAV driver object 630 that the buffer is full. The WAV driver object then sends a message to a callback address given by the application program, e.g., 32, that it has record data waiting in the buffer it designated to receive and store this particular message. The application program then reads the buffer and invokes a function call in the operating system to write the buffer to a specific file previously created and opened on the host hard disk. The exact details of which component does what at what point in the sequence and the function calls made between components in the preferred embodiment are given in pages 1–31 of Appendix A. The descriptions given above for the play and record channels represent one or more species within the genus of personal computer PBX systems that use software switched WAV channels to deliver play and record data over a packet bus or over dedicated or shared timeslots of a TDM bus.

IP Packet Delivery Over Packet Switched Bus

In the preferred embodiment, all voice play and record data is transmitted over the packet switched bus 54. The packet switched bus may also be used by the PBX process 620 and one or more other processes running on the personal computer and port expansion units and a modem (not shown) to transmit internet protocol IP packets from a modem coupled to a CO line and to said host computer via the PCI bus 12 out to any one of the ports to implement voice over IP or other IP packet based services. The packet switched bus 54 may also be controlled by the the PBX process 620 and one or more other processes running on the personal computer and port expansion units or by a modem (not shown) and/or network interface circuit 20 in FIG. 1 to carry other types of packet traffic. For example, the packet bus 54 can be used to transmit IP, Ethernet or other packets or frames between any one of the ports and any other one of the ports. Likewise, the packet bus can be used to transmit packets or frames from a port to said modem or between one or more of the ports and another computer coupled to the host 68 via local area network 18. The packet bus 54 can be used to carry the packet traffic either directly or via one of the application processes 610 through 618 or some other type of application process.

In some alternative embodiments, the driver process 638 executes on the host personal computer microprocessor (hereafter the host) and communicates switch control data to the switch card 28 in FIG. 1 and the switch circuitry 36 over the PCI bus 12 of the host. The driver process 638 is the first process in the heirarchy from the applications layer down to the PEU processes unique to the specific switching circuitry that has been added to the personal computer to implement PBX functionality. All programs above the driver level can be generic to any kind of PBX switching and port interface circuitry.

The function of the driver process 638 is to receive generic commands from the PBX process 620 via the device abstraction layer 622 and convert them into the proper switching commands to control the switching circuitry 36. In the preferred embodiment, with the help of Actual Port Objects or WAV ports in DAL 42 and FPGA 46, the driver process 638 also functions to transmit control packets and play data packets to one or more port expansion units to control processing thereby and provide play data for conversion to analog signals at the port. FIG. 17 represents an embodiment where there is a separate packet switched bus 54 and a time division multiplexed bus 50 coupling the host and driver process 638 to the PEUs one of which is represented by block 66. However, the use of separate packet switched and TDMA buses 50 and 54, respectively, is not critical to the invention. Any data path that can get control messages, play data, record data and real time PCM digitized voice data between the switching circuitry 36 and the PEUs and between Actual Port Objects in DAL 622 and the PEUs will suffice to practice the invention. For example, a single TDMA bus may be used, or the high speed PCI bus 12 of the host may be used where the PEUs are expansion cards plugged into the PCI bus.

Although the invention has been described with reference to the preferred and alternative embodiments disclosed herein, those skilled in the art will appreciate various modifications and enhancements that do not depart from the spirit and scope of the teachings of the invention. For example, in some alternative embodiments, the status signals sent from the microcontrollers to the PBX process or host computer can be sent over one or more channels on the TDMA bus 50 which are dedicated to control and management information or they may be sent by a "robbed bit" method similar to T1 service signalling via robbed bits. Likewise, commands sent back from the PBX process to the microcontrollers in the PEUs and TEUs can be sent via one or more dedicated control channels on the TDMA bus 50 or via robbed bits from channels carrying voice data. All such modifications and enhancements are intended to be included within the scope of the claims appended hereto.

What is claimed is:

1. An apparatus comprising:

a personal computer having a plurality of expansion slots;

one or more switch card circuits coupled to said expansion slots, each including a switching integrated circuit capable of coupling data in at least one timeslot to at least one other timeslot on a time division multiplexed bus and further comprising an interface circuit for a time division multiplexed bus and a packet switched bus;

one or more port expansion units coupled together in a daisy chain by a time division multiplexed bus and a packet switched bus, each said daisy chain of port expansion units having a port expansion unit in the chain coupled to a switch card via a time division multiplexed bus and a packet switched bus which are extension of the packet switched and time division multiplexed buses which couple each daisy chain together and a bus interface circuit for said buses, each port expansion unit including one or more port interface circuits for interfacing the port expansion unit to a central office plain old telephone service line or a T1 or PRI ISDN line or an extension telephone, and each port expansion unit including one or more digital signal processors coupled between said bus interface circuit and said port interface circuits and one or more microcontrollers coupled between said bus interface circuit and said one or more digital signal processors;

and wherein said personal computer is programmed with a PBX program to control said host computer to implement a PBX process that communicates with said microcontrollers on all of said port expansion interface circuits to determine call progress and port status and sends data to said microcontrollers to control signaling functions implemented by said port interface circuits and to control switching of said switch cards to implement at least some conventional PBX functionality;

and wherein said microcontrollers in each port expansion unit are programmed to read status signals from said port interface circuits and report said status to said PBX process and to receive commands from said PBX process and send commands to said port interface circuits to implement signaling functions and to write tone data to a digital signal processor in said port expansion unit to cause tone generation on channels designated in data received from said PBX process for signaling purposes;

and wherein said one or more digital signal processors in said port expansion unit are programmed to receive data from said time division multiplexed bus for channels corresponding to PBX connections that are already made or which are to be made and said tone data and programmed to implement a volume control weighting function to mix said channel data and said tone data and send the resulting data to the appropriate port interface circuits representing each incoming signaling tone and decode said data to determine which tone has been received and for interrupting said microcontroller for each said tone received;

and wherein said one or more microcontrollers are programmed to respond to each interrupt from said one or more digital signal processors and determine the tone which has been received and send a message to said PBX process identifying the tone which has been received.

2. The apparatus of claim 1 wherein said personal computer is further programmed, either as part of said PBX process or as part of another application program which includes voice mail or integrated voice response capability, to send data representing outgoing prerecorded announcements or voicemail messages to be played on one or more ports to the appropriate one or more of said port expansion interface units coupled to said one or more ports via packets on said packet switched bus, and wherein said one or more microcontrollers in said port expansion units that receive said packets are programmed to strip out the payload data of each said packet and write into a packet data buffer accessible by said one or more digital signal processors, and wherein said one or more digital signal processors are programmed to mix said packet data in with any tone data and channel data in said volume control weighting process and send the combined data out to the appropriate one or more said ports for transmission to said central office.

3. The apparatus of claim 1 wherein said personal computer is further programmed, either as part of said PBX process or as part of another application program which includes voice mail capability, to receive data representing incoming voicemail messages to be recorded from one or more of said port expansion interface units via packets on said packet switched bus, and wherein said one or more digital signal processors are programmed to receive data to be recorded as a voicemail message and save said data into a record buffer and interrupt at least one of said one or more microcontrollers, and wherein said one or more microcontrollers in said port expansion unit which receive said interrupt is programmed to retrieve said voicemail data from said record buffer, packetize said voicemail data and transmit it to said process on said personal compute that implements a voicemail function via said packet switched bus.

4. An apparatus comprising:

one or more port expansion circuits having port interface circuits for coupling to one or more telephone lines at one or more ports;

a personal computer having a time division multiplexed switching circuit therein which is coupled to said one or more port expansion circuits by a packet switched bus and a time division multiplexed bus, said personal computer further comprising one or more programs for controlling said personal computer to use said packet switched bus and WAV channels each of which is comprised of a WAV port which are switched by a PBX program to couple to at least one Actual Port Object mapped to a particular telephone line to transport play data to the port interface circuit for said telephone line and to transport record data back from said port interface circuit to a voice recording application process; and circuitry in said port interface circuits cooperating with one or more programs controlling said personal computer for recognizing the various analog or digital signals that comprise loop start, ground start and wink start signaling protocols and for generating the appropriate analog and/or digital signals needed to carry out signaling in said loop start, ground start and wink start signaling protocols.

\* \* \* \* \*

UNITED STATES PATENT AND TRADEMARK OFFICE
CERTIFICATE OF CORRECTION

| | |
|---|---|
| PATENT NO. | : 7,023,867 B1 |
| APPLICATION NO. | : 09/546976 |
| DATED | : April 4, 2006 |
| INVENTOR(S) | : Park et al. |

It is certified that error appears in the above-identified patent and that said Letters Patent is hereby corrected as shown below:

In column 48, at line 35, delete "compute" and insert --computer--.

Signed and Sealed this

Eighth Day of August, 2006

JON W. DUDAS
*Director of the United States Patent and Trademark Office*